US012478529B2

(12) United States Patent
Justice et al.

(10) Patent No.: US 12,478,529 B2
(45) Date of Patent: Nov. 25, 2025

(54) FLEXIBLE PATIENT LIFT ASSIST HARNESS

(71) Applicant: SIJE, Inc., Lompoc, CA (US)

(72) Inventors: Larry Gerard Justice, Lompoc, CA (US); Steven Craig Anderson, Lompoc, CA (US)

(73) Assignee: SIJE, Inc., Lompoc, CA (US)

( * ) Notice: Subject to any disclaimer, the term of this patent is extended or adjusted under 35 U.S.C. 154(b) by 37 days.

(21) Appl. No.: 18/702,289

(22) PCT Filed: Oct. 19, 2022

(86) PCT No.: PCT/US2022/047157
§ 371 (c)(1),
(2) Date: Apr. 17, 2024

(87) PCT Pub. No.: WO2023/069538
PCT Pub. Date: Apr. 27, 2023

(65) Prior Publication Data

US 2025/0120863 A1 Apr. 17, 2025

Related U.S. Application Data

(60) Provisional application No. 63/262,779, filed on Oct. 20, 2021.

(51) Int. Cl.
*A61G 7/10* (2006.01)
*A61G 7/00* (2006.01)

(52) U.S. Cl.
CPC ......... *A61G 7/1023* (2013.01); *A61G 7/1013* (2013.01); *A61G 7/1051* (2013.01); *A61G 7/10* (2013.01)

(58) Field of Classification Search
CPC .. A61G 7/1023; A61G 7/1013; A61G 7/1051; A61G 7/1049; A61G 7/10
USPC ........................................ 5/81.1 R, 83.1, 89.1
See application file for complete search history.

(56) References Cited

U.S. PATENT DOCUMENTS

| | | | | |
|---|---|---|---|---|
| 976,564 A | | 11/1910 | Goodson | |
| 1,722,192 A | * | 7/1929 | Brokaw | A61F 5/026 2/44 |
| 4,524,760 A | * | 6/1985 | Lerner | A61H 19/50 128/845 |

(Continued)

FOREIGN PATENT DOCUMENTS

| | | |
|---|---|---|
| FR | 3001885 | 8/2014 |
| WO | WO 2023/069538 | 4/2023 |

OTHER PUBLICATIONS

International Search Report and Written Opinion dated: Mar. 27, 2023 in International Application No. PCT/US2022/47157, filed Oct. 19, 2022 and published as: WO 2023/069538 on: Apr. 27, 2023.

(Continued)

*Primary Examiner* — Robert G Santos
(74) *Attorney, Agent, or Firm* — Schmeiser, Olsen & Watts, LLP

(57) ABSTRACT

A flexible lift assist harness is configured to allow caregivers to assist patients with limited mobility. The flexible lift assist harness may include a flexible belt assembly which may be secured to the torso of the patient, and in some cases at least one leg anchor assembly which may be secured to a leg of the patient.

20 Claims, 30 Drawing Sheets

(56) References Cited

U.S. PATENT DOCUMENTS 4,709,692 A * 12/1987 Kirschenberg .......... A61F 5/028 450/114
4,905,678 A * 3/1990 Cumins ................ A61F 5/0193 602/19
4,926,845 A * 5/1990 Harris .................. A61F 13/143 602/19
5,647,378 A * 7/1997 Farnum .................... A61F 5/03 5/89.1
5,814,001 A * 9/1998 Schwenn ............. A61F 5/0193 602/23
5,893,367 A 4/1999 Dubats et al.
5,928,175 A * 7/1999 Tanaka ................... A61F 5/028 450/146
6,050,364 A 4/2000 Popall et al.
6,073,280 A * 6/2000 Farnum ............. A62B 35/0025 5/89.1
6,227,937 B1 * 5/2001 Principe .................. A41B 9/12 450/153
6,443,920 B1 * 9/2002 Clement .............. A61F 13/069 602/61
6,604,526 B1 * 8/2003 Coward ................ A61H 19/50 128/845
6,715,167 B2 * 4/2004 Wake .................. A61G 7/1023 5/89.1
6,752,776 B2 * 6/2004 West ..................... A61H 3/008 602/32
6,883,190 B2 * 4/2005 Carbonneau ......... A61G 7/1051 5/89.1
6,942,630 B2 * 9/2005 Behan .................... A61F 5/012 482/69
7,066,181 B2 * 6/2006 West ..................... A61H 3/008 128/869
7,341,025 B1 3/2008 Streeter et al.
7,476,185 B2 * 1/2009 Drennan .............. A61F 5/0193 482/121
7,758,481 B2 * 7/2010 Drennan ........... A63B 21/4025 482/121
8,211,043 B2 * 7/2012 Horvath ................. A61F 5/028 2/312
8,226,588 B2 * 7/2012 Horvath ................. A61F 5/028 2/312
8,235,173 B2 * 8/2012 Kopp ................ A62B 35/0012 182/7
8,321,972 B1 12/2012 Vetter
8,617,092 B2 12/2013 Horvath et al.
9,327,099 B2 * 5/2016 Wainscott ............ A61M 25/02
9,474,314 B2 * 10/2016 Khorsandi ............... A41F 5/00
10,368,598 B2 * 8/2019 Khorsandi ............... A61F 5/02
10,376,007 B2 * 8/2019 Khorsandi ............. A41F 9/005
10,398,618 B2 * 9/2019 Dolce .................... A61H 3/008
10,568,774 B2 * 2/2020 Clement .............. A61F 5/0585
10,842,679 B2 * 11/2020 Clement .............. A61F 13/041
11,246,779 B2 * 2/2022 Glibert ................ A61G 7/1051
11,553,738 B1 * 1/2023 Allen ..................... A41C 1/003
12,108,812 B2 * 10/2024 Allen ....................... A41C 5/00
12,233,013 B2 * 2/2025 Phillips ............... A61G 7/1038
2003/0140414 A1 * 7/2003 Wake .................. A61G 7/1023 5/81.1 T
2003/0162636 A1 * 8/2003 West ..................... A61H 3/008 482/69
2003/0192118 A1 * 10/2003 Carbonneau ......... A61G 7/1051 5/89.1
2003/0195445 A1 * 10/2003 Behan .................. A61F 5/0102 602/19
2004/0116260 A1 * 6/2004 Drennan ........... A63B 21/0552 482/131
2004/0230150 A1 * 11/2004 West ..................... A61H 3/008 602/19
2007/0027419 A1 * 2/2007 Drennan ........... A63B 21/4025 602/19
2007/0272484 A1 * 11/2007 Helms ............... A62B 35/0037 182/3
2009/0178194 A1 * 7/2009 Story .................. A61G 7/1023 5/81.1 R
2010/0300802 A1 * 12/2010 Kopp ................ A62B 35/0025 182/3
2011/0270143 A1 * 11/2011 Horvath ................. A61F 5/028 602/19
2011/0270144 A1 * 11/2011 Horvath ................. A61F 5/028 602/19
2012/0271213 A1 * 10/2012 Horvath ................. A61F 5/028 602/19
2014/0109296 A1 * 4/2014 Jack ....................... A61F 5/028 2/312
2014/0358090 A1 * 12/2014 Wainscott ............ A61M 25/02 604/179
2016/0029726 A1 * 2/2016 Khorsandi ............. A41F 9/005 2/300
2016/0227860 A1 * 8/2016 Khorsandi ............... A61F 5/00
2016/0367429 A1 * 12/2016 Dolce .................... A61H 3/008
2018/0008475 A1 * 1/2018 Clement .............. A61F 13/041
2018/0036190 A1 * 2/2018 Glibert ................ A61G 7/1015
2020/0179175 A1 * 6/2020 Clement .............. A61F 5/0585
2021/0267829 A1 * 9/2021 Phillips ............... A61G 7/1051
2023/0116765 A1 * 4/2023 Allen ....................... A41C 5/00 450/156
2025/0120863 A1 * 4/2025 Justice ................ A61G 7/1023

OTHER PUBLICATIONS

International Preliminary Report on Patentability dated: Apr. 23, 2024 in International Application No. PCT/US2022/47157, filed Oct. 19, 2022 and published as: WO 2023/069538 on: Apr. 27, 2023.

* cited by examiner

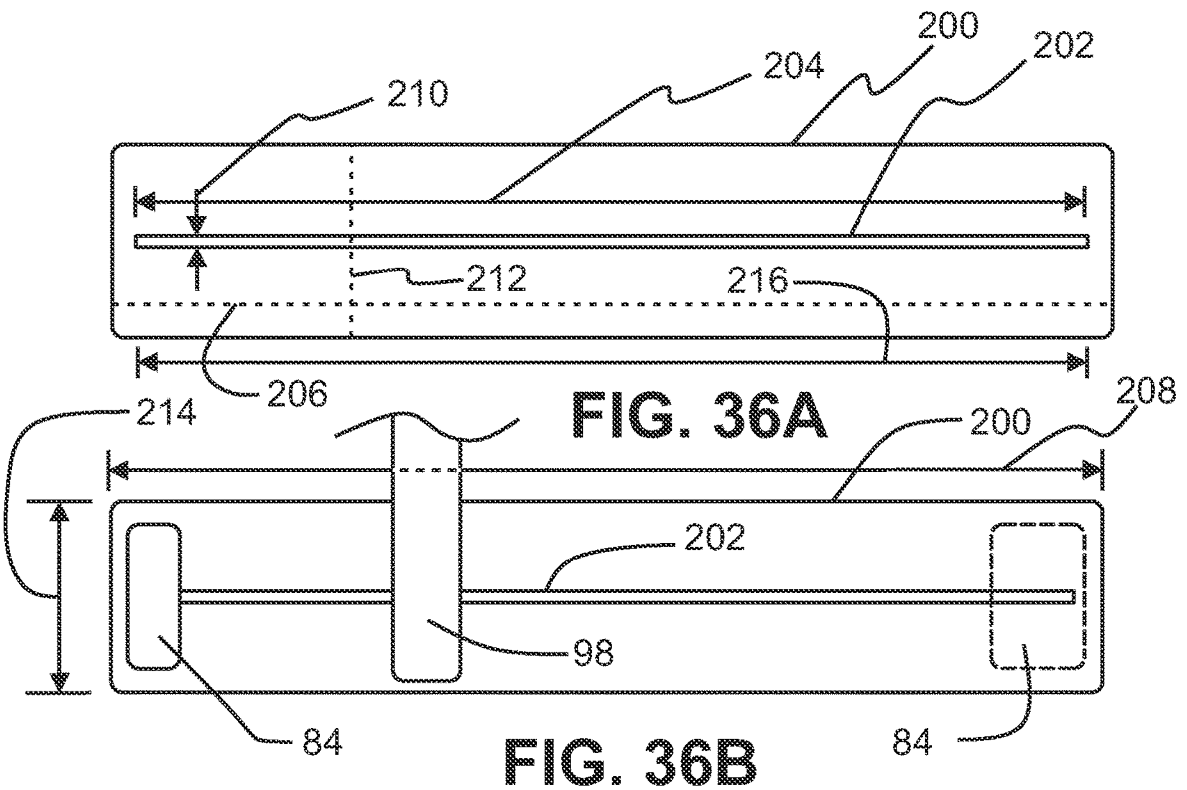
FIG. 36A
FIG. 36B
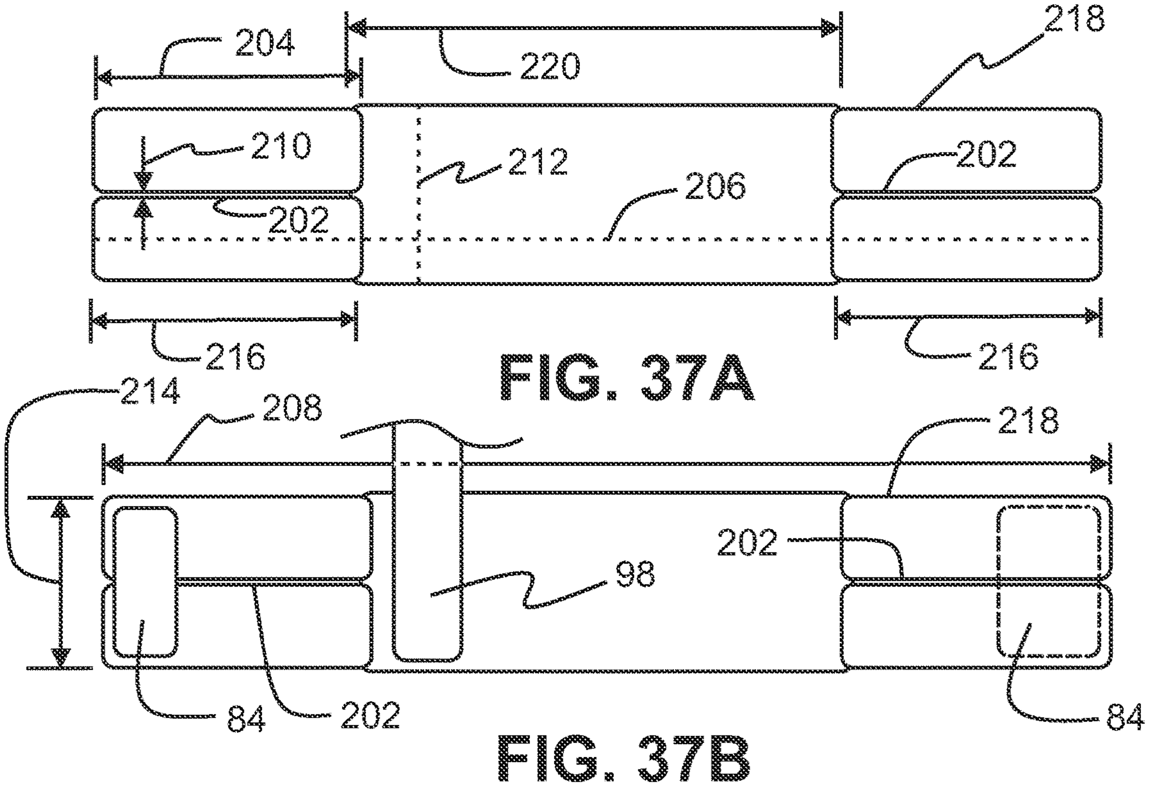
FIG. 37A
FIG. 37B

FLEXIBLE PATIENT LIFT ASSIST HARNESS

RELATED APPLICATIONS

This application is a national stage application under 35 U.S.C. section 371, which claims the benefit of priority to PCT Application No. PCT/US2022/047157, filed Oct. 19, 2022, by Larry Gerard JUSTICE et al., and titled "FLEXIBLE PATIENT LIFT ASSIST HARNESS," which claims priority from U.S. provisional patent application Ser. No. 63/262,779 filed Oct. 20, 2021, by Steven C. ANDERSON et al., and titled "FLEXIBLE PATIENT LIFT ASSIST HARNESS", each of which is incorporated by reference herein in its entirety.

BACKGROUND

Lift assist belts are currently used on a variety of patients who are enrolled in physical therapy for injuries and or chronic ailments which limit the mobility of the patient. Additionally such belts can be used in nursing homes and hospitals to assist in the movement of patients such as the elderly or those recovering from surgery by allowing caregivers to help the patient with everyday activities such as exercise, using the restroom, bathing, or the like. A problem with existing belts is that they are inflexible along their length once the loop length is fixed, and if the belt slips along a direction parallel to the spine while lifting and or assisting the patient the belt can slip to a secondary belt location (e.g. around the chest) and thereby potentially limit the breathing of the patient as well as causing discomfort because the chest may be more broad and less flexible than the stomach to which the loop length has been adjusted. The slippage of the belt can also be dangerous for the patient and caregivers because the belt may no longer be providing a stable platform to grab and assist the patient. Existing belts configured as straps can be additionally uncomfortable for patients as the caregiver's hands are disposed between the belt and the patient's body while the caregiver is assisting the patient, and the knuckles of the caregiver's hands may dig into the patient's body when lifting tension is applied to the belt. What are needed are devices and methods which allow for comfortable and secure lifting of a patient by caregivers without slippage of the lift assist belt.

SUMMARY

Some embodiments of a flexible lift assist harness may include a flexible belt assembly which may have a torso belt. The torso belt may have a length along its longitudinal axis which is sufficient to encompass a human torso, an elongation elasticity along the longitudinal axis of at least about 30 percent, and limited elongation elasticity along a transverse axis of the torso belt of less than about 4 percent. The flexible belt assembly may also include a torso fixation mechanism disposed on a first and a second end of the torso belt, the torso fixation mechanism configured to releasably secure the first end of the torso belt to the second end of the torso belt at a plurality of secured circumferences of the torso belt.

The flexible belt assembly may also include at least one flexible handle assembly disposed on the torso belt. The flexible handle assembly may include a flexible handle having an elongate configuration and which may be configured to have elongation elasticity along a handle length axis of at least about 20 percent. The flexible handle may have limited elongation elasticity along a transverse axis of the flexible handle of less than about 2 percent and may be configured to lie flat in a stretched state when not in use. The flexible handle assembly may also include a flexible insert which may be disposed adjacent to and secured to the torso belt and which may include a thin resilient layer of flexible material. The flexible insert may also include at least one handle anchor aperture and an insert strap coupler. The flexible handle assembly may also include an insert cover which may be disposed between the flexible handle and the flexible insert. The flexible insert may be sized such that the flexible insert is substantially encompassed by and disposed between the torso belt and the insert cover. The flexible handle assembly may also include at least one insert lock feature which may operatively couple the elongate handle to the torso belt through the at least one handle anchor aperture. The insert lock feature may be disposed about a perimeter of the insert cover thereby operatively coupling the insert cover to the torso belt about a perimeter of the insert cover.

The flexible lift assist harness may also include at least one leg belt assembly. The leg belt assembly may include a leg belt which may be configured to have elastic elongation along a longitudinal axis of the leg belt of at least about 40 percent. The leg belt may have limited elongation elasticity along a transverse width axis of the leg belt of less than about 5 percent, and the leg belt may have a length along the longitudinal axis of the leg belt which is sufficient to encompass a human thigh. The leg belt assembly may also include a leg belt fixation mechanism that may be disposed on a first end and a second end of the leg belt and which may be configured to releasably secure the first end of the leg belt to the second end of the leg belt at a plurality of secured circumferences of the leg belt.

The flexible lift assist harness may also include at least one anchor strap assembly. The anchor strap assembly may include an anchor strap which may have a first end which is secured to the leg belt. The anchor strap assembly may also include a leg belt fixation mechanism which may be disposed on a first end and a second end of the leg belt, and which may be configured to releasably secure the first end of the leg belt to the second end of the leg belt at a plurality of secured circumferences of the leg belt.

Some methods for assisting a patient utilizing a flexible lift assist harness may include securing a torso belt of a flexible belt assembly to a patient by wrapping the torso belt about the torso of the patient and then engaging a torso fixation mechanism which is configured to releasably secure a first end of the torso belt to a second end of the torso belt. A transverse width of the torso belt may be disposed substantially below the ventral ribcage and substantially above the hipbones of the patient. The method may also include securing a leg belt of a leg belt assembly to the leg of the patient by wrapping the leg belt about the leg of the patient and engaging a fixation mechanism which is configured to releasably secure a first end of the leg belt to a second end of the leg belt. The method may also include securing an anchor strap assembly of the leg belt assembly to a flexible handle assembly of the flexible belt assembly utilizing a coupling mechanism which may be disposed at a second end of an anchor strap of the anchor strap assembly. The method may also include operatively and adjustably coupling the second end of the anchor strap to an anchor strap terminal of the flexible handle assembly. The method may also include grasping a flexible handle of the flexible handle assembly, and assisting the patient by applying a suitable tension to the flexible handle in order to assist in the mobility of the patient.

Some embodiments of a flexible lift assist harness may include a flexible belt assembly which in turn may include a torso belt. The torso belt may have a length along a longitudinal axis of the torso belt which is sufficient to encompass a human torso, an elongation elasticity along the longitudinal axis of at least about 40 percent, a width along a transverse axis of the torso belt that is at least about 12 percent of the length along the longitudinal axis, and limited elongation elasticity along the transverse axis thereof of less than about 4 percent.

The flexible belt assembly may also include a torso fixation mechanism which may be disposed on a first end and a second end of the torso belt and which may be configured to releasably secure the first end of the torso belt to the second end of the torso belt at a plurality of secured circumferences of the torso belt. The flexible belt assembly may also include a plurality of flexible handle assemblies, each flexible handle assembly may include a flexible handle. Each flexible handle may have elongate configuration and may be configured to have elongation elasticity along a handle length axis of at least about 20 percent. Each flexible handle may have limited elongation elasticity along a transverse axis of the elongate handle of less than about 2 percent and be configured to lie flat in a stretched state when not in use.

Each flexible handle assembly may also include a flexible insert which may be disposed adjacent to and secured to the torso belt and which may include a thin resilient layer of flexible material, at least one handle anchor aperture and an insert strap coupler. Each flexible handle assembly may also include an insert cover which may be disposed between the flexible handle and the flexible insert. The flexible insert may be sized such that the flexible insert is substantially encompassed by and disposed between the torso belt and the insert cover. Each flexible handle assembly may also include at least one insert lock feature which may operatively couple the elongate handle to the torso belt through the at least two handle anchor apertures. The insert lock feature may be disposed about a perimeter of the insert cover thereby operatively coupling the insert cover to the torso belt about a perimeter of the insert cover.

The flexible lift assist harness may also include at least one anchor strap assembly. The anchor strap assembly may include an anchor strap made from a flexible resilient material and having an elongate configuration, a first end, and a second end. The anchor strap assembly may also include a first strap coupling mechanism which may be disposed at a first end of the anchor strap and be configured to operatively couple the first end of the anchor strap to a first anchor strap terminal of a first flexible handle assembly. The anchor strap assembly may also include a second strap coupling mechanism which may be disposed at a second end of the anchor strap and which may be configured to operatively couple the second end of the anchor strap to a second anchor strap terminal of a second flexible handle assembly.

Some methods for utilizing a flexible lift assist harness may include securing a torso belt of a flexible belt assembly to a patient by wrapping the torso belt about the torso of the patient and engaging a fixation mechanism. The method may also include releasably securing a first end of the torso belt to a second end of the torso belt, with the transverse width of the torso belt being disposed such that it is substantially below the ventral ribcage and substantially above the hipbones of the patient. The method may also include securing a first end of an anchor strap to the flexible belt assembly by operatively coupling a coupling mechanism disposed at a first end of the anchor strap to an anchor strap terminal of a first flexible handle assembly. The method may also include securing a second end of the anchor strap to the flexible belt assembly by operatively coupling a second coupling mechanism disposed at a second end of the anchor strap to a second anchor strap terminal of a second flexible handle assembly. The method may also include grasping a first flexible handle of the first flexible handle assembly; and assisting the patient by applying suitable tension to the first flexible handle in order to assist in the mobility of the patient.

Some embodiments of a flexible lift assist harness may include a flexible belt assembly which may have a torso belt configured to suitably comply with the contours of the torso of a human patient. The torso belt may have elongation elasticity properties which allow the torso belt to be comfortably secured to the torso of the patient and to be used as a platform for assisting the patient. The flexible belt assembly may also include a torso belt fixation mechanism which may be configured to releasably secure a first end of the torso belt to a second end of the torso belt at a plurality of secured circumferences of the torso belt. The flexible lift assist harness may also include at least one reinforcement mechanism which is configured to suitably comply with the contours of the human body and which is secured to an outer surface of the torso belt. The flexible lift assist harness may also include at least one flexible handle which may be configured to be resilient and to suitably conform with the contours of the human torso. The at least one flexible handle may be operatively coupled to the at least one reinforcement mechanism. The at least one reinforcement mechanism may be configured to distribute tension applied to the at least one flexible handle over a surface area of the torso belt thereby reducing tenting of the torso belt away from the body.

Some methods for utilizing a flexible lift assist harness and a patient assist power lift device may include securing a torso belt of the flexible lift assist harness to a patient by wrapping the torso belt about the torso of the patient and engaging a fixation mechanism releasably securing a first end of the torso belt to a second end of the torso belt. The method may also include securing a first leg anchor assembly of the flexible lift assist harness to a first leg of the patient, and operatively coupling the first leg anchor assembly to a first reinforcement mechanism secured to an outer surface of the torso belt. The method may also include securing a second leg anchor assembly of the flexible lift assist harness to a second leg of the patient, and operatively coupling the second leg anchor assembly to a second reinforcement mechanism secured to the outer surface of the torso belt. The method may also include operatively coupling the torso belt to the patient assist power lift device, and activating the patient assist power lift device and applying or releasing tension to the flexible lift assist harness and raising or lowering the body of the patient.

Some method embodiments for replacing a patient's diaper may include securing a torso belt of a flexible lift assist harness to a patient by wrapping the torso belt about the torso of the patient and engaging a fixation mechanism which releasably secures a first end of the torso belt to a second end of the torso belt with a transverse width of the torso belt disposed substantially below the ventral ribcage and substantially above the hipbones of the patient. The method may also include securing a leg belt of the flexible lift assist harness to the leg of the patient by wrapping the leg belt about the leg of the patient and engaging a fixation mechanism which releasably secures a first end of the leg belt to a second end of the leg belt. The method may also include operatively and releasably coupling an anchor strap secured to the leg belt to a flexible handle assembly of the torso belt. The method may also include applying a lifting force to the torso belt to stabilize the patient in a standing position. The method may also include removing a first diaper from the patient by disengaging the first diaper from the patient, and sliding at least a portion of the first diaper between the anchor strap and the leg or pelvis of the patient. The method may also include sliding at least a portion of a second replacement diaper between the anchor strap and the leg or pelvis of the patient and deploying the second replacement diaper onto the patient.

BRIEF DESCRIPTION OF THE DRAWINGS

FIGS. 36A-B are elevation views of a leg belt embodiment having a leg belt slot.

FIGS. 37A-B are elevation views of a leg belt embodiment having multiple leg belt slots.

Figure 1:
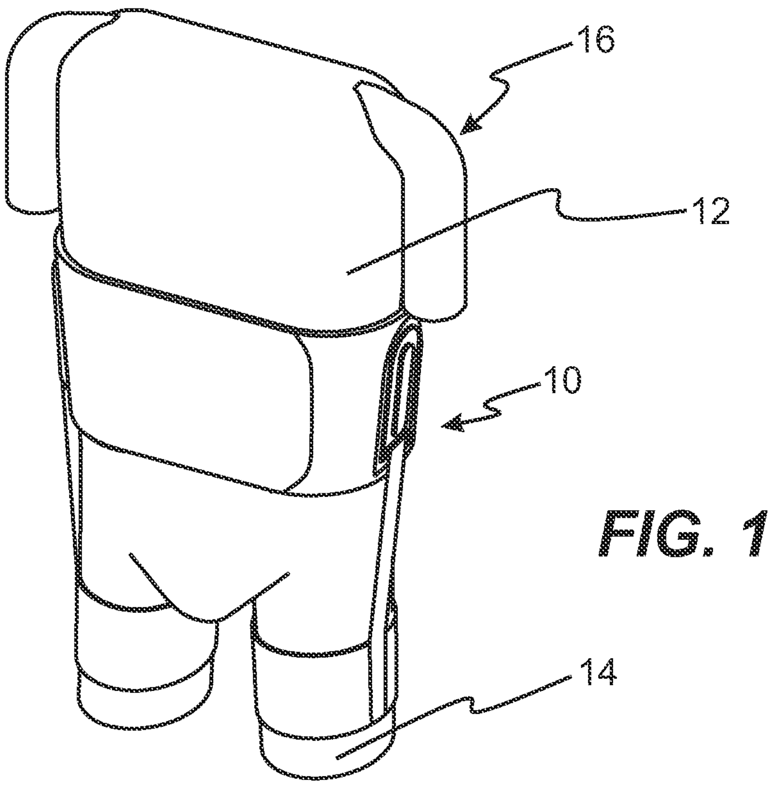
FIG. 1 is a perspective view of the torso and legs of a patient model with a lift assist harness embodiment secured to the patient.
Figure 2:
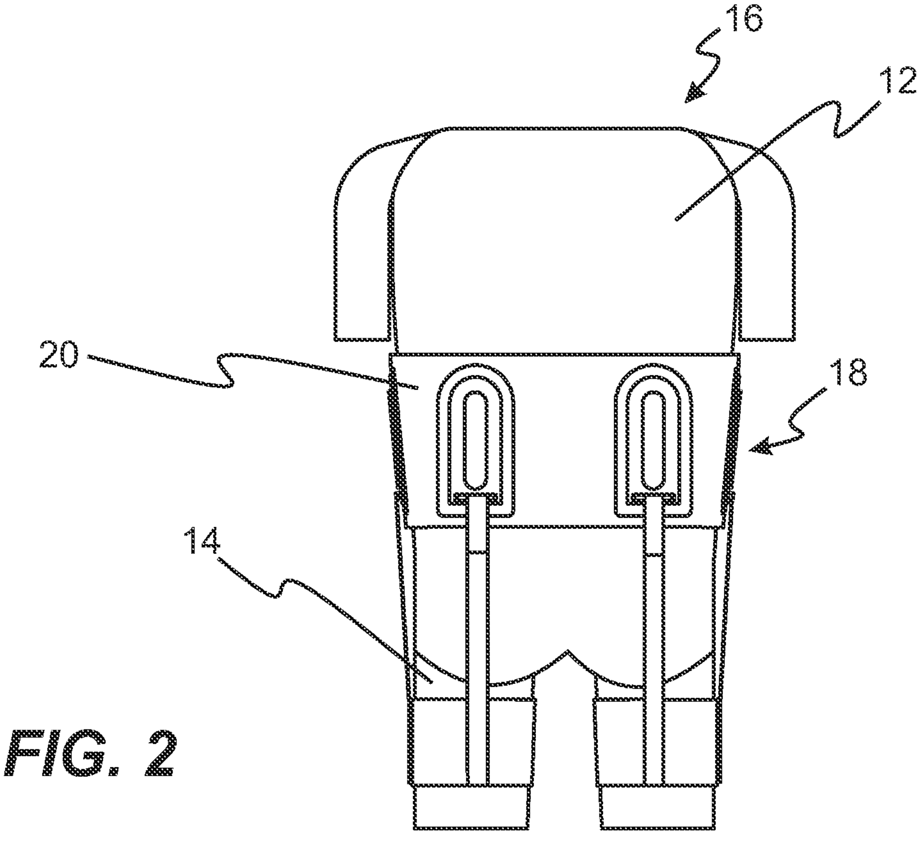
FIG. 2 is a rear elevation view of the patient with the lift assist harness embodiment of FIG. 1 attached to the patient.
Figure 3:
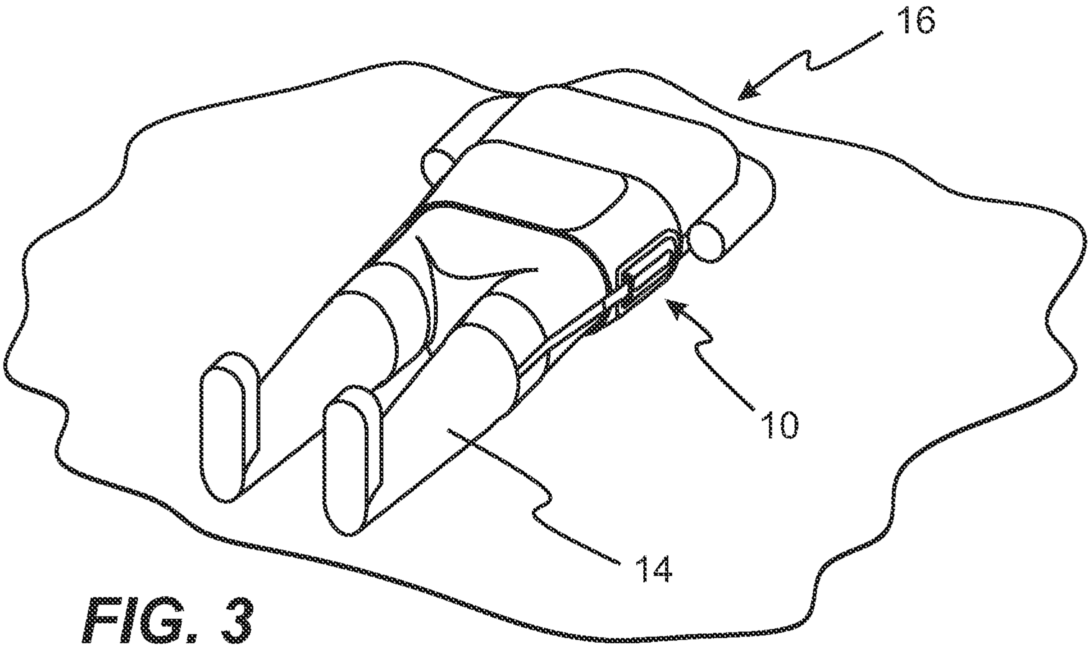
FIGS. 3-6 depict a method for utilizing a lift assist harness embodiment wherein a prone patient model is lifted to a sitting position and subsequently lifted to a standing position by a caregiver grasping the patient via flexible handle assemblies of the lift assist harness.
Figure 4:
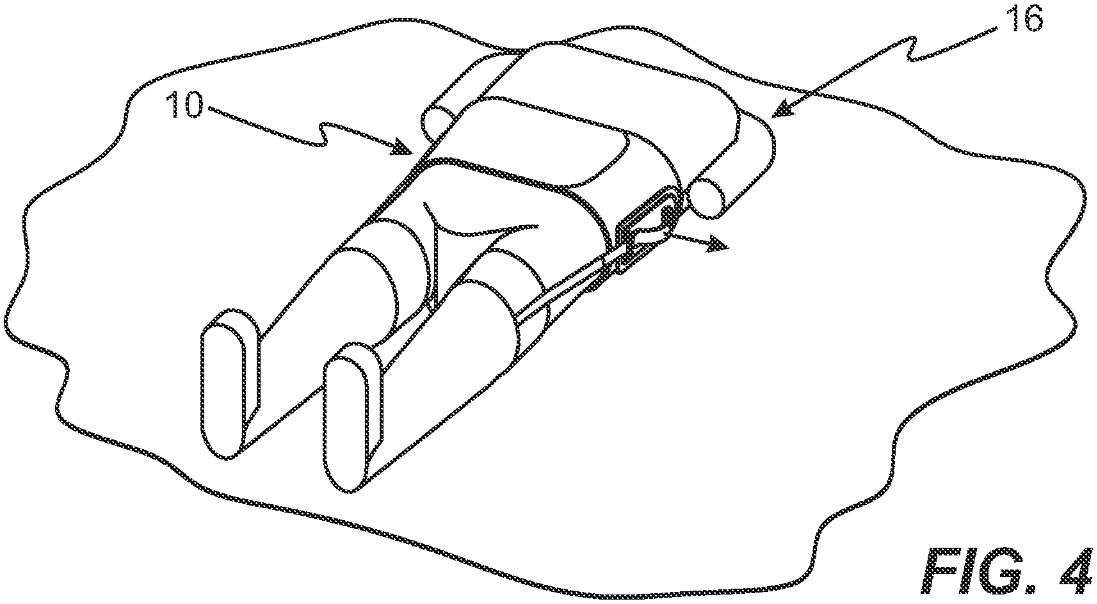
Figure 5:
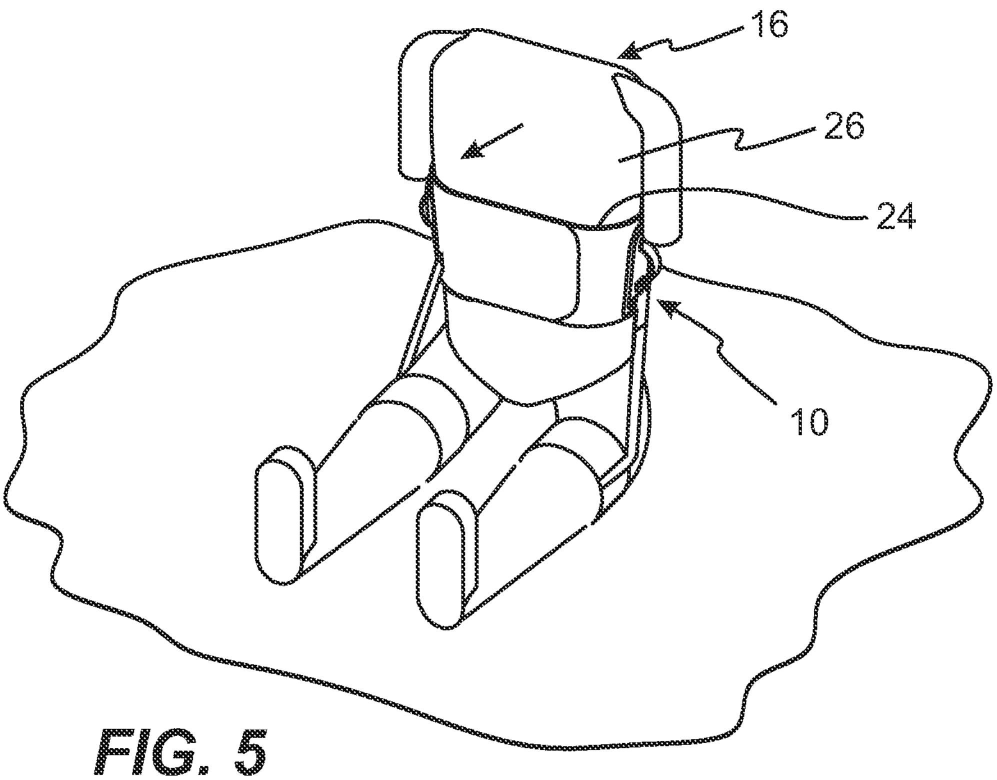
Figure 6:
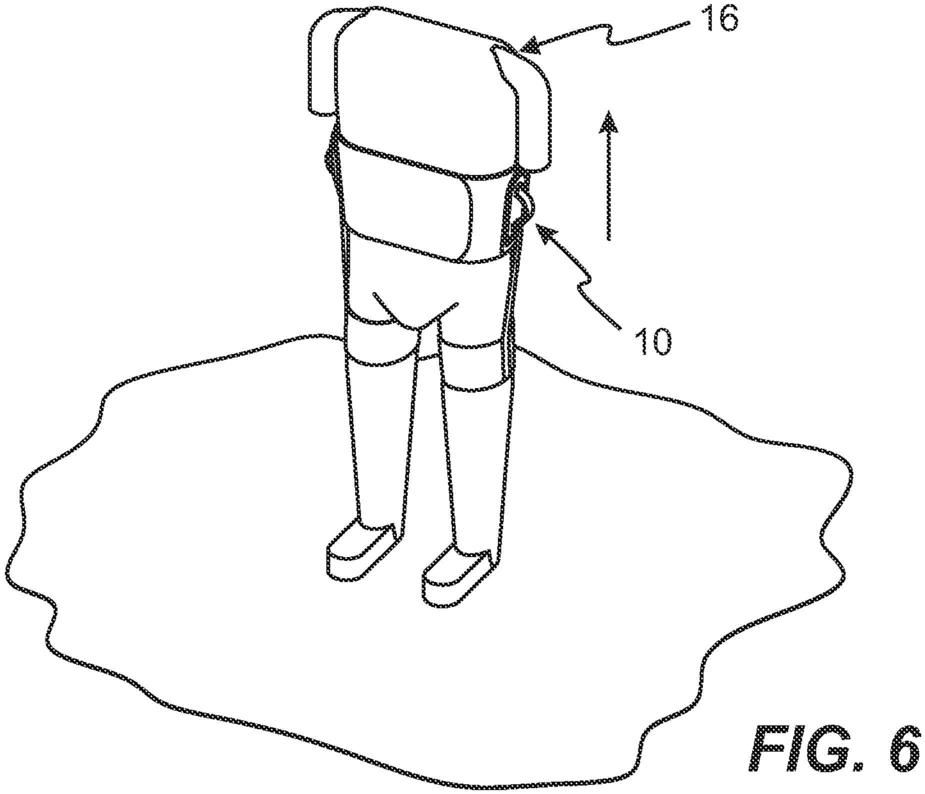

The drawings are intended to illustrate certain exemplary embodiments and are not limiting. For clarity and ease of illustration, the drawings may not be made to scale and, in some instances, various aspects may be shown exaggerated or enlarged to facilitate an understanding of particular embodiments.

DETAILED DESCRIPTION

Some flexible lift assist harness embodiments which are discussed herein may be configured to better enable caregivers to assist mobility restricted patients perform tasks such as physical therapy/exercising, getting into vehicles, visiting the restroom, bathing, or the like. Some flexible lift assist harness embodiments may include a torso belt which may be configured to be comfortably secured to the torso of the patient, the materials of the torso belt may additionally be configured to comply with the body contours of the patient so as not to poke or prod the patient with stiff elements, with the dimensions of the torso belt providing adequate surface contact between the torso belt and body of the patient such that the torso belt does not slide unnecessarily as caregivers utilize the flexible lift assist harness to assist the patient. Some torso belt embodiments may include a flexible handle disposed on the torso belt which may be grasped by a caregiver. In some cases, the flexible handle may be operatively coupled to a reinforcement structure which may in turn be operatively coupled to the torso belt. The flexible handle assembly may be configured to lie flat against the reinforcement structure when not in use by a caregiver so as not to poke or prod the patient when the patient is sitting or lying down.

In some cases, the torso belt may require additional support in order to prevent it from sliding along the torso when tension is applied to the flexible handles in order to assist the patient. For example, if a patient has fallen and is incapable of lifting themselves then tension applied by a caregiver to the handles may be significant and may result in sliding of the torso belt along the torso of the patient. If desired, such additional support to the torso belt may be achieved by attaching at least one leg anchor assembly to the leg of the patient. Each leg anchor assembly may be operatively coupled to the torso belt and may act to prevent slipping of the torso belt along the patient's torso when significant tension is applied to the torso belt handle(s). The materials of each leg anchor assembly may additionally be configured to comply with the body contours of the patient so as not to poke or prod the patient with stiff elements in order to maximize the comfort of the patient.

In some instances flexible lift assist harness embodiments may include a flexible belt assembly which may be configured to suitably comply with the contours of the torso of a human patient. The torso belt may also be configured with elongation elasticity properties which allow the belt to be comfortably secured to the torso of the patient and to be used as a platform for assisting the patient. The torso belt may also include a torso belt fixation mechanism which may be configured to releasably secure a first end of the torso belt to a second end of the torso belt at a plurality of secured circumferences of the torso belt, such that the torso belt is adequately secured to the torso of the patient with a circumferential tension sufficient to hold the torso belt in place on the patient bur without causing discomfort.

In some cases, the elastic properties of the torso belt may be anisotropic with respect to different axes of the torso belt. That is to say that the torso belt may be configured to have a greater elongation elasticity with respect to a longitudinal axis disposed along the length of the torso belt that extends around the patient's torso relative to the elongation elasticity of the torso belt along a transverse axis of the torso belt. Such a configuration allows for the torso belt to be comfortably secured to the patient, while at the same time allowing for comfortable walking/exercising/sitting/breathing of the patient. This additional comfort is achieved because the torso belt will stretch along the longitudinal axis around the patient's torso with the activity of the patient. Because of the elongation elasticity properties along the longitudinal axis of the torso belt, the torso belt may be configured such that it is wider than conventional lift assist belts. Conventional lift assist belts are configured with little to no elongation elasticity properties, and are therefore fairly "stiff" or "rigid" when they are secured to a fixed and unchanging circumference about the torso of a patient. This inflexibility can lead to discomfort of the patient as the belt may dig into the tissue of the patient, or restrict the motion and or breathing of the patient. The elongation elasticity properties of the torso belt along the longitudinal axis allow for "stretching" and circumferential expansion of the torso belt during motion of the patient. For this reason the torso belt may be configured to be wider than conventional lift assist belts so that there is greater surface area contact between the torso belt and the torso of the patient, the increased surface area contact acting to comfortably secure the torso belt to the patient.

As discussed above the elastic properties of the torso belt may be anisotropic with respect to different axes of the torso belt. In some cases, the torso belt may be configured to be less elastic (having a lower elongation elasticity) with respect to a transvers axis disposed along the width of the torso belt than along the longitudinal axis. The limited elongation elasticity of the torso belt with respect to the transverse axis allows for the belt to be used as a resilient platform for lifting/assisting the patient. As discussed above, a caregiver may assist a patient by grasping a flexible handle which may be operatively coupled to a reinforcement structure which may in turn be operatively coupled to the torso belt. Thus, a tension is applied by the caregiver to the flexible handle while the caregiver is assisting the patient. The limited elongation elasticity along the transverse axis of the torso belt may prevent stretching/tenting of the torso belt along the transverse axis with the application of the tension, thereby making the torso belt a suitable platform for lifting/assisting the patient.

The flexible belt assembly may also include at least one reinforcement mechanism which may be used to facilitate the coupling of the flexible handle to the torso belt and which may be configured to suitably comply with the contours of the human body. Embodiments of flexible belt assemblies which are discusses herein may include about 1 to about 6 reinforcement mechanisms. The reinforcement mechanism may be disposed on an outer surface of the torso belt or in any other suitable location. The flexible handle may be configured to be resilient and to suitably comply with the contours of the human torso and may be operatively coupled to the reinforcement mechanism. The reinforcement mechanism may be configured to distribute the tension applied to the flexible handle by a caregiver over a suitable surface area of the torso belt. The distribution of the tension applied by a caregiver over a suitable area of the torso belt by the reinforcement mechanism may prevent or reduce the tenting of the torso belt away from the body thereby making the torso belt a suitable platform for lifting/assisting the patient.

The reinforcement mechanism may also in some cases act as a support structure which may prevent compression and/or buckling of the torso belt along the transverse axis of the torso belt when the caregiver applies tension to the flexible handle. Tension applied by the caregiver to the flexible handle may be transferred to the torso belt at a first and second end of the flexible handle with the first and second end of the flexible handle operatively coupled to the torso belt by the reinforcement mechanism. The tension may in some cases result in a compressive load oriented along the transverse axis of the of the torso belt being applied to the reinforcement mechanism by the first and second ends of the flexible handle. The reinforcement mechanism may be configured such that it is resilient enough to retain its shape and resist buckling due to this compressive load while at the same time remaining flexible enough to conform to the patient's body contour. Additionally, the resiliency of the reinforcement mechanism may allow in some cases for the pre-tensioning of the flexible handle when it is secured to the reinforcement mechanism and the torso belt without causing buckling or excessive deformation of the reinforcement mechanism. The pre-tensioning of the flexible handle may promote retraction of the handle in a static unused state and prevents snagging of the handle when it is not in use. In some instances, the flexible handle may be secured to the reinforcement mechanism such that there is pre-tension between the first and second ends of the flexible handle. The reinforcement mechanism may be configured such that it is resilient enough to retain its shape and resist bucking of the torso belt due to the compressive load applied to the torso belt by the pre-tensioned flexible handle, while at the same time remaining flexible enough to conform to the patient's body contour.

As discussed above, some flexible lift assist harness embodiments may also include at least one leg anchor assembly. The at least one leg anchor assembly may be operatively coupled to the torso belt and may be configured to prevent slipping of the torso belt along the patient's torso when significant tension is applied to the at least one flexible handle of the torso belt by providing anti slipping support in addition to the support provided by the torso belt. In some cases the leg anchor assembly may be configured as a leg belt assembly which may include a leg belt which may be configured to suitably comply with the contours of the leg of the patient. Additionally the leg belt may be configured with elongation elasticity properties which allow the leg belt to be comfortably secured to the leg of the patient and to be used as a platform for securing the leg belt to the torso belt.

In some instances, the elastic properties of the leg belt may be anisotropic with respect to different axes of the leg belt. That is to say that the leg belt may be configured to be more elastic (having a greater elongation elasticity) with respect to a longitudinal axis disposed along the length of the leg belt and around the patient's leg than along a transverse axis thereof. Such a configuration may allow for the leg belt to be comfortably secured to the patient, while at the same time allowing for comfortable walking/exercising/sitting of the patient as the leg belt will stretch along the longitudinal axis around the patient's leg with the activity of the patient. The leg belt may be configured to be less elastic (having a lower elongation elasticity) with respect to a transverse width axis disposed along the width of the torso belt than along the longitudinal axis. The limited elongation elasticity of the leg belt with respect to the transverse width axis may allow for the belt to be used as a resilient platform for lifting/assisting the patient when the leg belt is operatively coupled to the torso belt.

The leg belt assembly may further include a leg belt fixation mechanism which may be configured to releasably secure a first end of the leg belt to a second end of the leg belt at a plurality of secured circumferences of the leg belt such that the leg belt may be comfortably attached to a patient with a circumferential tension sufficient to hold the leg belt in place on the patient's leg without causing the patient discomfort. The let belt assembly may also include at least one anchor strap which may be formed a from a resilient flexible material. The anchor strap may be configured to operatively and releasably couple the leg belt assembly to the flexible belt assembly and transfer tensile forces therebetween.

For some flexible lift assist harness embodiments, the leg anchor assembly may be configured as an anchor strap which may be disposed between the legs of the patient, with both ends of the anchor strap operatively coupled to the torso belt. Such a flexible lift assist harness embodiment may include a first reinforcement mechanism and a second reinforcement mechanism, with a first end of the anchor strap being configured to operatively and releasably couple to the first reinforcement mechanism. A second end of the anchor strap may be configured to operatively couple to the second reinforcement mechanism, or in some cases the second end of the anchor strap may be configured to operatively and releasably secure to the second reinforcement mechanism.

Figure 10:
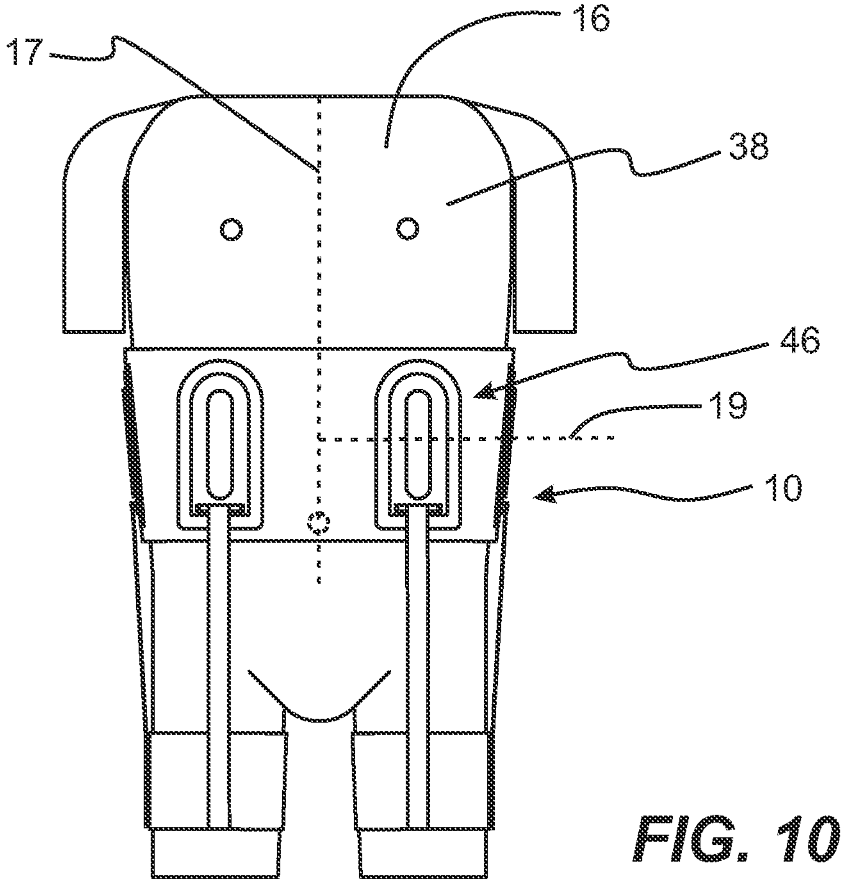
FIG. 10 is a front elevation view of a patient with a lift assist harness embodiment secured to the patient.

For some flexible belt assembly embodiments, the flexible handle assembly may be operatively coupled to a single reinforcement mechanism. For some other flexible handle assembly embodiments which may be configured with a first reinforcement mechanism and a second reinforcement mechanism, the at least one flexible handle may be operatively coupled to the first reinforcement mechanism and operatively coupled to the second reinforcement mechanism. As such, flexible handle embodiments may be disposed on the flexible belt assembly such that a handle length axis is parallel to the spine of a patient (and parallel to a patient vertical axis 17 SEE FIG. 10), or the flexible handle embodiments may be disposed on the flexible belt assembly such that a handle length axis is perpendicular to the spine of the patient (parallel to a horizontal patient axis 19 see FIG. 10). Flexible belt embodiments which are discussed herein may include about 1 to about 6 flexible handle assemblies.

Flexible lift assist harness embodiments may be utilized in a variety of ways or any other suitable orientation discussed herein. In some cases, the torso belt of the flexible belt assembly may be secured to the torso of the patient by engaging the fixation mechanism. The at least one leg anchor assembly may then be secured to the leg of the patient and operatively coupled to the flexible belt assembly. A caregiver may then grasp a flexible handle of the torso belt assembly and assist the patient by applying a suitable tension to the flexible handle in order to assist in the mobility of the patient. Securing the at least one leg anchor assembly to the patient and operatively coupling it to the torso bely assembly may be optional. That is to say that the torso belt assembly may be used to assist in the mobility of the patient in a standalone manner, without utilizing a leg anchor assembly.

Figure 7:
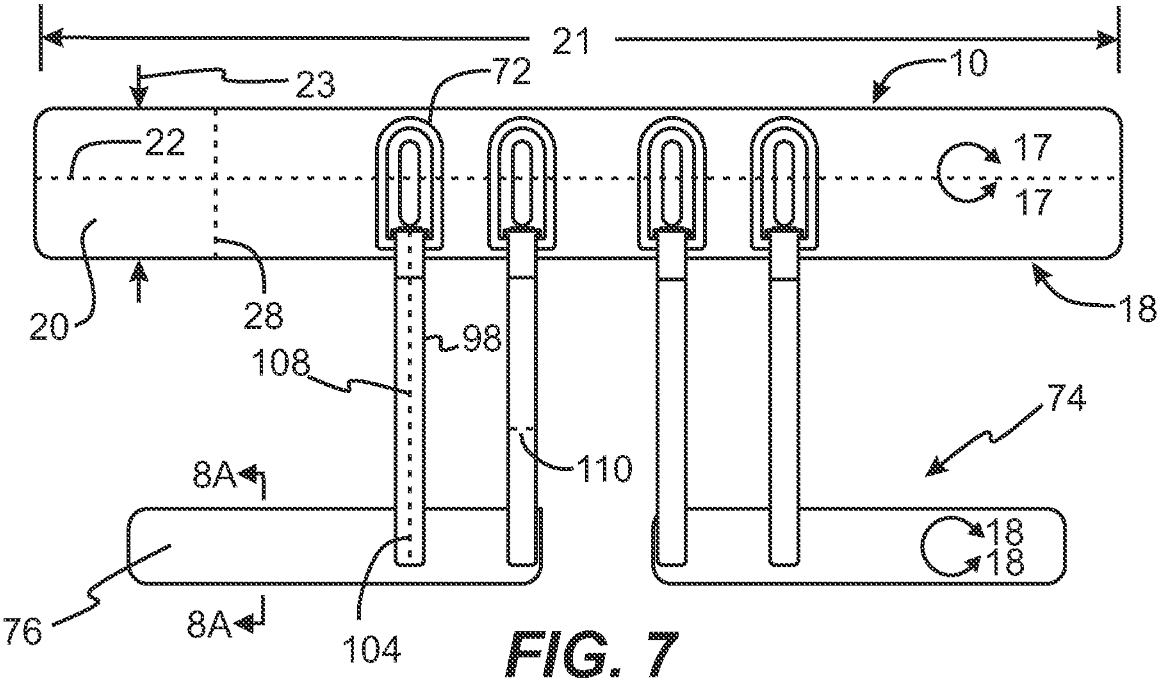
FIG. 7 is an elevation view of a lift assist harness embodiment including a flexible belt assembly, a plurality of flexible handle assemblies each including a reinforcement structure, and a plurality of leg belt assemblies.

An embodiment of a flexible lift assist harness 10 is shown in FIGS. 1-8. The flexible lift assist harness embodiment 10 is shown attached to the torso 12 and legs 14 of a patient 16 as shown in FIGS. 1-6. The patient 16 is shown as a simplified and idealized model 16 for clarity of illustration. The flexible lift assist harness embodiment 10 may include a flexible belt assembly 18 which in turn may include a torso belt 20 as shown in FIG. 7. The torso belt 20 may have a length as measured along a longitudinal axis 22 of the torso belt 20 which is sufficient to encompass a human torso 12. As discussed above, the materials of the torso belt 20 may be configured with anisotropic elastic properties. The anisotropic elastic properties allow for the torso belt 20 to be comfortably secured to the patient 16, to allow for comfortable movement of the patient 16, and to allow for the torso belt 20 to be used as a secure platform for lifting/assisting the patient 16. In some cases, the torso belt 20 may have an elongation elasticity along the longitudinal axis 22 of at least about 30 percent. Elongation elasticity is defined herein as the amount that a material layer, such as a material layer of a torso belt or the like, will elongate prior to the initiation of failure of any component of the material layer, with elongation defined as the "stretched" length (along the appropriate axis) of the material layer minus the initial length of the material layer divided by the initial length of the material layer times 100 percent. Failure of the material layer occurs when elongation of the material layer begins to initiate irreversible damage to any portion of the material layer. Such irreversible damage may include tearing, fraying, separation, or yielding of fabric components, elastomeric components, or any other component of the material layer.

Because the materials of the torso belt 20 are configured to be anisotropically elastic, the torso belt 20 may be configured to be significantly wider than a traditional lift assist belt. This may allow an increased surface area contact between an inner surface 24 of the torso belt 20 and the surface 26 of the patient's torso 12 thereby allowing for secure anchoring of the torso belt 20 to the patient 16. In some cases, the torso belt 20 may be configured with a width 23 along a transverse axis 28 of the torso belt 20 that is at least about 12 percent of a length 21 of the torso belt. The torso belt 20 may be configured with reduced elongation elasticity along its transverse axis 28 (as compared to the elongation elasticity along its longitudinal axis 22) such that the torso belt 20 may be used as a suitable and secure platform for lifting/assisting the patient 16 due to the limited stretching of the torso belt 20 materials along the transverse axis 28. The torso belt 20 may be configured with limited elongation elasticity along its transverse axis 28. In some cases the elongation elasticity along the transverse axis 28 of the torso belt 20 may be less than about 4 percent.

Figure 9:
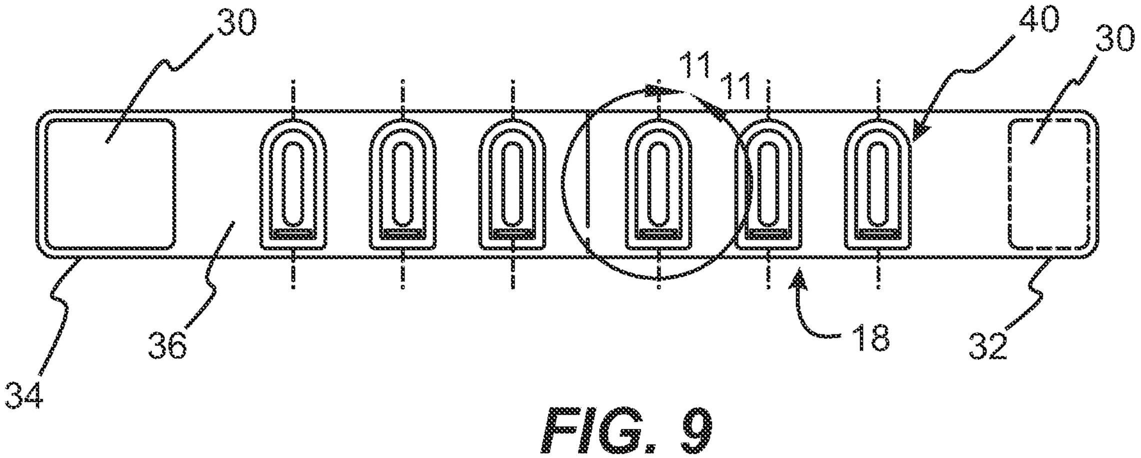
FIG. 9 is an elevation view of an embodiment of the flexible belt assembly including a plurality of flexible handle assemblies and a torso fixation mechanism.

The flexible belt assembly 18 may also include a torso fixation mechanism 30 which may be secured on a first end 32 and a second end 34 of the torso belt 20 as shown in FIG. 9. The torso belt fixation mechanism 30 may be configured to releasably secure the first end 32 of the torso belt to the second end 34 of the torso belt at a plurality of secured circumferences of the torso belt 20. The torso fixation mechanism 30 may include any suitable adjustable fixation mechanisms such as buckles, hook and loop mechanisms including Velcro® (hereafter hook and loop), snaps, zippers, or the like.

Figure 13:
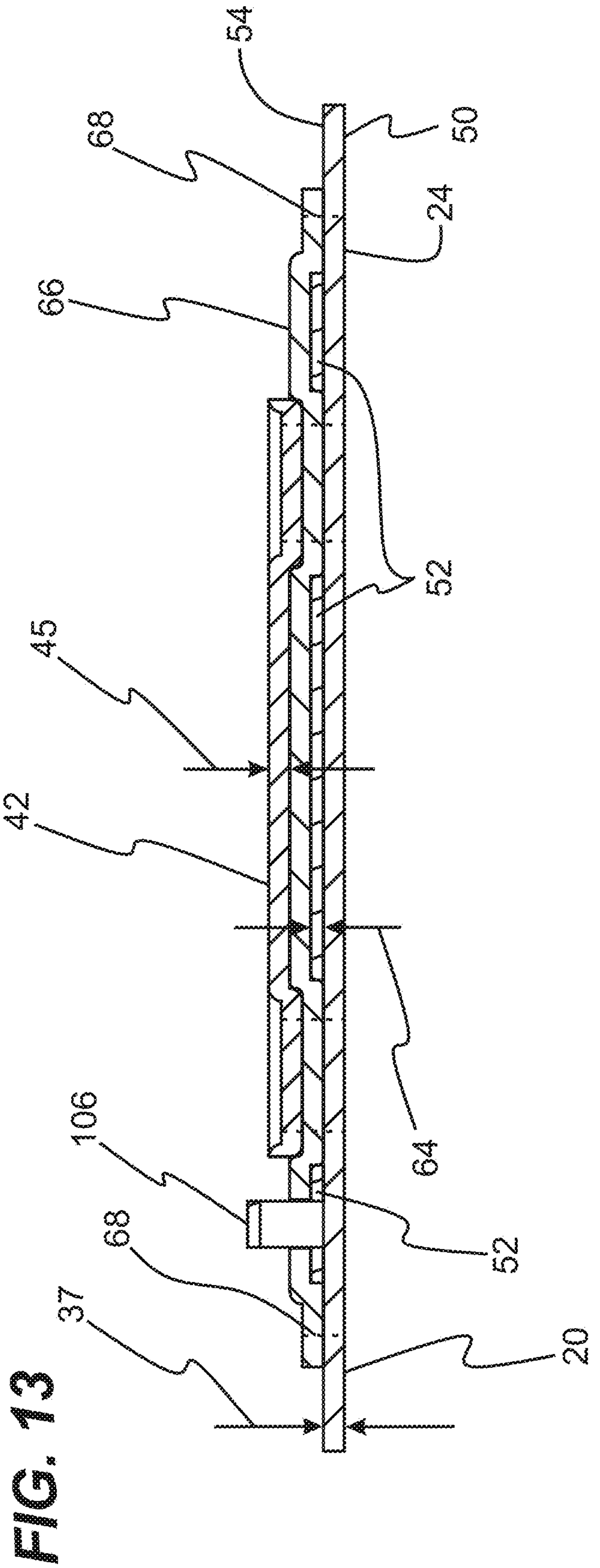
FIGS. 13-15 are section views of the flexible handle assembly embodiment of FIG. 11 depicting a caregiver grasping a flexible handle of the flexible handle assembly.
Figure 14:
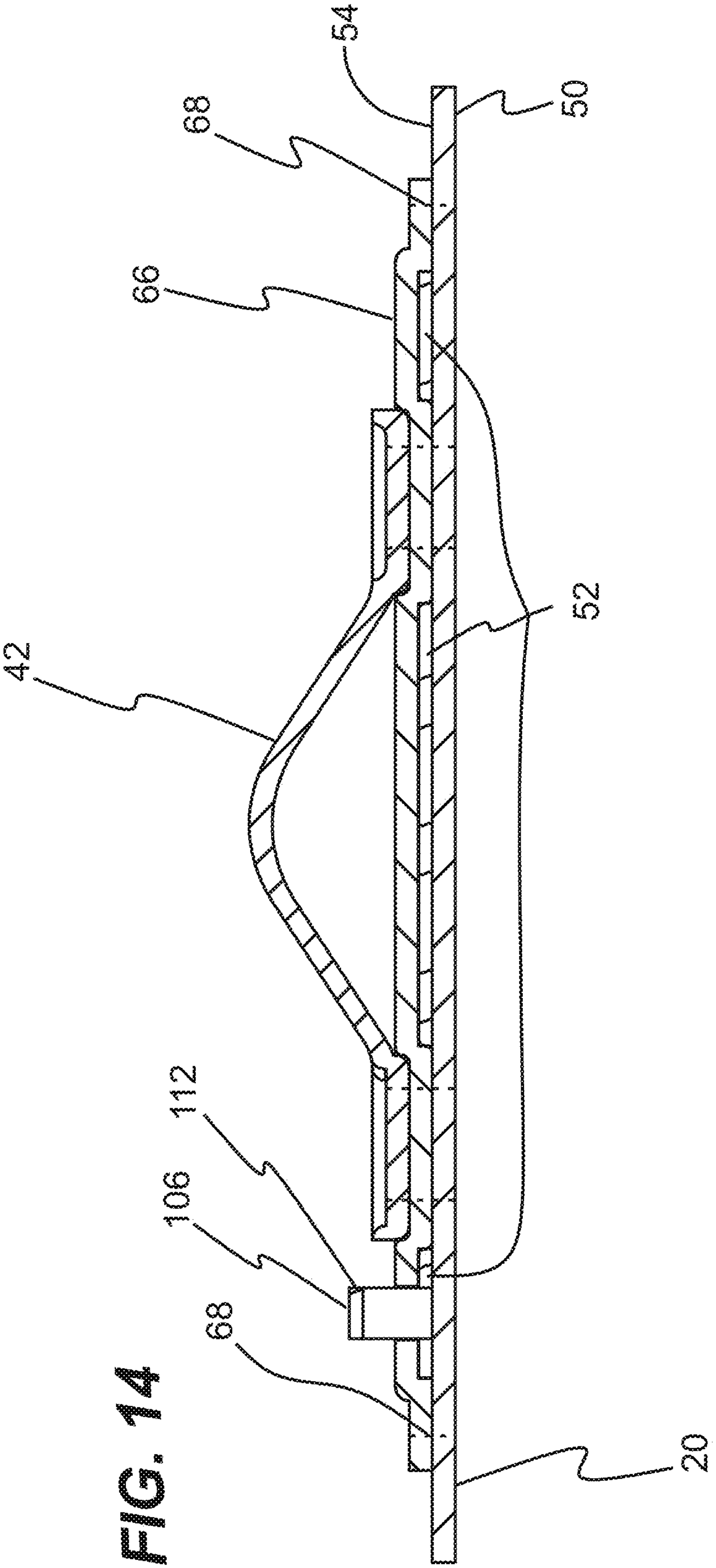

Some torso belt embodiments 20 may be formed as a continuous material layer 36 as shown in FIG. 13 wherein the material layer 36 of the torso belt 20 contains no transverse slots or holes. In some instances, the material layer 36 of torso belt 20 may be configured as a combination of materials which form a resilient, flexible, compliant composite band. For example the material layer 36 of the torso belt 20 may comprise a composite band which is fabricated from fabric component and elastomeric component. In some cases the fabric fiber component layers may be formed from polyester, nylon, polypropylene or the like. The elastomeric component of the composite band may be formed from rubber, urethane, silicone elastomer, or the like. The elastomeric component of the composite band may provide the torso belt 20 with elasticity, While the fabric component of the composite band may act in some cases to encompass the elastomeric component and act to provide the anisotropic elastic properties of the torso belt which have been discussed above. Additionally, the fabric component may be configured with anisotropic stretching properties, that is the material may stretch more along one axis when compared to stretching along another axis of a given fabric component segment. This may be accomplished via the weave pattern used to fabricate the fabric component segment. In some cases, the elongation elasticity along the longitudinal axis 22 of the torso belt 20 may be about 30 percent to about 50 percent, and the elongation elasticity along the transverse axis 28 of the torso belt 20 may be about 2 percent to about 4 percent. As an example the torso belt 20 may be fabricated from 8 inch wide heavy stretch high elasticity knit elastic band, which is fabricated from 69 percent polyester and 31 percent rubber. However a composite band with any suitable combination of fabric and elastomer may be utilized.

Figure 33:
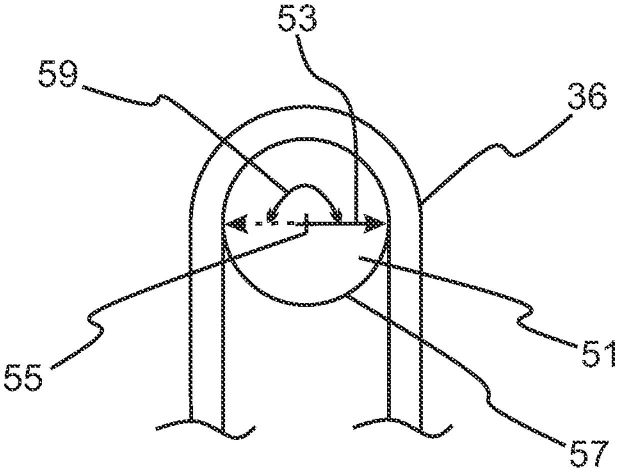
FIG. 33 a sectional view of a cylindrical compliance fixture and a material layer of a torso belt disposed thereover.

In order to properly conform to the contours of the patient's body and properly anchor to the patient's body the torso belt 20 may be suitably compliant in many cases. Therefore, the material layer 36 of the torso belt 20 may be fabricated from suitably compliant materials. In some cases, the material layer 36 of the torso belt 20 may exhibit a compliancy when disposed about a cylindrical compliance fixture 51 which may be configured as a cylinder having a cylindrical radius 53 and a fixture longitudinal axis 55 with the fixture longitudinal axis 55 disposed horizontally as shown in FIG. 33. Compliancy of the torso belt 20 may be defined as adequate radial surface contact between the torso belt 20 and an outer surface 57 of the cylindrical compliance fixture 51 when a one foot length of the material layer 36 of the torso belt 20 is placed on the cylindrical compliance fixture 51 such that a substantially equal portion of the material layer 36 is draped on either side of the cylindrical compliance fixture 51 with the weight of the draped material tensioning the portion of the material layer 36 which contacts the cylindrical compliance fixture 51. For the material layer 36 to adequately comply with the outer surface 57 of the cylindrical compliance fixture 51 the material layer 36 must in some cases contact a surface area of the cylindrical compliance fixture which may include a circumferential arc 59 which can span from about 170 degrees to about 180 degrees of the outer surface 57 of the cylindrical compliance fixture 51 as measured by rotation of the cylindrical radius 53 about the fixture longitudinal axis 55. For some embodiments, the material layer 36 of the torso belt 20 may have a compliance to adequately conform to a cylindrical compliance fixture 51 having cylindrical radius 53 of about 0.75 inches or greater. In some cases, the material layer 36 of the torso belt 20 may have a compliance to adequately conform to a cylindrical compliance fixture 51 having a cylindrical radius 53 of from about 0.75 inches to about 1.25 inches.

As discussed above the torso belt 20 may be configured with elastic properties (stretching) which may include anisotropic elastic properties, which allow for comfortable walking/exercising/sitting/breathing of the patient while the patient is utilizing the torso belt 20. In some cases, the material layer 36 of the torso belt 20 may comprise a total spring constant along its longitudinal axis 22 of about 1.15 lb/in to about 1.50 lb/in of longitudinal length of the torso belt 20.

Embodiments of the flexible lift assist harness 10 may be configured to fit a wide variety of body types, and as such may be configured in different sizes such as small, medium, large, and extra large. In some instances the torso belt 20 may have the longitudinal length 21 along the longitudinal axis 22 of about 25 inches to about 70 inches. In some cases torso belt embodiments 10 may be configured with a transverse width 23 along the transverse axis 28 of about 10 percent to about 14 percent of the length 21. In some cases for such embodiments, the width 23 may be from about 6 inches to about 10 inches. Additionally, the material layer 36 which form the composite band may be configured an a generally rectangular shape when laid on a flat surface. In some instances, the material layer 36 of the torso belt 20 may form a thin continuous layer having a thickness 37 (see FIG. 13) which is about 100 times to about 200 times thinner than the width of the torso belt 20. In some cases the torso belt may have a thickness of about 0.040 inches to about 0.080 inches. In some instances, the material layer 36 of the torso belt 20 may be formed as a thin fenestrated layer of composite material (not shown), the holes in the material layer 36 of the torso belt 20 allowing for ventilation and heat transfer between the surface of the skin 38 (see FIG. 10) of the patient 16 and the environment.

Figure 11:
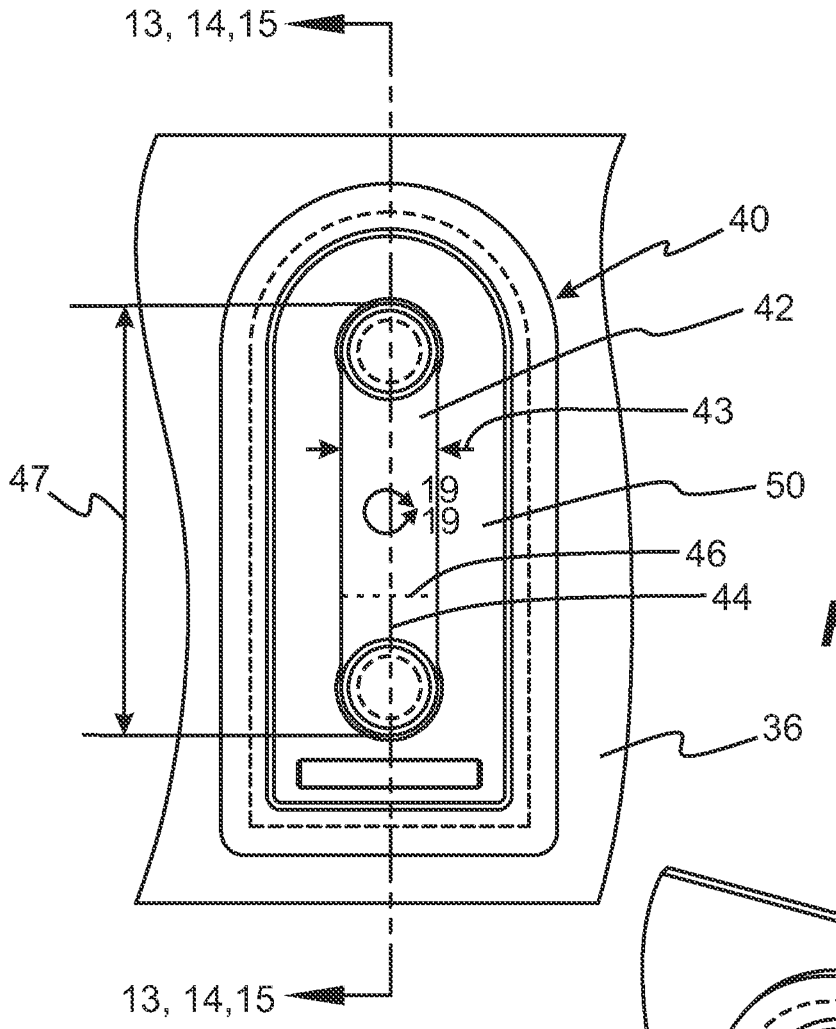
FIG. 11 is a detail view in elevation of the flexible belt assembly of FIG. 9 depicting a flexible handle assembly including a reinforcement structure embodiment.
Figure 12:
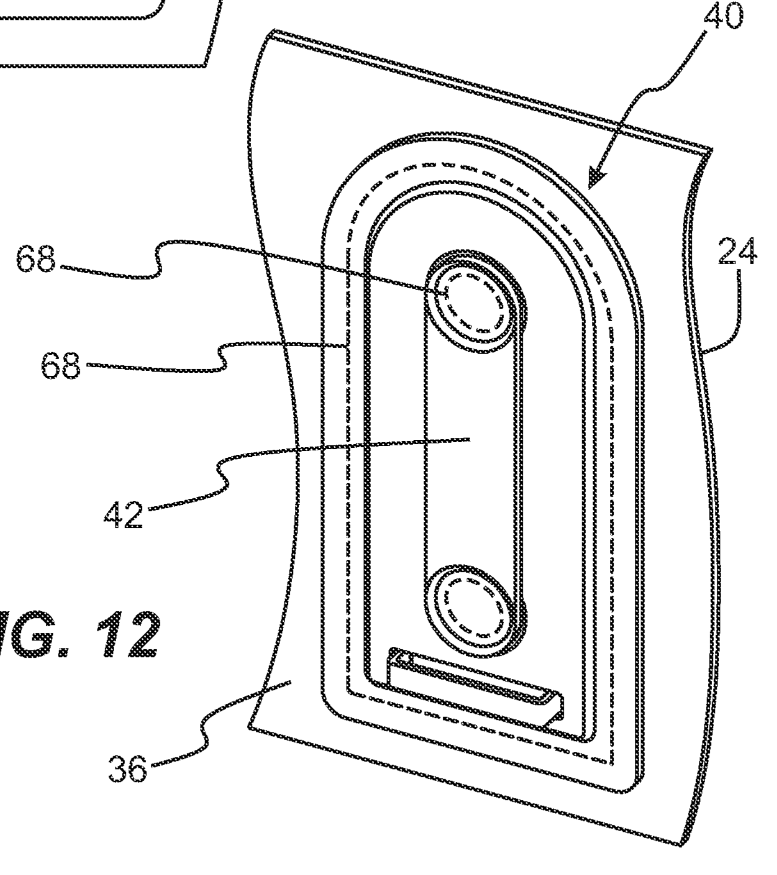
FIG. 12 is a perspective view of the flexible handle assembly embodiment of FIG. 11.

The flexible belt assembly 18 may also include at least one flexible handle assembly 40 which is disposed on the torso belt 20. The flexible handle assembly 40 may include a flexible handle 42 which may have an elongate ribbon-like configuration and which may be configured to have an elongation elasticity along a handle length axis 44 as shown in FIG. 11 of at least about 20 percent. Additionally the flexible handle 42 may have a limited elongation elasticity along a transverse axis 46 of the flexible handle 42 of less than about 2 percent. Additionally, the flexible handle 42 may be configured to lie flat in a stretched state when not in use so as not to poke or prod the patient 16 when the patient 16 is sitting or lying down. The flexible handle 42 may thus be configured with anisotropic elastic properties, the anisotropic elastic properties allowing for the flexible handle 42 to lie flat against the flexible belt assembly 18 when the flexible handle 42 is not in use and to expand away from the flexible belt assembly 18 when the flexible handle is grasped by a caregiver's hand 48 as shown in sections in FIG. 15.

In some instances, the flexible handle 42 may have an elongation elasticity along its handle length axis 44 of about 20 percent to about 40 percent. Additionally, the flexible handle 42 may have an elongation elasticity along its transverse axis 46 of about 1 percent to about 2 percent. In some cases a material layer 50 of the flexible handle 42 may be formed as a composite of different materials. For example the flexible handle 42 material layer 50 may comprise a handle composite band which is fabricated from fabric component and elastomeric component. In some cases the fabric fiber component layers may be formed from polyester, nylon, polypropylene or the like. The elastomeric component of the handle composite band may be formed from rubber, urethane, silicone elastomer, or the like. The elastomeric component of the handle composite band may provide the flexible handle 42 with elasticity, while the fabric component of the handle composite band may act in some cases to encompass the elastomeric component and act to provide the anisotropic elastic properties of the flexible handle which have been discussed above. In some cases the flexible handle 42 may have a width 43 of about 1 inch to about 3 inches, a length 47 of about 4 inches to about 6 inches, and a thickness 45 of about 0.125 inches to about 0.250 inches.

Figure 16:
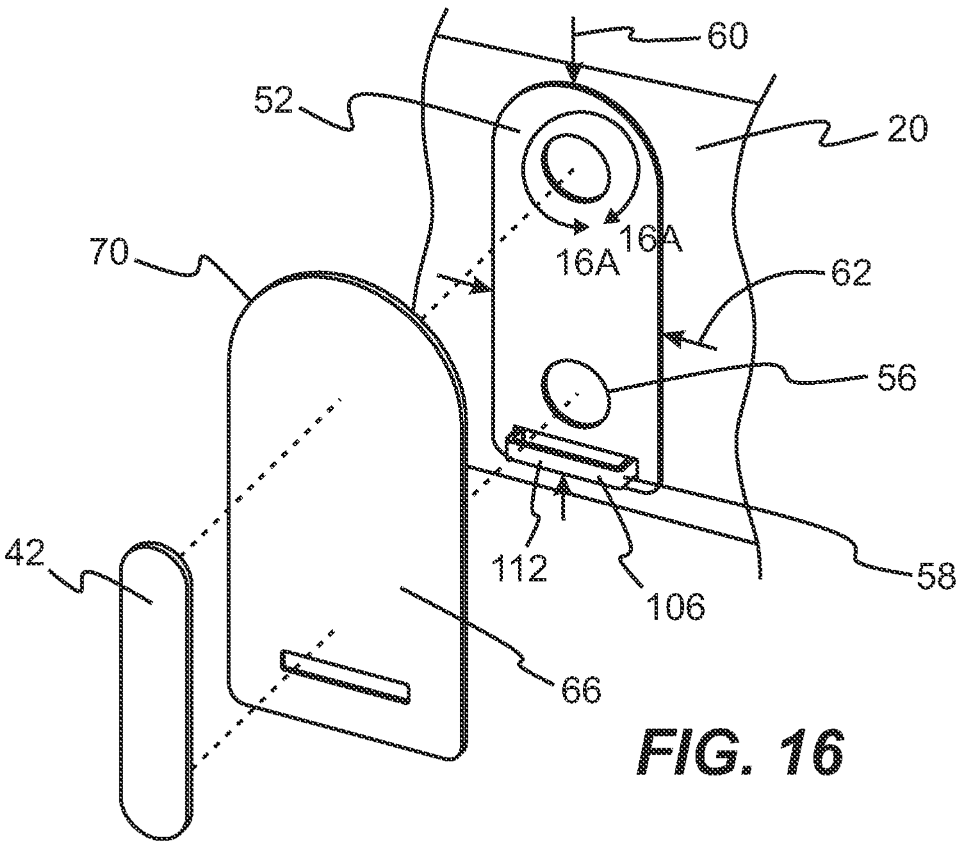
FIG. 16 is an exploded view of the flexible handle assembly embodiment of FIG. 11 including the flexible handle, a flexible insert having multiple handle anchor apertures, and an insert cover.

Some embodiments the flexible handle assembly 40 may include a flexible insert 52 as shown in FIG. 13 which may be disposed adjacent to and secured to the torso belt 20 and which may be formed from a thin resilient layer of flexible material. The flexible insert 52 may be operatively coupled between the flexible handle 42 and an outer surface 54 of the torso belt 20. The flexible insert 52 may act to distribute the tension across a broad surface area of the torso belt 20 when a caregiver applies tension to the flexible handle 42 in order to assist the patient 16, thus the flexible insert 52 may minimize or prevent "tenting" of the torso belt 20 around the flexible handle assembly 40 when tension is applied to the flexible handle 42. In addition the flexible insert 52 may act to support the spine of the patient 16 while the patient 16 is being assisted. In some cases the flexible insert 52 may also include at least one handle anchor aperture 56 and an insert strap coupler 58 as shown in FIG. 16. The handle anchor aperture 56 may include an aperture disposed through the flexible insert and may be configured with any suitable profile including a circular profile, a rectangular profile, or an elliptical profile.

In some instances the flexible insert 52 may be formed from any suitable thin self-supporting resilient layer of flexible material such as a polymer, metal, composite, or the like that is configured to elastically deform and return to its substantially original shape. Suitable polymer materials may include polypropylene, polycarbonate, polyester, urethane, or the like. In some cases the flexible insert 52 may be formed from a suitable composite material. For some embodiments, the flexible insert 52 may have a longitudinal length 60 as shown in FIG. 16 of about 4 inches to about 8 inches, and may have a transverse width 62 is about 2 inches to about 5 inches. The flexible insert 52 may be configured with a suitable thickness 64 such that it remains flexible, while at the same time is able to provide support to the spine of the patient 16 while the patient is being assisted. In some instances, the flexible insert 52 may have a thickness 64 of about 0.040 inches to about 0.080 inches.

Figure 15:
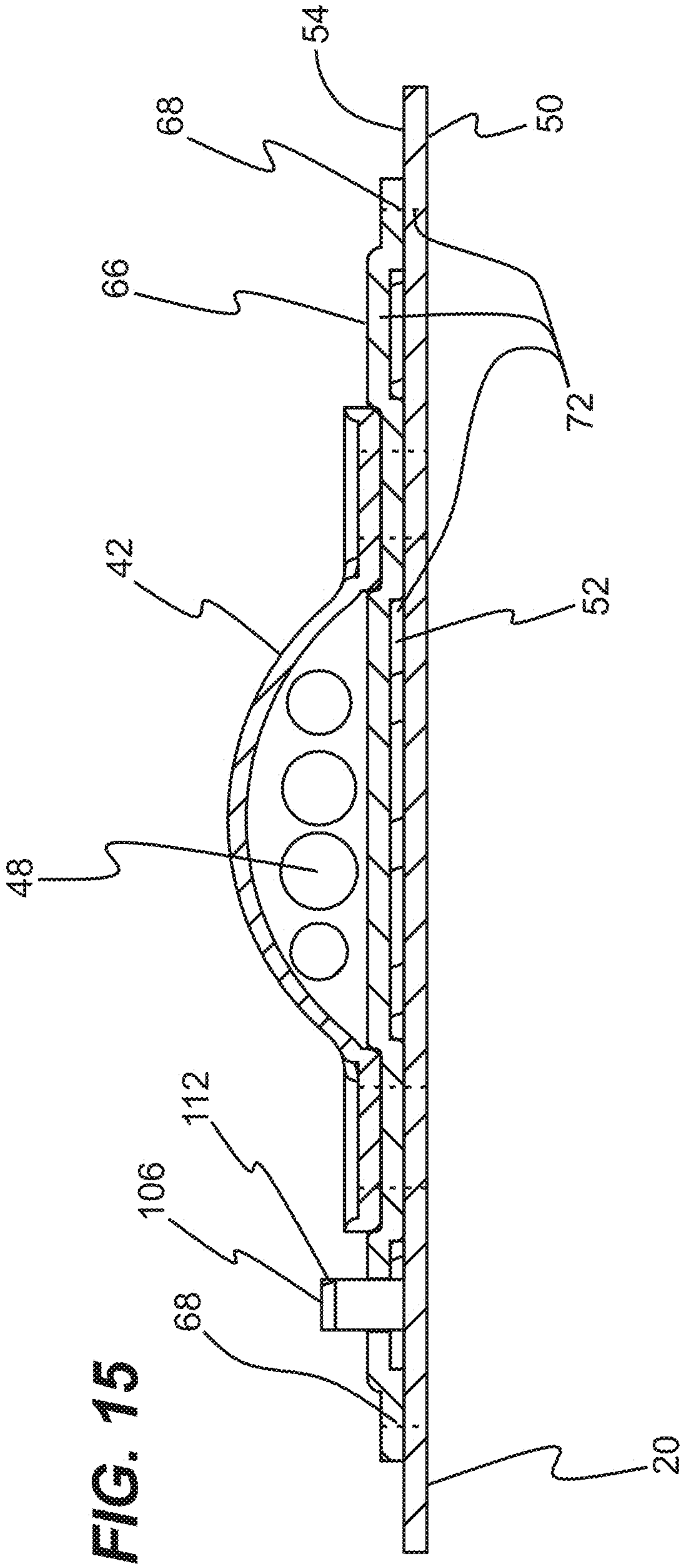

Some embodiments of the flexible handle assembly may also include an insert cover 66 as shown in FIG. 15. The insert cover 66 may be disposed between the flexible handle 42 and the flexible insert 52, with the flexible insert 52 being sized such that the flexible insert 52 is substantially encompassed about its perimeter by the insert cover 66. The flexible insert 52 may also be disposed between the torso belt 20 and the insert cover 66. In some cases the insert cover 66 may be configured as a mesh or a weave, with the fibers of the mesh or weave being formed from any suitable materials. For example, fiber materials of the insert cover 66 may include polymers such as nylon, polyurethane, polyester, or the like. In some cases, the fiber materials of the insert cover 66 may include natural materials such as cotton, wool, or the like.

Figure 16A:
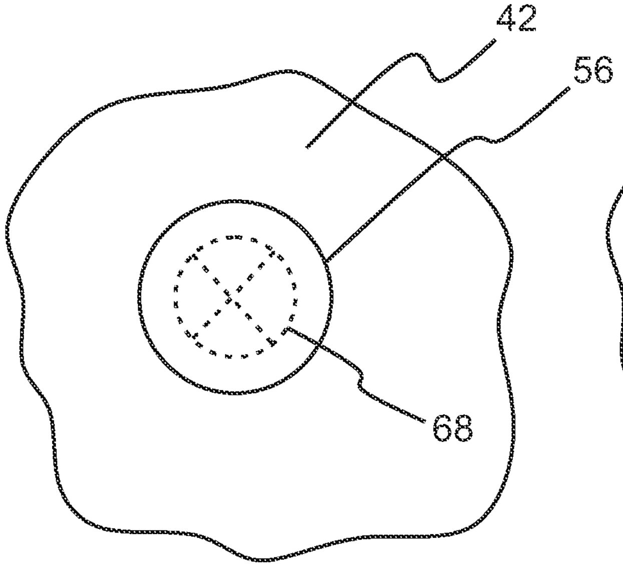
FIGS. 16A and 16B depict different embodiments of flexible inserts with various handle anchor aperture profiles, as well as different embodiments of insert lock features which operatively couple the respective flexible handles to the torso belt through the respective handle anchor apertures.
Figure 16B:
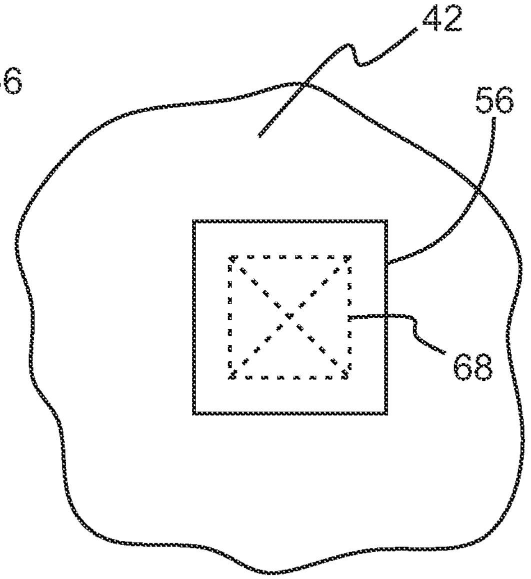
Figure 17:
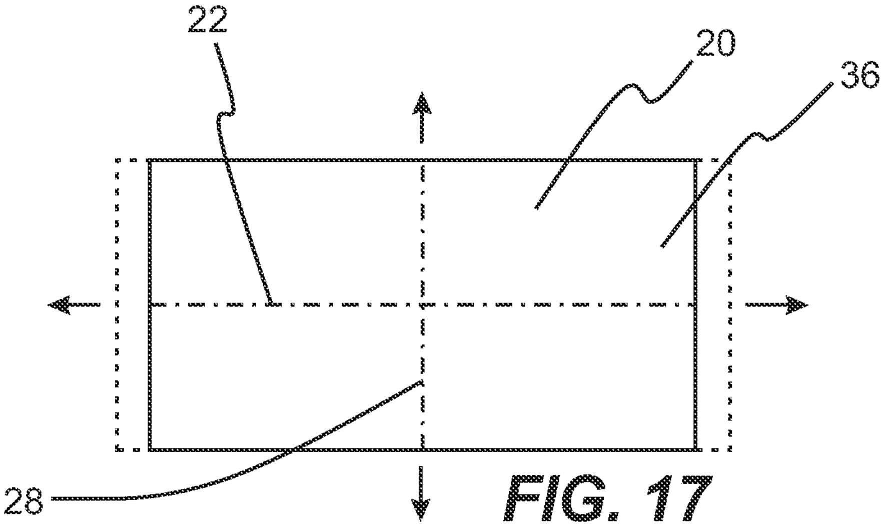
FIG. 17 is a detail view of the torso belt embodiment of FIG. 7 depicting elongation elasticity along a longitudinal axis and along a transverse axis of the torso belt.
Figure 18:
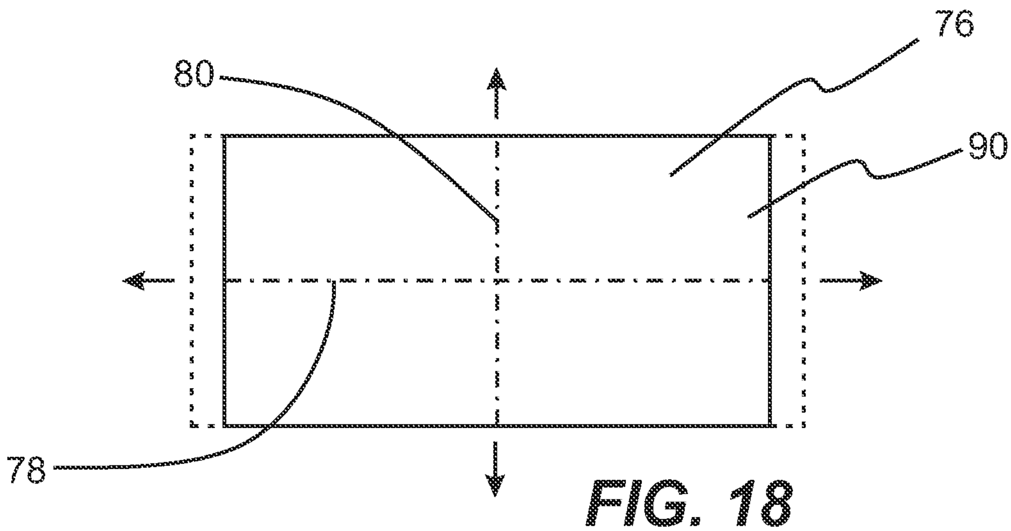
FIG. 18 is a detail view of the leg belt embodiment of FIG. 7 depicting elongation elasticity along a longitudinal axis and along a transverse axis of the leg belt.
Figure 19:
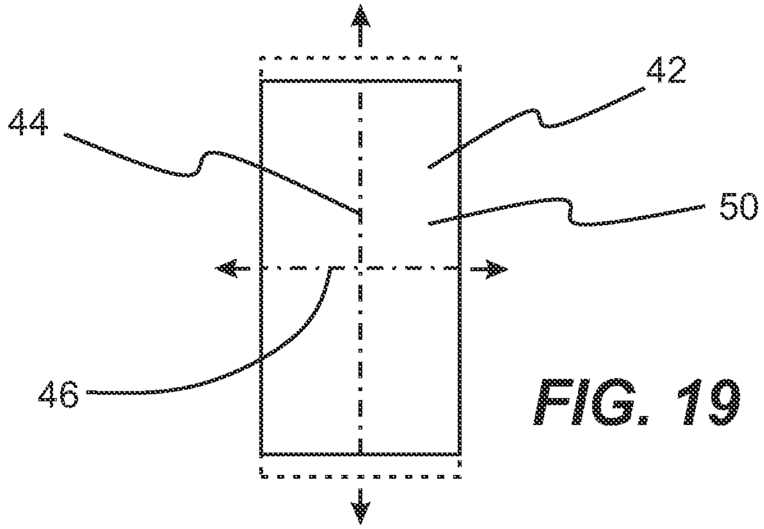
FIG. 19 is a detail view of the flexible handle embodiment of FIG. 11 depicting elongation elasticity along a handle length axis and along a transverse axis of the flexible handle.
Figure 20:
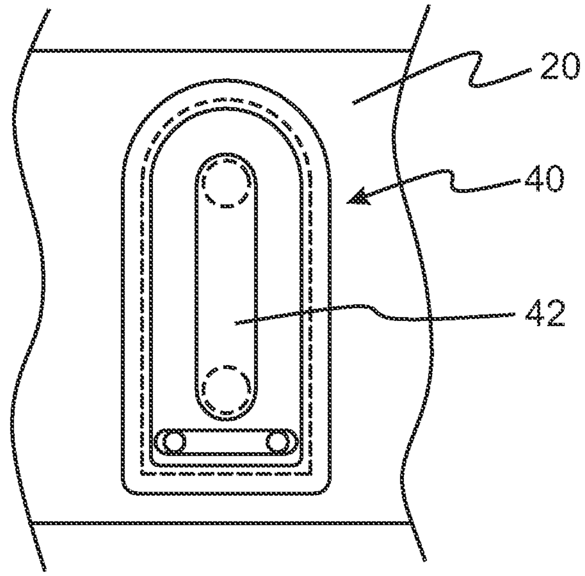
FIG. 20 is a detail view of an embodiment of a flexible handle assembly including a reinforcement structure and having a detachable anchor strap terminal.

Some flexible handle assembly embodiments 40 may also include at least one insert lock feature 68 which may be configured to operatively couple the flexible handle 42 to the torso belt 20 through the at least one handle anchor aperture 56. Further, the insert lock feature 68 may be disposed about a perimeter of the insert cover thereby operatively coupling the insert cover to the torso belt about a perimeter 70 of the insert cover 66. In some instances, the insert lock feature 68 may be configured as fabric stitches, staples, rivets, or the like. FIGS. 16A and 16B depict different embodiments of handle anchor apertures 56 and insert lock features 68.

FIG. 16A depicts a handle anchor aperture 56 embodiment with a circular profile, and an insert lock feature 68 pattern configured as a circular pattern combined with an "X" pattern. The insert lock feature embodiment 68 depicted in FIG. 16A may be configured as stitches, rivets, staples, or the like. FIG. 16B depicts a handle anchor aperture 56 embodiment with a rectangular profile, and an insert lock feature 68 pattern configured as an offset rectangular pattern combined with an "X" pattern. The insert lock feature 68 embodiment depicted in FIG. 16B may be configured as stitches, rivets, staples, adhesive, or the like.

In some cases the flexible insert 52, insert cover 66, and insert lock feature 68 may form a reinforcement mechanism 72 of the flexible handle assembly 40 as shown in FIG. 15. In some other cases, an insert cover 66 and an insert lock feature 68 may form the reinforcement mechanism 72. The reinforcement mechanism 72 may be configured to distribute the tension applied to the at least one flexible handle 42 by a caregiver over a suitable surface area of the torso belt 20. The distribution of the tension applied by a caregiver to the flexible handle 42 over a suitable area of the torso belt 20 by the reinforcement mechanism 72 may be suitable to reduce tenting of the torso belt 20 away from the torso 12 of the patient 16 thereby making the flexible belt assembly 18 a suitable platform for lifting/assisting the patient 16.

Figure 8:
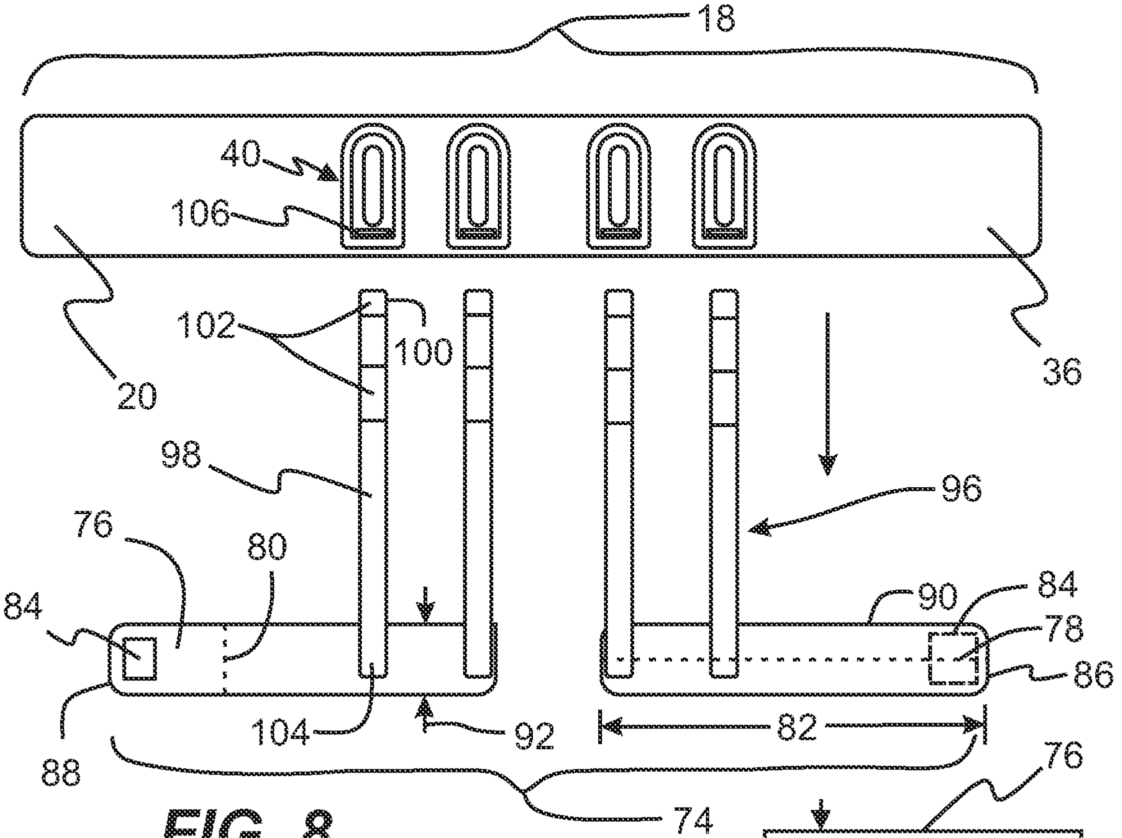
FIG. 8 is an elevation view of the lift assist harness embodiment of FIG. 7 with the leg belt assemblies releasably detached from the flexible belt assembly.
Figure 8A:
FIG. 8A is a transverse cross section view of the leg belt of FIG. 8 taken across lines 8A-8A of FIG. 8.

Referring to FIGS. 7-8A, embodiments of the flexible lift assist harness 10 may also include at least one leg anchor assembly. The leg anchor assembly may be operatively coupled to the torso belt 20 and may be configured to prevent slipping of the torso belt 20 along the patient's torso 12 when significant tension is applied to the flexible handle 42. In some cases the at least one leg anchor assembly may include a leg belt assembly 74. The leg belt assembly 74 may include a leg belt 76 which may be configured to have an elastic elongation along a longitudinal axis 78 of the leg belt 76 of at least about 40 percent. In addition, the leg belt 76 may have limited elastic elongation along a transverse width axis 80 of the leg belt 76 of less than about 5 percent. In some instances, the leg belt 76 may have a length 82 along its longitudinal axis 78 which is sufficient to elastically and securely encompass a human thigh. The leg belt assembly 74 may also include a leg belt fixation mechanism 84 disposed on a first end 86 and a second end 88 of the leg belt 76 which may be configured to releasably secure the first end 86 of the leg belt 76 to the second end 88 of the leg belt 76 at a plurality of secured circumferences of the leg belt 76. Some embodiments of the leg belt fixation mechanism 84 may include hook and loop, buckles, snaps, zippers, or the like.

Some leg belt embodiments may be formed as a continuous material layer as shown in FIG. 8 wherein the material layer of the leg belt contains no transverse slots or holes. A leg belt material layer 90 that in some cases may have the same features, dimensions, and materials of the torso belt 20 may be configured as a combination of materials which form a resilient, flexible, compliant composite leg band. For example the leg belt material layer 90 may comprise a composite leg band which is fabricated from a fabric component or components and an elastomeric component or components. In some cases the fabric component may be formed from polyester, nylon, polypropylene or the like. The elastomeric component of the composite band may be formed from rubber, urethane, silicone elastomer, or the like. The elastomeric component of the composite leg band may provide the leg belt 76 with elasticity, while the fabric component of the composite leg band may act in some cases to encompass the elastomeric component and act to provide the anisotropic elastic properties of the leg belt 76 which have been discussed above. For some leg belt embodiments 76, the leg belt material layer 90 may be formed from black knit elastic heavy stretch band which is 85 percent polyester and 15 percent rubber. However, any suitable elastic band and ratio of elastomeric components and fabric components may be used to form the leg belt material layer 90.

In some cases, the elongation elasticity along the longitudinal axis 78 of the leg belt 76 maybe about 40 percent to about 60 percent. In addition, the elongation along the transverse axis 80 of the leg belt 76 may be about 2 percent to about percent. In some instances, the material layer 90 of the leg belt 76 may have a total spring constant along the longitudinal axis 78 of the leg belt of about 0.40 lb/in to about 0.70 lb/in of longitudinal length of the leg belt. For some embodiments, the longitudinal length 82 of the leg belt 76 may be from about 16 inches to about 25 inches, a transverse width 92 of the leg belt 76 may be from about 2 inches to about 6 inches, and a thickness 94 of the leg belt 76 may be from about 0.040 inches to about 0.080 inches.

Figure 28:
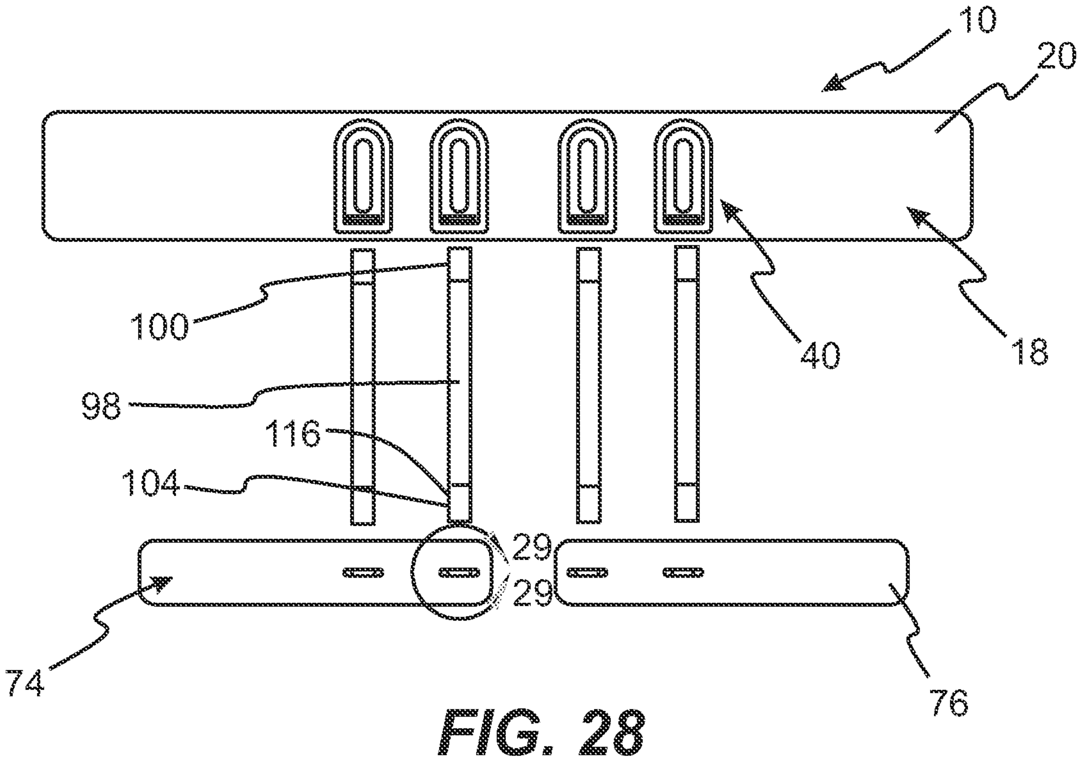
FIG. 28. Is an elevation view of a flexible lift assist harness embodiment wherein each anchor strap is detachably secured to the flexible belt assembly and to the leg belt assembly.

Referring to FIGS. 7, 8, and 28, the leg belt assembly 74 may also include at least one anchor strap assembly 96. The anchor strap assembly 96 may be configured to operatively couple the leg belt assembly 74 to the flexible belt assembly 18 at any suitable location of the flexible belt assembly 18 such as at a reinforcement mechanism 72 of the flexible belt assembly 18. The anchor strap assembly 96 may include an anchor strap 98 having a second end 104 which may be secured to the leg belt 76, and a coupling mechanism 102 which may be secured to a first end 100 of the anchor strap 98. The coupling mechanism 102 may be configured to operatively and adjustably couple the first end 100 of the anchor strap 98 to an anchor strap terminal 106 of the flexible handle assembly 40. Leg belt embodiments which are discussed herein may include about 1 to about 3 anchor strap assemblies.

In some instances the anchor strap 98 may have an elongation elasticity along a longitudinal axis 108 of the anchor strap 98 of about 1 percent to about 4 percent. Additionally the anchor strap 98 may have an elongation elasticity along a transverse axis 110 of the anchor strap 98 of about 1 percent to about 4 percent. The anchor strap 98 may be formed from any suitable material or combination of materials. In some cases, a material of the anchor strap 98 may be formed from any suitable synthetic (polyester, nylon, or the like) or natural fabric (cotton, wool, or the like). In some other cases the anchor strap 98 may be formed as an elastic band having a ribbon like configuration with any suitable combination of fabric components and elastomeric components such as for the torso belt 20 and leg belt 76 which have been discussed above. In some cases, the anchor strap 98 may be configured to have a limited elastic elongation of less than about 4 percent along the longitudinal axis 108.

Figure 21:
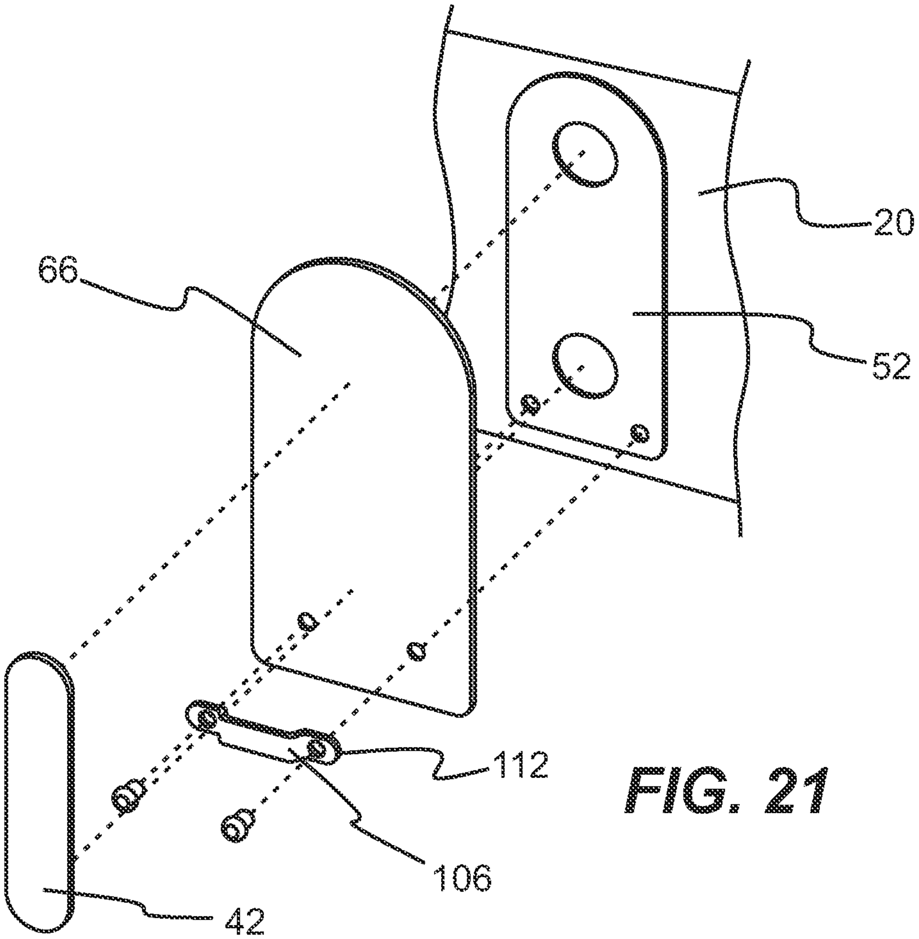
FIG. 21 is an exploded view of the flexile handle assembly embodiment of FIG. 20.
Figure 22:
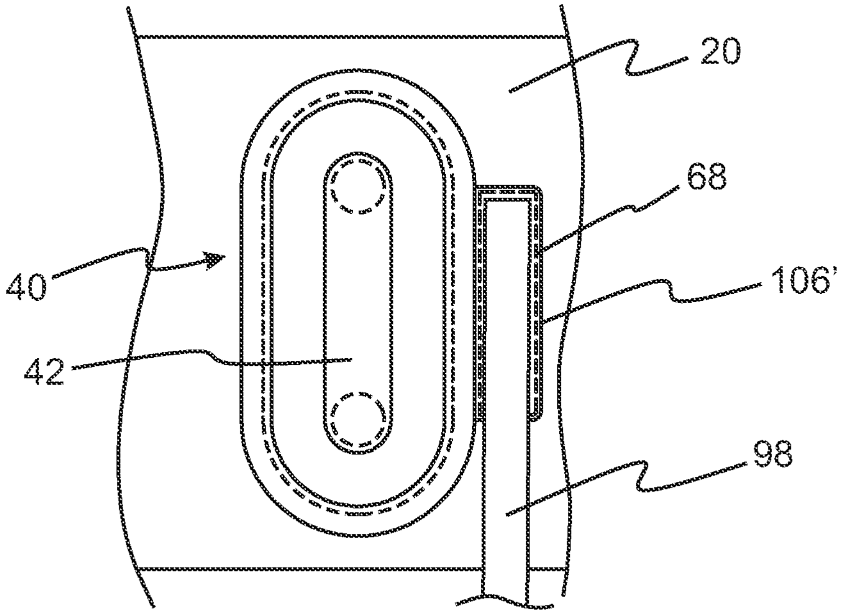
FIG. 22 is a detail view of an embodiment of a flexible handle assembly having a reinforcement structure, with the anchor strap terminal disposed on the insert cover.
Figure 23:
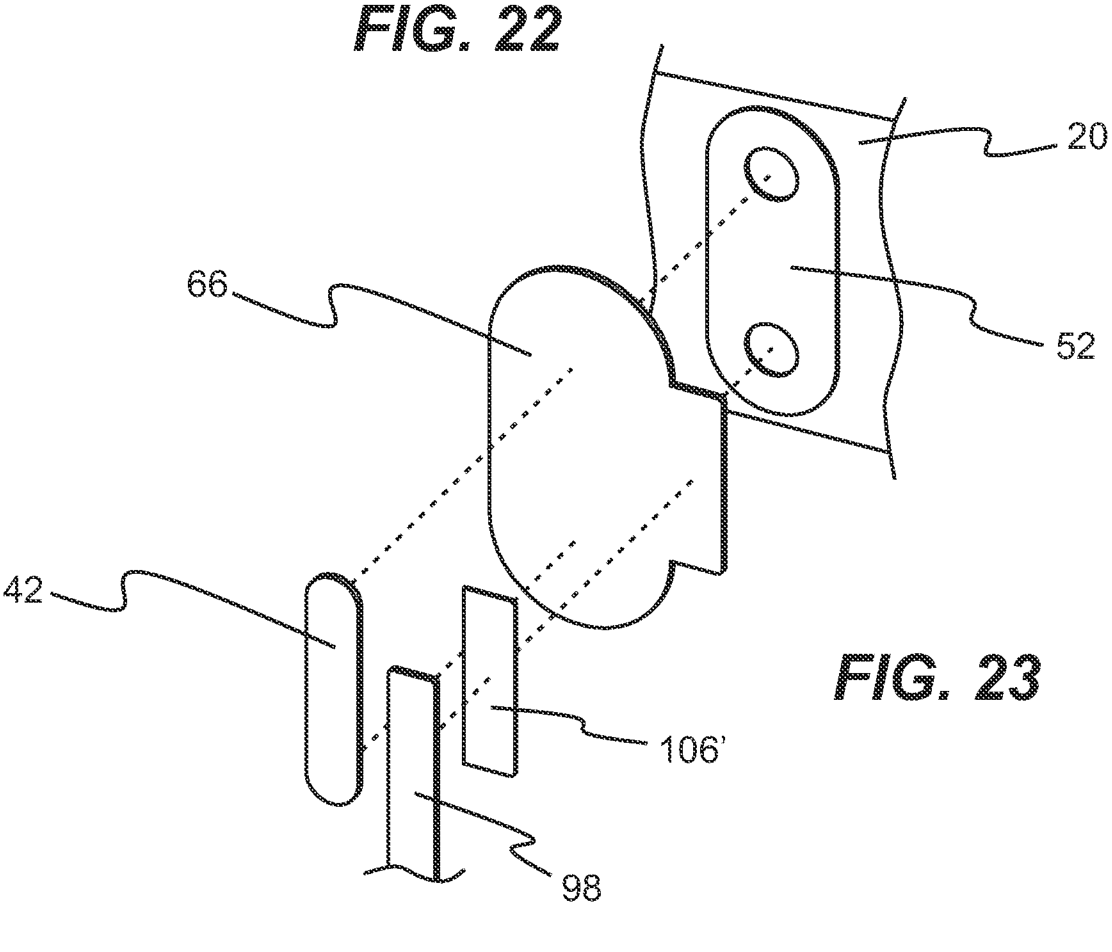
FIG. 23 is an exploded view of the flexible handle assembly embodiment of FIG. 22.

In some instances the anchor strap terminal 106 may be configured as a buckle 112 which may be operatively coupled to the flexible insert 52 of the flexible handle assembly 40 as shown in FIGS. 13-16 and 28-29. The buckle 112 may be operatively coupled to the flexible insert 52 by any suitable method including staples, rivets (see FIG. 21), stitches, or adhesive, or the buckle 112 may be monolithically formed into the thin resilient layer of material of the flexible insert 52 as shown in FIG. 16. The coupling mechanism 102 which is secured at the second end 104 of the anchor strap 98 as shown in FIG. 8 may be configured as hook and loop, a buckle assembly, snaps, or any other suitable coupling mechanism. For some flexible lift assist harness embodiments 10, the anchor strap terminal embodiment 106' may be operatively coupled to the insert cover 66 of the flexible handle assembly 40 as shown in FIG. 22. For this embodiment the anchor strap terminal 106' may be configured to include hook and loop structure, a buckle or snaps, and the coupling mechanism 102 disposed at the second end 104 of the anchor strap 98 may be configured as respective hook and loop structure, buckle, or snaps. The first end 100 of the anchor 98 strap may be secured to the leg belt 76 by any suitable means such as stitching, staples, rivets, adhesive, or the like.

The anchor strap 98 may be operatively coupled between the torso belt 20 and the leg belt 76 by any suitable means 76, wherein the first end 100 of the anchor strap 98 may be releasably secured to the torso belt 20 and the second end 104 of the anchor strap 98 may be permanently secured to the leg belt 76. Or the first end 100 of the anchor strap 98 may be permanently secured to the torso belt 20 and the second end 104 of the anchor strap 98 may be releasably secured to the leg belt 76. In addition in some cases, the first end 100 of the anchor strap 98 may be releasably secured to the torso belt 20 and the second end 104 of the anchor strap 98 may be releasably secured to the leg belt 76. Also, both the first end 100 of the anchor strap 98 may be permanently secured to the torso belt 20 and the second end 104 of the anchor strap 98 can be permanently secured to the leg belt 76 in some instances.

Figure 29:
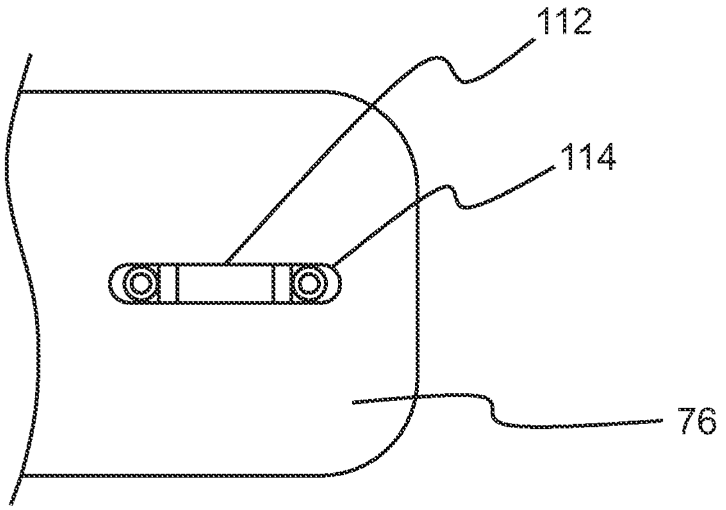
FIG. 29 is a detail view of the flexible lift assist harness embodiment of FIG. 28 indicated by the encircled portion 29-29 in FIG. 28.

In some cases a leg coupling mechanism which may be secured to the second end 104 of the anchor strap 98 may be operatively and releasably coupled to a leg belt terminal 114 which may be secured to the leg belt 76 as shown in FIGS. 28 and 29. The leg belt terminal 114 may be configured as a buckle disposed on the leg belt 76 (see FIG. 29), and the leg coupling mechanism 116 may be configured as hook and loop structure, a buckle, snaps, or the like. Or in some cases the leg belt terminal 114 and leg coupling mechanism 116 may be configured as mating hook and loop mechanism.

Figure 24:
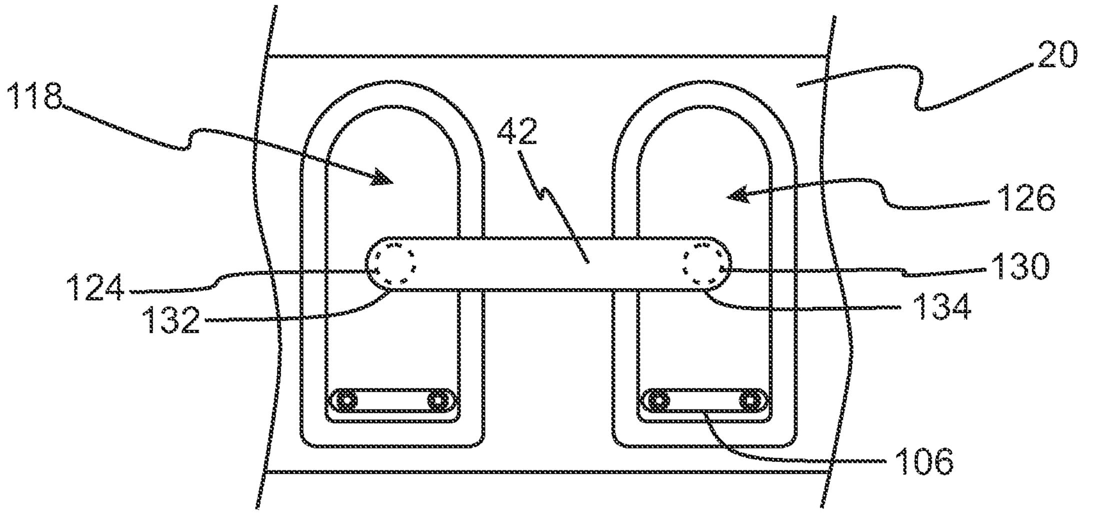
FIG. 24 is a detail view of a torso belt assembly embodiment including two flexible handle assemblies each having a respective reinforcement structure, and a flexible handle embodiment operatively coupled between the respective reinforcement structures of the two flexible handle assemblies.
Figure 25:
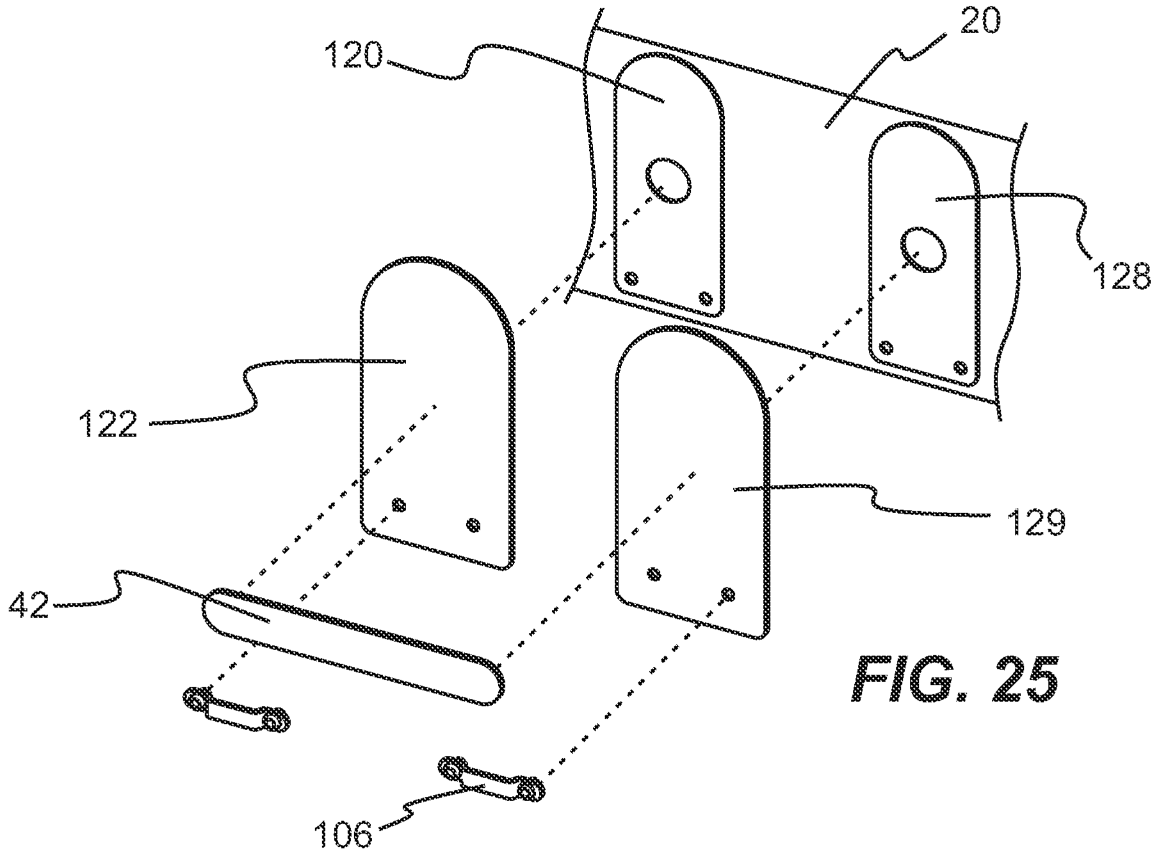
FIG. 25 is an exploded view of the torso belt assembly embodiment shown in FIG. 24.
Figure 26:
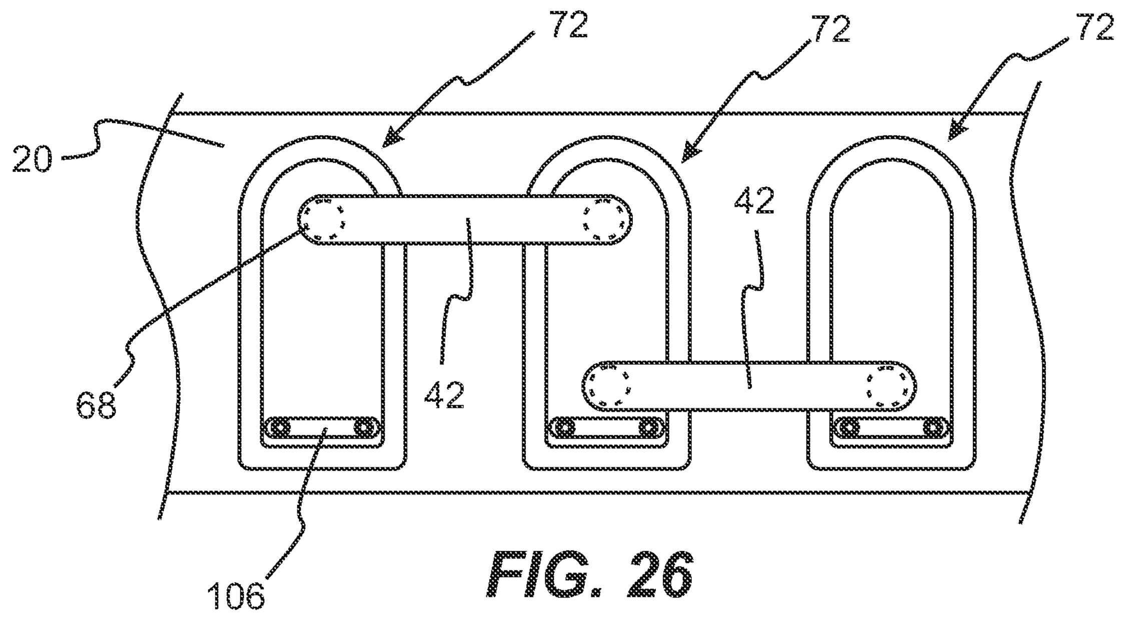
FIG. 26 is a detail view of a torso belt assembly embodiment including three flexible handle assemblies each having a respective reinforcement structure, and two flexible handles operatively coupled between each of the three respective reinforcement structures of the three flexible handle assemblies.
Figure 27:
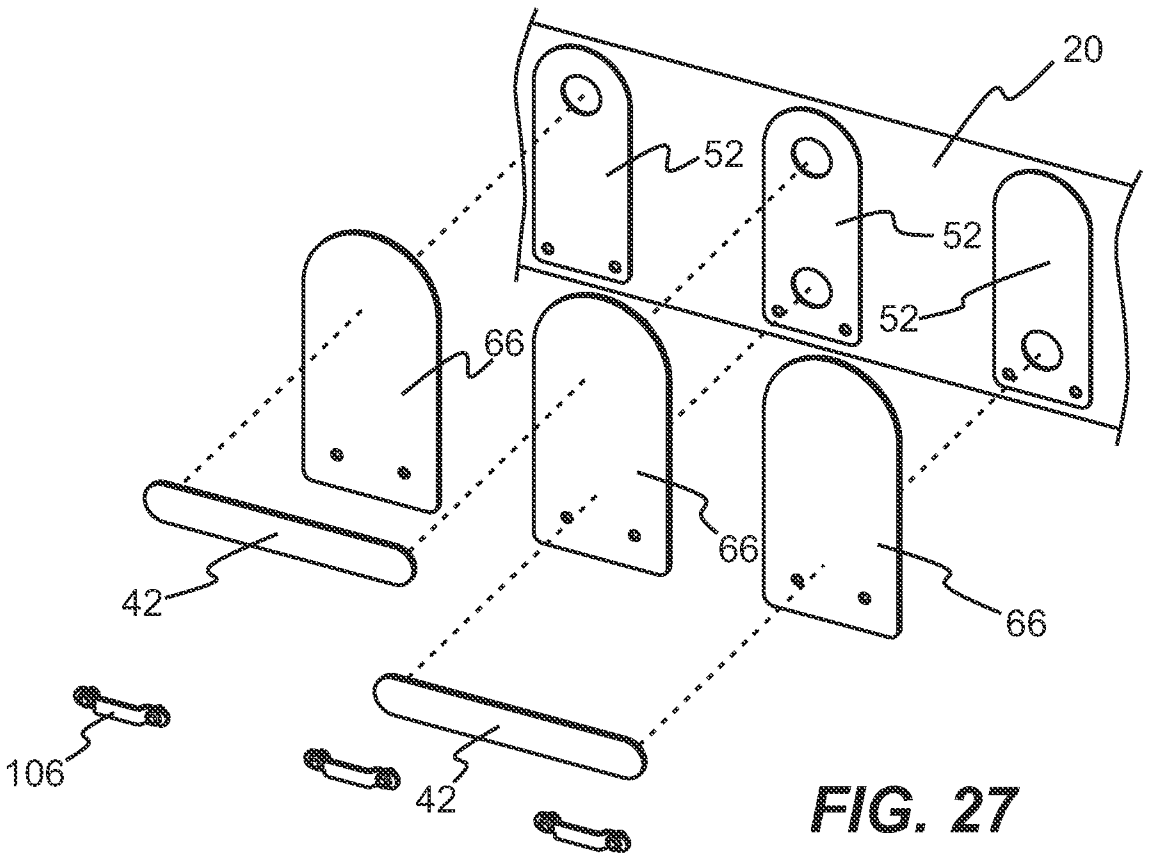
FIG. 27 is an exploded view of the detail view of the torso belt assembly embodiment of FIG. 26.

For some flexible lift assist harness embodiments, the flexible handles 42 may be operatively coupled between adjacent reinforcement mechanisms 72 as shown in FIGS. 24-27. In this manner, the flexible handles 42 may be oriented "horizontally" along the longitudinal axis 22 of the torso belt 20 as opposed to "vertically" along the transverse axis 28 of the torso belt 20. A flexible lift assist harness embodiment may be configured with a first reinforcement mechanism 118 which may include a first flexible insert 120, a first insert cover 122, and a first insert lock feature 124. The flexible lift assist harness embodiment may also be configured with a second reinforcement mechanism 126 which may include a second flexible insert 128, a second insert cover 129, and a second insert lock feature 130. A first end 132 of a flexible handle 42 may operatively coupled to the first reinforcement mechanism 118 by the first insert lock feature 124, and a second end 134 of the flexible handle 42 may be operatively coupled to the second reinforcement mechanism 126 by the second insert lock feature 130 as shown in FIGS. 24 and 25. FIGS. 26 and 27 depict a flexible lift assist harness embodiment wherein two flexible handles 42 are operatively coupled in a serial manner between three reinforcement mechanisms 72.

Some flexible lift assist harness embodiments 10 may be utilized to assist a patient 16 as discussed below. In some cases, a method of lifting or otherwise assisting a patient as shown generally in FIGS. 1-6, may include securing the torso belt 20 of the flexible belt assembly 18 to a patient 16 by wrapping the torso belt 20 about the torso 12 of the patient 16, and then engaging the torso fixation mechanism 30 and releasably securing the first end 32 of the torso belt 20 to the second end 34 of the torso belt 20. In some cases, the torso belt 20 may be located on the torso 12 of the patient 16 such that the transverse width 23 of the torso belt 20 is disposed substantially below the ventral ribcage and disposed substantially above the hipbones of the patient 16. If required at the discretion of the caregiver, the leg belt 76 of the at least one leg belt assembly 74 may then be wrapped around the leg 14 of the patient 16 and the leg belt 76 may be secured to the leg 14 of the patient 16 by engaging the fixation mechanism 84 and releasably securing the first end 86 of the leg belt 76 to the second end 88 of the leg belt 76.

If the leg belt assembly 74 is being utilized the torso belt 20 may be operatively coupled to the leg belt 76 by securing the anchor strap assembly 96 of the at least one leg belt assembly 74 to a flexible handle assembly 40 of the flexible belt assembly 18 by utilizing the coupling mechanism 102 which may be disposed at the second end 104 of the anchor strap 98 of the anchor strap assembly 96. The second end 104 of the anchor strap 98 may be operatively and adjustably coupled to the anchor strap terminal 106 of the flexible handle assembly 40 by the coupling mechanism 102. The caregiver may then grasp the flexible handle 42 of the flexible handle assembly 40 of the flexible belt assembly 18 and assist the patient 16 by applying a suitable tension to the flexible handle 42 in order to assist in the mobility of the patient 16. The tension applied by the caregiver to the flexible handle 42 may be transmitted through a "chain" of operatively coupled elements including from the flexible handle assembly 40 to the torso belt 20, from the torso belt 20 to the anchor strap 98, and finally from the anchor strap 98 to the leg belt 76.

In some cases, the flexible belt assembly 18 of the flexible lift assist harness 10 may be utilized to assist the patient 16 without the use of the leg anchor assembly which in some instances may be configured as the leg belt assembly 74. For some embodiments, the leg belt assembly 74 may be attached to assist the patient 16, and then removed with the flexible belt assembly 18 left on the patient 16. Thus a caregiver may release the coupling mechanism 102 of the anchor strap assembly 96, release the leg belt fixation mechanism 84 of the at least one leg belt assembly 74, and assist the patient 16 by grasping and applying suitable tension to the flexible handle 42 in order to assist the mobility of the patient 16. Thus for some embodiments of the flexible lift assist harness 10, the flexible belt assembly 18 may be utilized to assist the patient 16 with or without the leg belt assembly 74.

Figure 30:
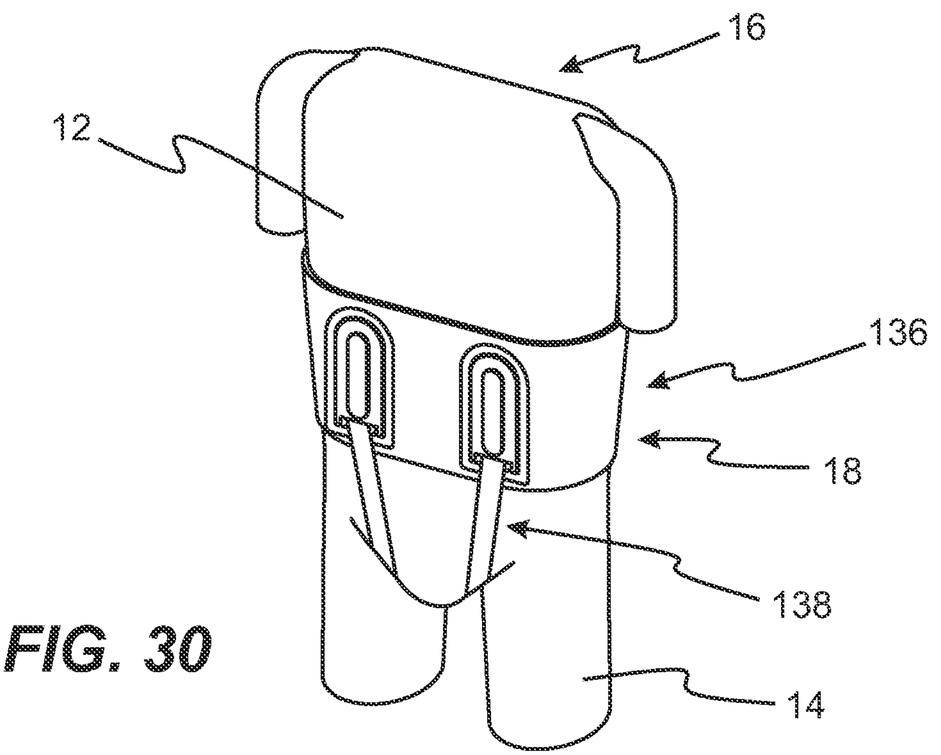
FIG. 30 is a front perspective view of a flexible lift assist harness embodiment disposed on a patient and including at least one anchor strap having a first end operatively and releasably coupled to a first flexible handle assembly and having a second end operatively and releasably coupled to a second flexible handle assembly.
Figure 31:
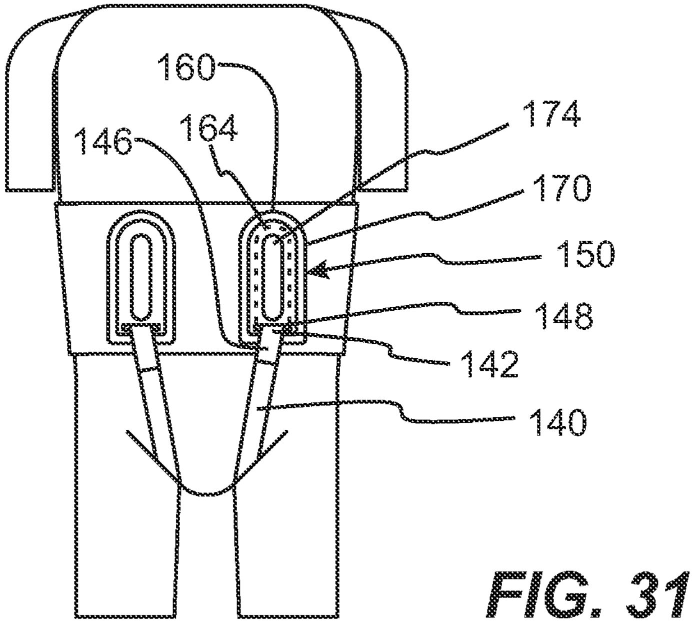
FIG. 31 is a front elevation view of the flexible lift assist harness embodiment of FIG. 30.
Figure 32:
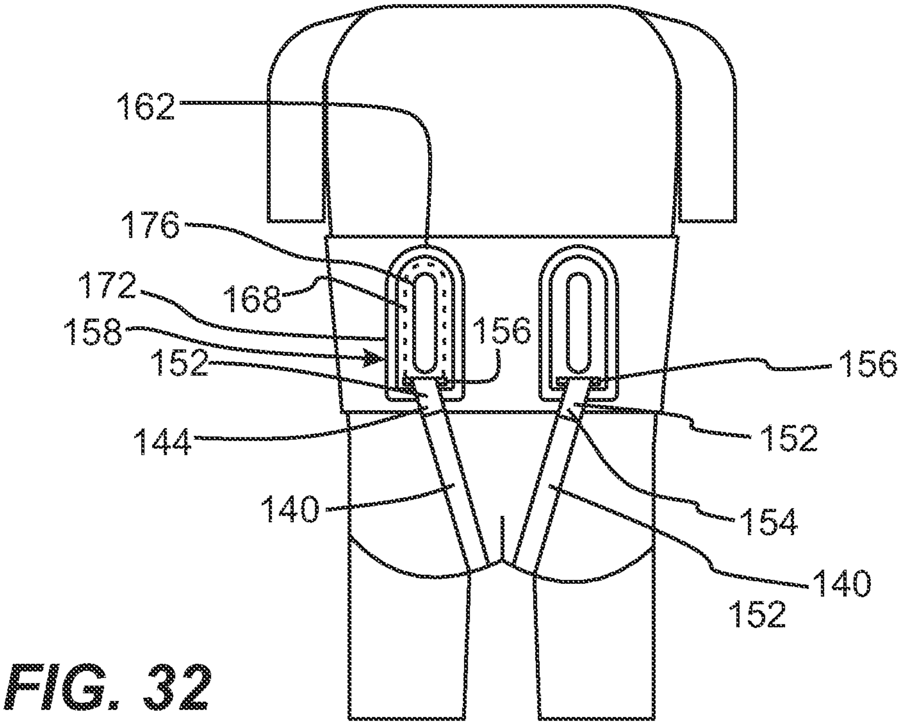
FIG. 32 is a rear elevation view of the flexible lift assist harness embodiment of FIG. 30.

An embodiment of a flexible lift assist harness 136 is depicted in FIGS. 30-32. The flexible lift assist harness embodiment 136 may have any of the same or similar features, dimensions, or materials of the flexible lift assist harness embodiment 10 which is depicted in FIGS. 1-10. The flexible lift assist harness embodiment 136 may include the flexible belt assembly 18 which in turn may include the torso belt 20. The torso belt 20 may have a length 21 as measured along the longitudinal axis 22 of the torso belt 20 which is sufficient to encompass the human torso 12. As discussed above, the materials of the torso belt 20 may be configured with anisotropic elastic properties. The anisotropic elastic properties may allow for the torso belt 20 to be comfortably secured to the patient 16, to allow for comfortable movement of the patient 16, and to allow for the torso belt 20 to be used as a platform for lifting/assisting the patient 16. In some cases, the torso belt 20 may have an elongation elasticity along the longitudinal axis 22 of at least about 40 percent.

In some cases, the torso belt 20 may be configured with the width 23 along the transverse axis 28 of the torso belt 20 that is at least about 12 percent of the longitudinal length 21. The torso belt 20 may be configured with reduced elongation elasticity along its transverse axis 28 (as compared to the elongation elasticity along its longitudinal axis 22) such that the torso belt 20 may be used as a suitable and secure platform for lifting/assisting the patient 16 due to the limited stretching of the torso belt 20 materials along the transverse axis 28. The torso belt 20 may be configured with limited elongation elasticity along its transverse axis 28; in some cases the elongation elasticity along the transverse axis 28 of the torso belt 20 may be less than about 4 percent.

The flexible belt assembly 18 may also include the torso fixation mechanism 30 which may be disposed on the first end 32 and second end 34 of the torso belt 20 and which may be configured to releasably secure the first end 32 of the torso belt 20 to the second end 34 of the torso belt 20 at a plurality of secured circumferences of the torso belt 20. The torso fixation mechanism 30 may include any suitable fixation mechanisms such as buckles, corresponding hook and loop structures, snaps, zippers, or the like.

The flexible belt assembly 18 may also include at least one flexible handle assembly 40 which is disposed on the torso belt 20. The flexible handle assembly 40 may include the flexible handle 42 which may have an elongate ribbon-like configuration and which may be configured to have an elongation elasticity along the handle length axis 44 of at least about 20 percent. Additionally the flexible handle 42 may have a limited elongation elasticity along the transverse axis 46 of the flexible handle 42 of less than about 2 percent. Additionally, the flexible handle 42 may be configured to lie flat in a stretched state when not in use so as not to poke or prod the patient 16 when the patient 16 is sitting or lying down. The flexible handle 42 may thus be configured with anisotropic elastic properties, the anisotropic elastic properties allowing for the flexible handle 42 to lie flat against the flexible belt assembly 18 when the flexible handle 42 is not in use and to expand away from the flexible belt assembly 18 when the flexible handle 42 is grasped by a caregiver's hand 48.

Some embodiments the flexible handle assembly may include the flexible insert 52 which includes a thin resilient layer of flexible material and which may be secured to the torso belt 20. The flexible insert 52 may be operatively coupled between the flexible handle and the outer surface 54 of the torso belt 20. The flexible insert 52 may act to distribute the tension across a broad surface area of the torso belt 20 when a caregiver applies tension to the flexible handle 42 in order to assist the patient 16, thus the flexible insert 52 may minimize or prevent "tenting" of the torso belt 20 around the flexible handle 42 when tension is applied to the flexible handle 42. In addition the flexible insert 52 may act to support the spine of the patient 16 while the patient 16 is being assisted. In some cases the flexible insert 52 may also include at least one handle anchor aperture 56 and the insert strap coupler 58. The handle anchor aperture 56 may be configured with any suitable profile including a circular profile, a rectangular profile, or an elliptical profile. Flexible insert 52 embodiments which are discussed herein may include from about 1 to about 4 anchor apertures 56.

Some embodiments of the flexible handle assembly 40 may also include the insert cover 66. The insert cover 66 may be disposed between the flexible handle 42 and the flexible insert 52, with the flexible insert 52 being sized such that the flexible insert 52 is substantially encompassed about its perimeter by the insert cover 66. The flexible insert 52 may also be disposed between the torso belt 20 and the insert cover 66 and may be formed from any suitable material. In some cases the insert cover 66 may be configured as a mesh or a weave, with the fibers of the mesh or weave being formed from any suitable materials. For example, fiber materials may include polymers such as nylon, polyurethane, polyester, or the like. In some cases, the fiber materials may include natural materials such as cotton, wool, or the like.

Some flexible handle assembly embodiments 40 may also include the at least one insert lock feature 68 which may be configured to operatively couple the flexible handle 42 to the torso belt 20 through the handle anchor aperture 56. Further, the insert lock feature 68 may be disposed about a perimeter 70 of the insert cover 66 thereby operatively coupling the insert cover 66 to the torso belt 20 about the perimeter 70 of the insert cover 66. In some instances, a respective flexible insert (optionally) 52, respective insert cover 66, and respective insert lock feature 68 may form a reinforcement mechanism 72 of the flexible belt assembly 18.

In some cases the flexible lift assist harness embodiment 136 may include at least one leg anchor assembly which may be configured as an anchor strap assembly 138. The anchor strap assembly 138 may be configured to provide additional support to the flexible belt assembly 18 and prevent slippage of the torso belt 20 assembly along the torso 12 of the patient 16 when tension is applied by a caregiver to the flexible handle 42 of the flexible belt assembly 18 by passing through the crotch of the patient instead of being anchored to the leg belt 76 as in embodiments which have been discussed above. The anchor strap assembly 138 may include an anchor strap 140 formed from a resilient flexible material, and having an elongate configuration, the first end 142, and a second end 144. The anchor strap assembly 138 may also include a first strap coupling mechanism 146 which may be disposed at a first end 142 of the anchor strap 140 and which may be configured to operatively couple the first end 142 of the anchor strap 140 to a first anchor strap terminal 140 of a first flexible handle assembly 150. The anchor strap assembly 138 may also include a second strap coupling mechanism 152 which may be disposed at a second end 154 of the anchor strap 140 which may be configured to operatively couple the second end 154 of the anchor strap 154 to a second anchor strap terminal 156 of a second flexible handle assembly 158.

The anchor strap 140 may be formed from any suitable material or combination of materials such that the anchor strap will support tension along its longitudinal axis 108 without significant elongation, such as less than about 4 percent elongation under the tension of supporting a patient 16 in some cases. In some cases, the anchor strap 140 may be formed from a suitable synthetic (polyester, nylon, or the like) or natural fabric (cotton, wool, or the like). In some other cases the anchor strap 140 may be formed as an elastic band with any suitable combination of fabric components and elastomeric components such as for the torso belt 20 and leg belt 76 embodiments which have been discussed above. In some cases, the anchor strap 140 may be configured to have a limited elastic elongation along the longitudinal axis 108 of the anchor strap 98 of less than about 4 percent.

The flexible lift assist harness embodiment 136 may be configured with any suitable combination of connections between the anchor strap assembly 138 and the flexible belt assembly 18. In some cases, the anchor strap assembly 138 may be operatively coupled between separate reinforcement mechanisms 72 of the flexible belt assembly 18. In some cases the first end 142 and second end 144 of the anchor strap 140 may be operatively, releasably, and adjustably secured to separate respective reinforcement mechanisms 72 of the flexible belt assembly 18. In some other cases, the first end 142 of the anchor strap 140 may be operatively, releasably, and adjustably secured to a first reinforcement mechanism 160 of the flexible belt assembly 18, and the second end 144 of the anchor strap 140 may be secured to a second reinforcement mechanism 162. In some other cases, the second end 154 of the anchor strap 140 may be operatively, releasably, and adjustably secured to the second reinforcement mechanism 162 of the torso flexible belt assembly 18 and the first end 142 of the anchor strap 140 may be secured to the first reinforcement mechanism 160.

In some cases, the first anchor strap terminal 148 may be operatively coupled to a first flexible insert 164 of the first flexible handle assembly 150 and the second anchor strap terminal 156 may be operatively coupled to a second flexible insert 168 of the second flexible handle assembly 158. In some other cases, the first anchor strap terminal 148 may be operatively coupled to a first insert cover 170 of the first flexible handle assembly 150 and the second anchor strap terminal 156 may be operatively coupled to a second insert cover 172 of the second flexible handle assembly 158. The first strap coupling mechanism 146 may be operatively and adjustably coupled to the first anchor strap terminal 148 by hook and loop, buckles, or snaps. The second strap coupling mechanism 152 may be operatively coupled to the second anchor strap terminal 156 by stitches, staples, rivets, or adhesive. The second strap coupling mechanism 152 may be operatively and adjustably coupled to the second anchor strap terminal 156 by hook and loop, buckles, or snaps.

The flexible lift assist harness 136 may be utilized as discussed below. The torso belt 20 of the flexible belt assembly 18 may be secured to the patient 16 by engaging the fixation mechanism 30 and releasably securing the first end 32 of the torso belt 20 to the second end 34 of the torso belt 20. In some cases, the torso belt 20 may be secured to the patient 16 such that the transverse width 23 of the torso belt 20 may be disposed such that it is substantially below the ventral ribcage and such that it is substantially above the hipbones of the patient 16. If required, the first end 142 of the anchor strap 140 of the anchor strap assembly 138 may then be secured to the flexible belt assembly 18 by operatively coupling the first strap coupling mechanism 146 disposed at the first end 142 of the anchor strap 140 to the first anchor strap terminal 148 of the first flexible handle assembly 150. Then the second end 144 of the anchor strap 140 may be passed through the crotch of the patient and secured to the flexible belt assembly 18 by operatively coupling the second strap coupling mechanism 152 disposed at the second end 144 of the anchor strap 140 to the second anchor strap terminal 156 of the second flexible handle assembly 158. A caregiver may then grasp a first flexible handle 174 of the first flexible handle assembly 150 and/or a second flexible handle 176 of the second flexible handle assembly 158 and assist the patient 16 by applying suitable tension to the flexible handles 174 and 176 in order to assist in the mobility of the patient 16.

In some cases, the flexible belt assembly 18 of the flexible lift assist harness 136 may be utilized to assist the patient 16 without the use of the leg anchor assembly which in this case may be configured as the anchor strap assembly 138. Or the anchor strap assembly 138 may be attached to assist the patient 16, and then removed with the flexible belt assembly 18 left on the patient 16. Thus a caregiver may release the first end 142 of the anchor strap 140 from the flexible belt assembly 18, release the second end 144 of the anchor strap 140 from the flexible belt assembly 18, and remove the anchor strap assembly 138. The caretaker may then grasp the first flexible handle 174 of the first flexible handle assembly 150 and/or a second flexible handle 176 of the second flexible handle assembly 158, and assist the patient 16 by applying suitable tension to the flexible handle(s) in order to assist in the mobility of the patient 16.

Some flexible lift assist harness embodiments may include torso belt embodiments that may include a transverse torso belt slot which defines an aperture through the material layer of the torso belt. The torso belt slot may facilitate stretching of slotted segments of the torso belt along a transverse axis of the torso belt and may thus increase the comfort of the patient during activities such as breathing, exercise, or the like. Some portions of the slotted segments of the torso belt may be constrained against stretching along the transverse axis of the torso belt by features which may be secured to the slotted section such as the torso fixation mechanism 30, the flexible handle assembly 40, or the reinforcement mechanism 72.

Figure 34A:
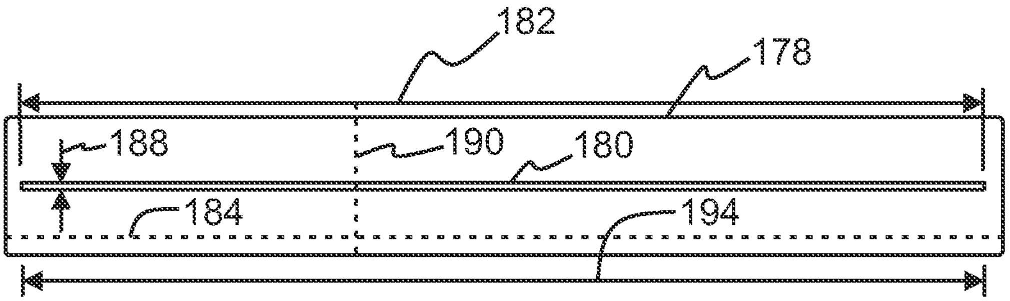
FIGS. 34A-B are elevation views of a torso belt embodiment having a torso belt slot.
Figure 34B:
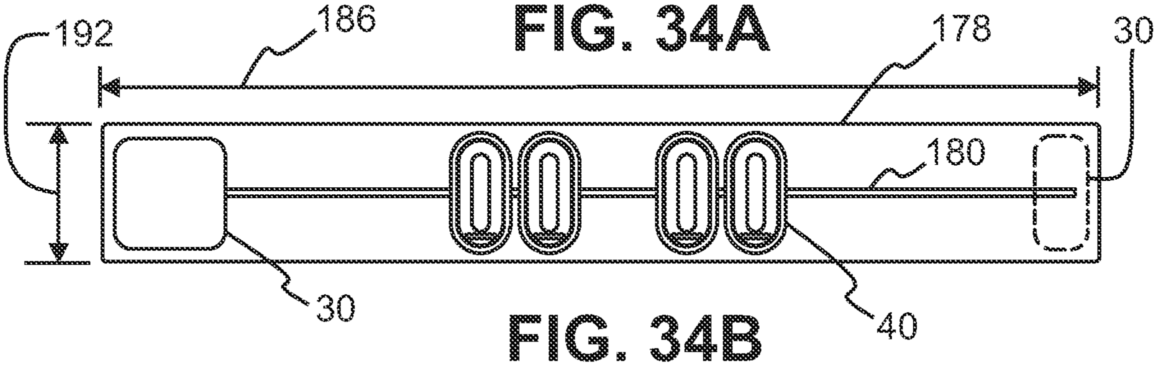

An embodiment of a torso belt 178 which includes a torso belt slot 180 is shown in FIGS. 34A-34B. The torso belt embodiment 178 may include any suitable features, materials, elastic properties, or dimensions of torso belt embodiments which have been discussed herein. FIG. 34A depicts the torso belt 178 which may include the torso belt slot 180 which defines an aperture through the torso belt 178, and which may have a slot length 182 which may extend along a longitudinal axis 184 of a length 186 of the torso belt 178 and a slot width 188 which may extend along a transverse axis 190 of a width 192 of the torso belt 178. The torso belt slot 180 may facilitate the expansion of slotted segments 194 of the torso belt 178 along the transverse axis 190 and substantially parallel to the spine of the patient 16 and the patient vertical axis 17 (see FIG. 10). The torso belt slot 180 may in some cases have a generally rectangular shape, with the slot width 188 and slot length 182 of the torso belt slot 180 defining the size of the rectangle. In some instances the slot width 188 of the torso belt slot 180 may span from about 2 percent to about 15 percent of the width 192 of the torso belt 178. In some cases the slot length 182 of the torso belt slot 180 may span from about 25 percent to about 90 percent of the length 186 of the torso belt 178.

Figure 35A:
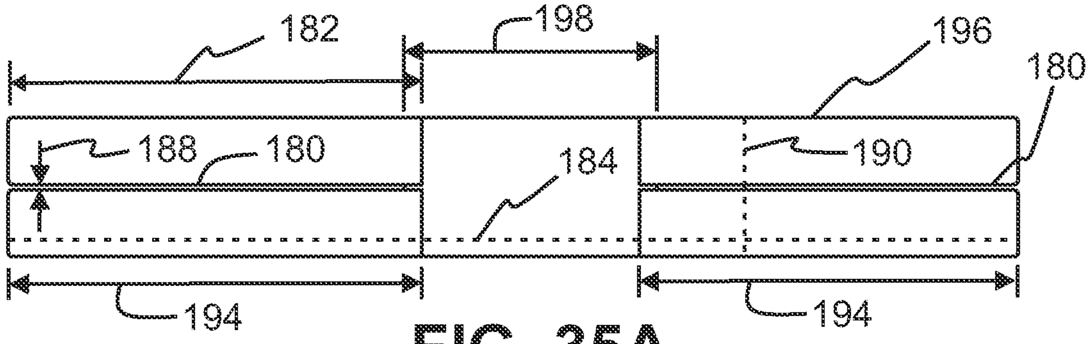
FIGS. 35A-B are elevation views of a torso belt embodiment having multiple torso belt slots.
Figure 35B:
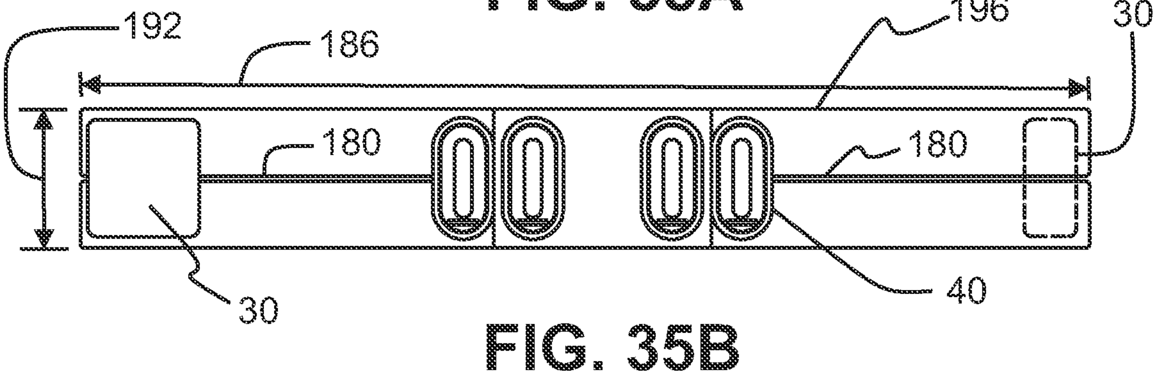

Some torso belt embodiments may include multiple torso belt slots 180 such as the torso belt embodiment 196 which is depicted in FIGS. 35A-B. The torso belt embodiment 196 may include a plurality of torso belt slots 180 with each torso belt slot 180 defining an aperture through the torso belt 196. Each torso belt slot 180 may have a slot length 182 which may extend substantially parallel to the longitudinal axis 184 of the length 186 of the torso belt 196 and may also have a slot width 188 which may extend along the transverse axis 190 of the width 192 of the torso belt 196. Each torso belt slot 180 may facilitate expansion of slotted segments 194 of the torso belt 196 along the transverse axis 190 and substantially parallel to the spine of the patient 16. Each torso belt slot 180 may in some cases have a generally rectangular shape, with the slot width 188 and slot length 182 of each torso belt slot 180 defining the size of the rectangle. In some instances each slot width 188 of each torso belt slot 180 may span from about 2 percent to about 15 percent of the width 192 of the torso belt 196. In some cases each slot length 182 of each torso belt slot 180 may span from about 25 percent to about 90 percent of the length 186 of the torso belt 196. Torso belt embodiments discussed herein may include from about 2 to about 6 torso belt slots 180. As depicted in FIG. 35A, the torso belt embodiment 196 may include slotted segments 194 as well as continuous segments, the continuous segments of the torso belt being formed from a substantially continuous section of the material layer 36 of the torso belt 196.

Some flexible lift assist harness embodiments may include leg belt embodiments that may in turn include a transverse leg belt slot which defines an aperture through the material layer of the leg belt. The leg belt slot may facilitate stretching of slotted sections of the leg belt along the transverse axis of the leg belt and may thus increase the comfort of the patient during activities such as exercise or the like. Some slotted sections of the leg belt may be constrained against stretching along the transverse axis of the torso belt by features which may be secured to the slotted section such as the leg belt fixation mechanism 84 or the anchor strap 98.

An embodiment of a leg belt 200 which includes a leg belt slot is shown in FIGS. 36A-36B. The leg belt embodiment 200 may include any suitable features, materials, elastic properties, or dimensions of leg belt embodiments which have been discussed herein. FIG. 36A depicts the leg belt 200 which may include a leg belt slot 202 which defines an aperture through the leg belt 200 and which has a slot length 204 that extends along a longitudinal axis 206 of a length 208 of the leg belt 200 and a slot width 210 which extends along a transverse axis 212 of a width 214 of the leg belt 200. The leg belt slot 202 may facilitate the expansion of slotted segments 216 of the leg belt 200 along the transverse axis 212 and substantially parallel to a longitudinal axis of the leg of the patient 16. The leg belt slot 202 may in some cases have a generally rectangular shape, with the slot width 210 and slot length 204 of the leg belt slot 202 defining the size of the rectangle. In some instances the slot width 210 of the leg belt slot 202 may span from about 2 percent to about 15 percent of the width 214 of the leg belt 200. In some cases the slot length 204 of the leg belt slot 202 may span from about 25 percent to about 90 percent of the length 208 of the leg belt 200.

Some leg belt embodiments may include multiple leg belt slots such as the leg belt embodiment 218 which is depicted in FIGS. 37A-B. The leg belt embodiment 218 may include a plurality of leg belt slots 202 with each leg belt slot 202 defining an aperture through the leg belt 218. Each leg belt slot 202 may have a slot length 204 which may extend substantially parallel to the longitudinal axis 206 of the length 208 of the leg belt 218 and may also have a slot width 210 which may extend along the transverse axis 212 of the width 214 of the leg belt 218. Each leg belt slot 202 may facilitate expansion of slotted segments 216 of the leg belt 218 along the transverse axis 212 and substantially parallel to the leg of the patient 16. Each leg belt slot 202 may in some cases have a generally rectangular shape, with the slot width 210 and slot length 204 of each leg belt slot 202 defining the size of the rectangle. In some instances each slot width 210 of each leg belt slot 202 may span from about 2 percent to about 15 percent of the width 214 of the leg belt 218. In some cases each slot length 204 of each leg belt slot 202 may span from about 25 percent to about 90 percent of the length 208 of the leg belt 218. Leg belt embodiments which are discussed herein may include from about 2 to about 4 leg belt slots 202. As depicted in FIG. 35A, the leg belt embodiment 218 may include slotted segments 216 as well as continuous segments 220, the continuous segments 220 of the leg belt 218 being formed from a substantially continuous section of the material layer 90 of the leg belt 218 and without any leg belt slots 202 therein.

Patient assist power lift device embodiments 240 (see FIG. 44) may be used to assist patients with severely limited mobility from a sitting to a standing position or vice versa. Typically, such patients may be confined to a wheelchair 222 and the patient assist power lift device 240 may be used as a force multiplier by a single operator to lift the patient 16 to a standing position in order to perform tasks such as transfer to a toilet, changing a diaper, changing clothing, or the like. In use, a belt compatible with the patient assist power lift device is typically attached to the patent 16, and then the belt may be operatively coupled to the patient assist power lift device 240. The patient assist power lift device 240 may then be activated thereby applying tension to the belt and raising the patient 16 from a sitting to a standing position in order to perform the desired task. After the desired task is performed the patient 16 may be lowered to a sitting position utilizing the patient assist power lift device 240. An example of a patient power lift device embodiment 240 is the BestStand SA400 Stand-Up Patient Lift Legacy manufactured by Bestcare (3000 Hamstead Turnpike, Suite 205, Levittown, NY, 11756). A problem with previously available belts and patient assist power lift devices 240 is that the belt may slip from the lower portion of the patient 16 to the chest of the patient 16 thereby constricting breathing and causing discomfort. Additionally such belts may be stiff and uncomfortable to the patient 16.

Figure 38:
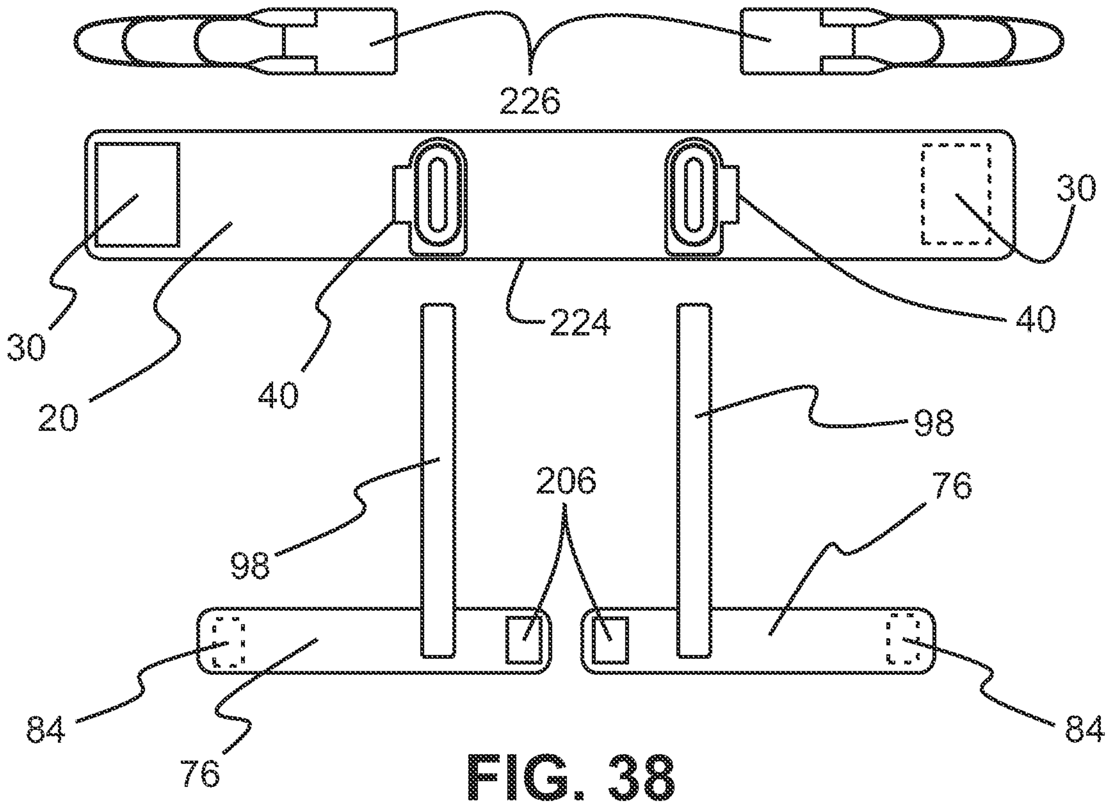
FIGS. 38-39 are elevation views of a flexible lift assist harness embodiment which includes a coupling strap assembly.
Figure 39:
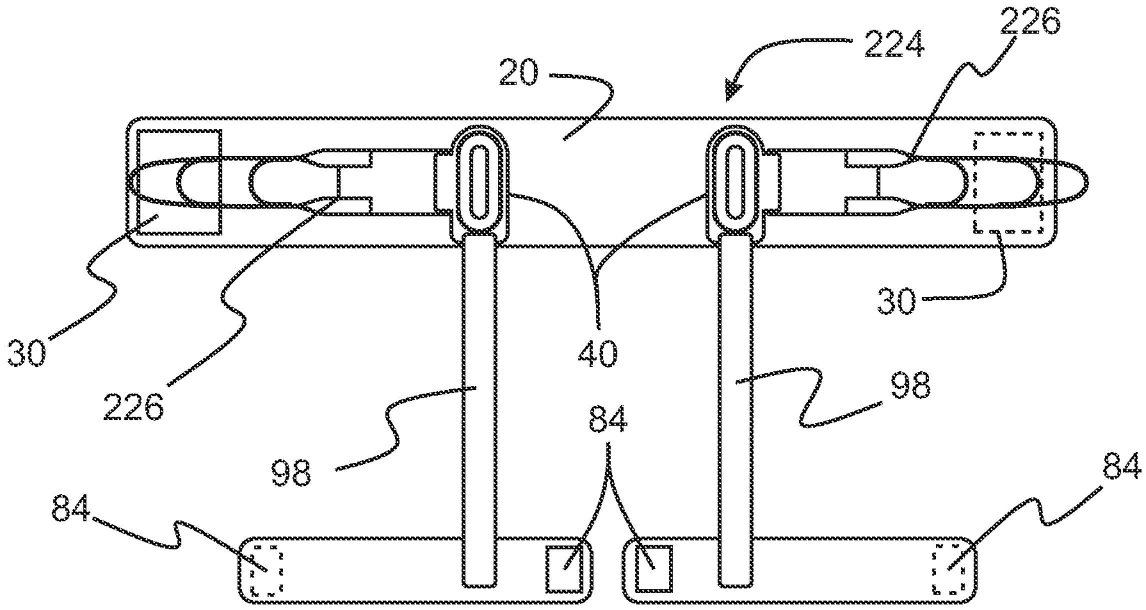
Figure 40:
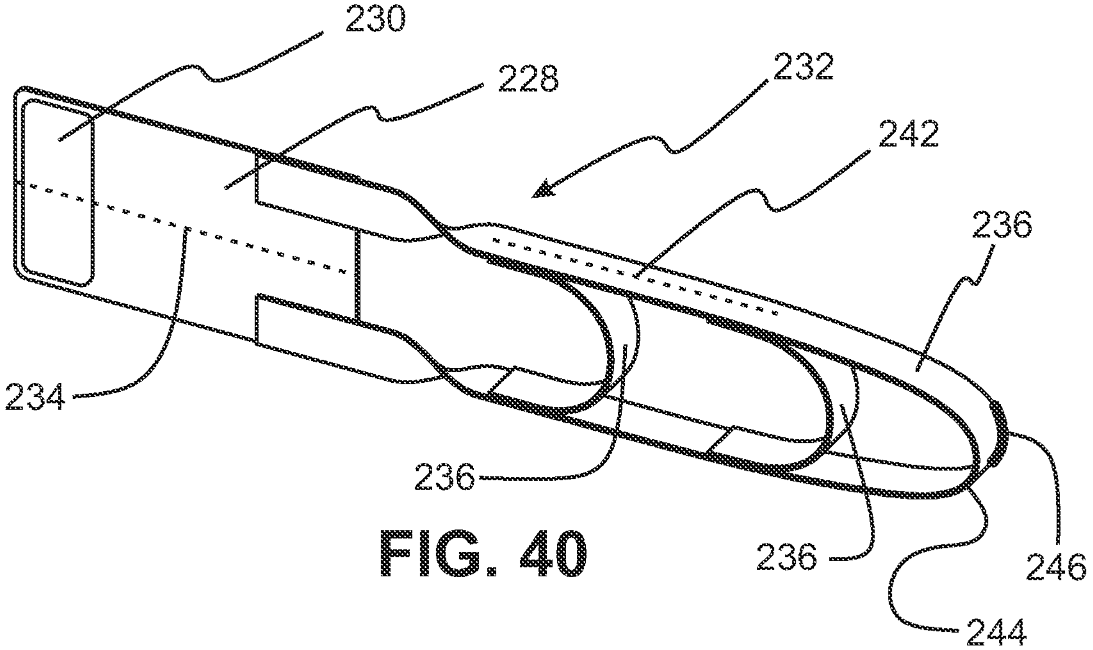
FIG. 40 is a front perspective view of a coupling strap assembly embodiment of FIG. 39.

An embodiment of a flexible lift assist harness 224 that may be utilized with a patient power lift device 240 is shown in FIGS. 38 and 39. The flexible lift assist harness embodiment 224 may include the torso belt 20, the torso belt fixation mechanism 30, the flexible handle assembly 40 and the leg anchor assembly which may include the leg belt 76, the leg belt fixation mechanism 84, and the anchor strap 98. In some other cases, the leg anchor assembly may include the anchor strap 98, the first reinforcement mechanism 160, and the second reinforcement mechanism 162 with the anchor strap 98 operatively coupled between the first and second reinforcement mechanisms 160, 162 (see FIGS. 30-32). Each of these elements of the flexible lift assist harness embodiment 224 may include any suitable features, materials, elastic properties, or dimensions of their respective embodiments which have been discussed herein. In addition, the flexible lift assist harness 224 may include a power lift strap 226 which is shown in FIG. 40. The power lift strap 226 may include a strap pad 228, a strap fixation mechanism 230, and a coupling strap assembly 232. The strap pad 228 may operatively couple the coupling strap assembly 232 to the torso belt 20, and it may have a generally rectangular profile when laid out on a flat surface. The strap pad 228 may be formed in some cases as a fabric weave from any suitable material that will support tension without significant elongation or deformation such as nylon, polyester, polypropylene, cotton, composite, or the like. The strap pad 228 may in some cases have an elongation elasticity along a pad longitudinal axis 234 from about 1 percent to about 4 percent.

Figure 44:
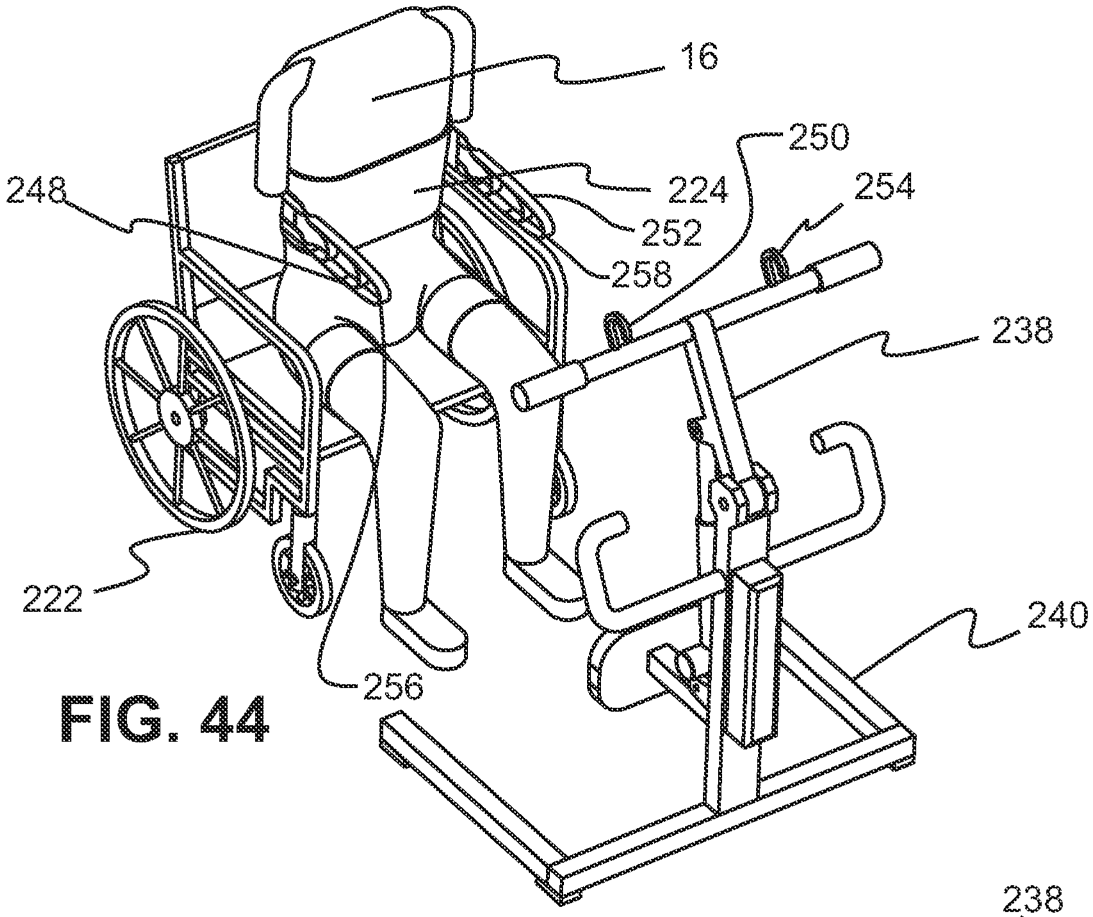
FIG. 44 is a perspective view of a patient, the flexible lift assist harness embodiment of FIG. 39, a wheelchair, and a patient assist power lift device.
Figure 45:
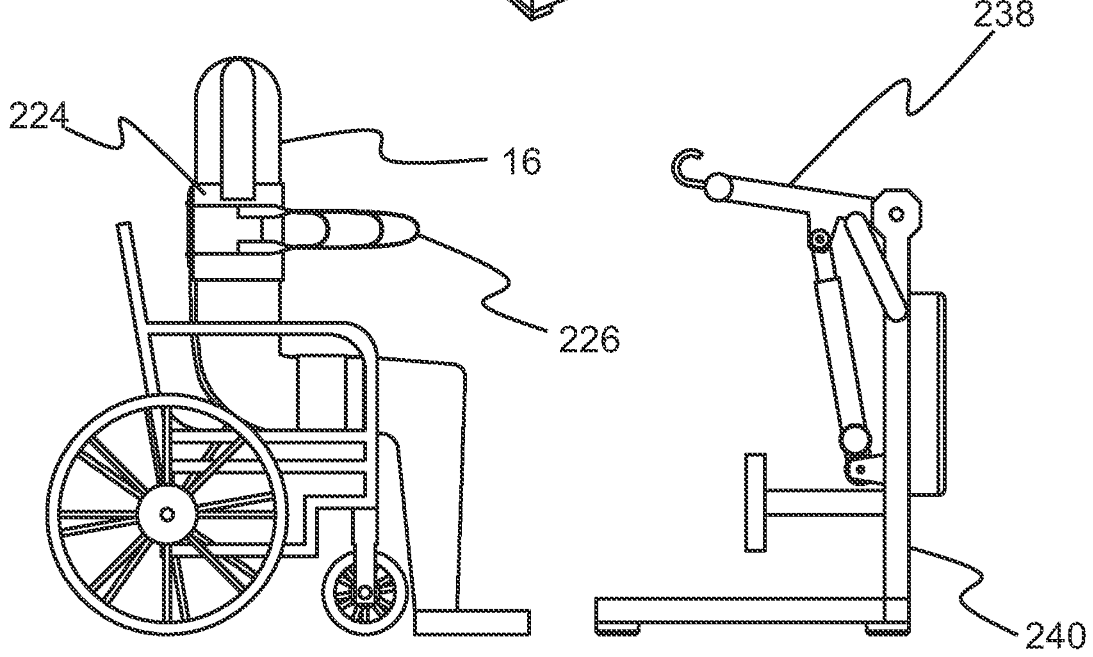
FIG. 45 is an elevation view of the patient model, the flexible lift assist harness, wheelchair, and the patient assist power lift device of FIG. 44.
Figure 46:
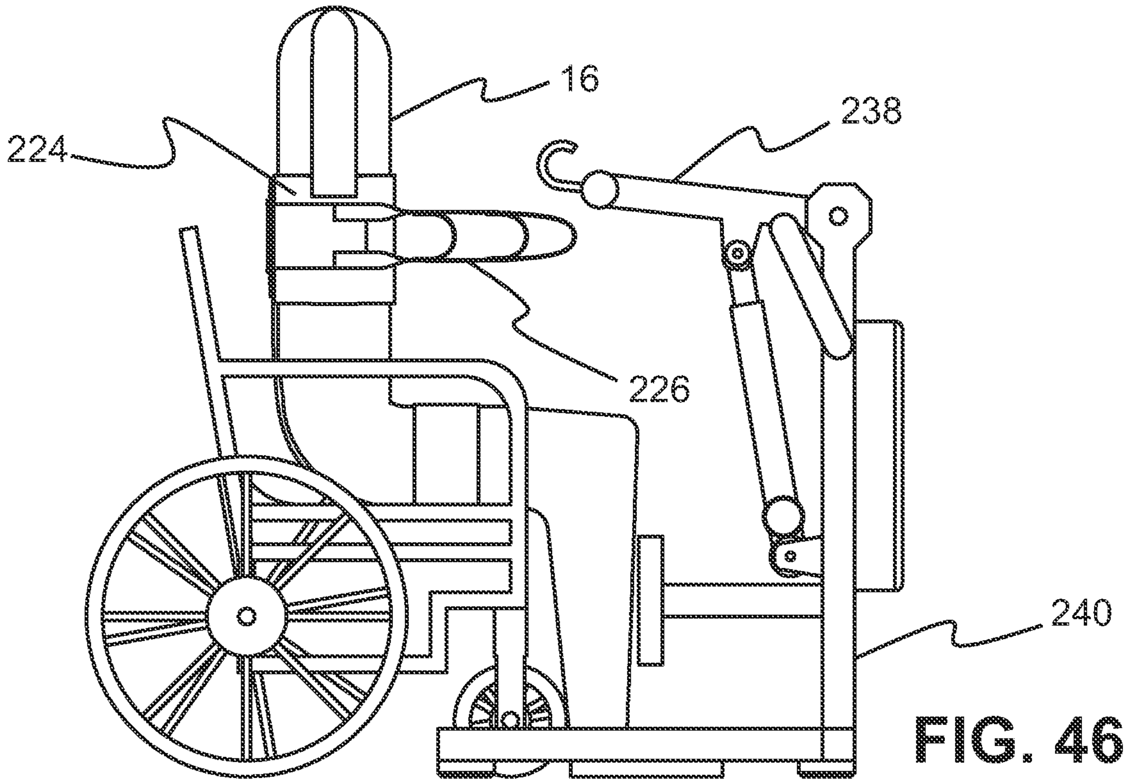
FIG. 46 is an elevation view of the patient, the flexible lift assist harness, wheelchair, and the patient assist power lift device of FIG. 44

The coupling strap assembly 232 may be formed from a plurality of ribbon like coupling straps 236 which may be suitably coupled together in order to form an array of nested loops which may be suitable for operatively coupling to a power lift arm 238 of a patient assist power lift device 240 (see FIG. 44). Each coupling strap 236 may be formed as a fabric weave from any suitable material such as nylon, polyester, polypropylene, cotton, composite, or the like and may have a generally rectangular profile when laid on a flat surface. The material of the coupling strap may allow for tension to be applied to the coupling strap without significant elongation or deformation, in some cases less than about 4 percent elongation under the load of a patient 16 being supported. Each coupling strap 236 may in some cases have an elongation elasticity along a strap longitudinal axis 242 from about 1 percent to about 4 percent. The coupling strap assembly 232 may be secured to the strap pad 228 by any suitable means such as adhesives, rivets, stiches, or the like.

Figure 43:
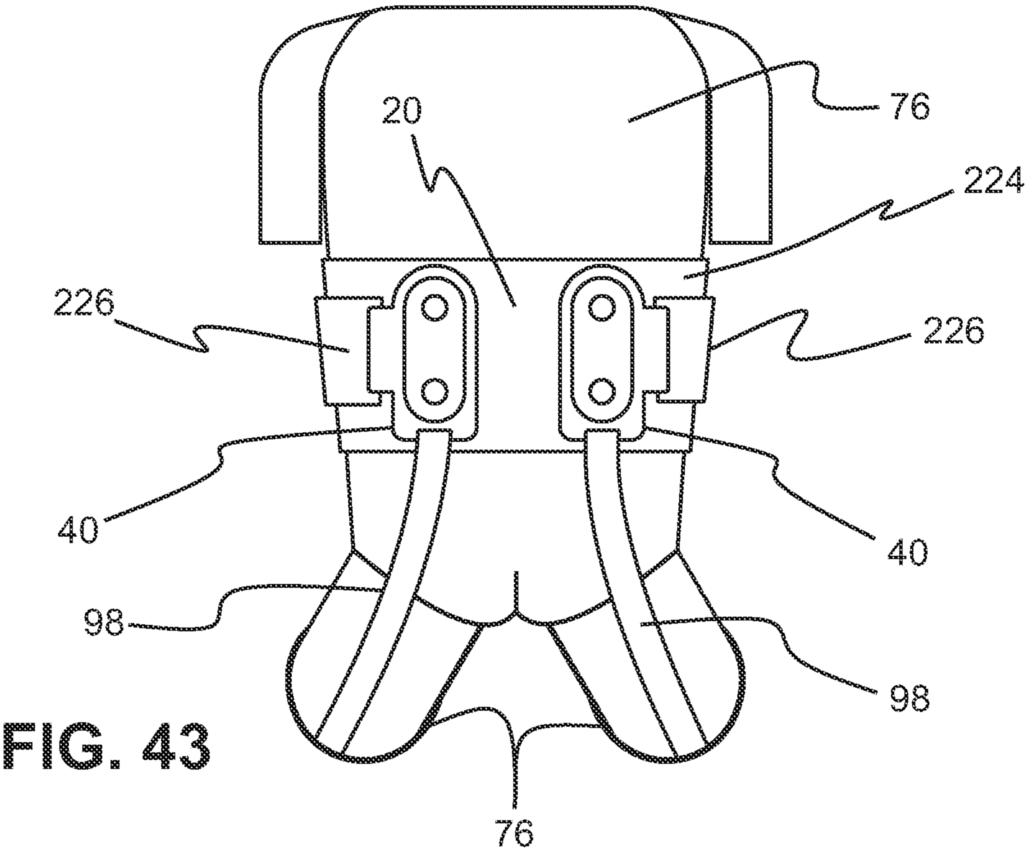
FIG. 43 is a rear perspective view of the flexible lift assist harness and patient model of FIG. 41.
Figure 47:
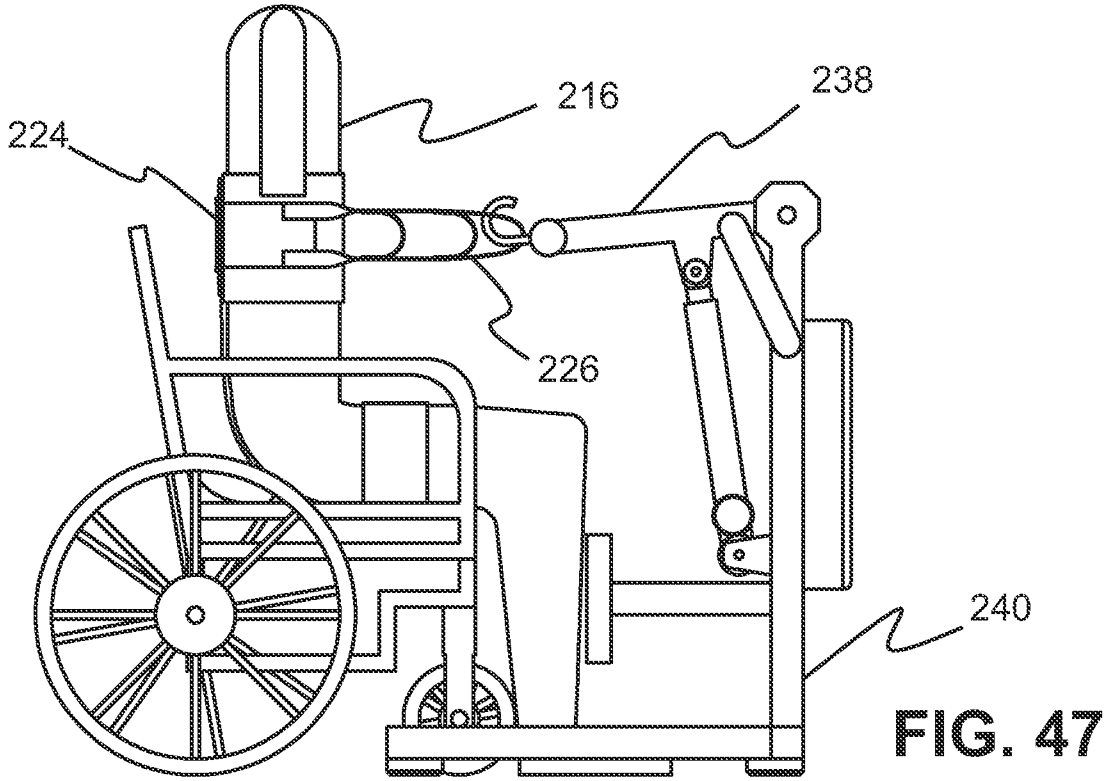
FIG. 47 is an elevation view of the patient, the flexible lift assist harness, wheelchair, and the patient assist power lift device of FIG. 44 with a power lift arm of the patient assist power lift device operatively coupled to the coupling strap assembly of the flexible lift assist harness.
Figure 48:
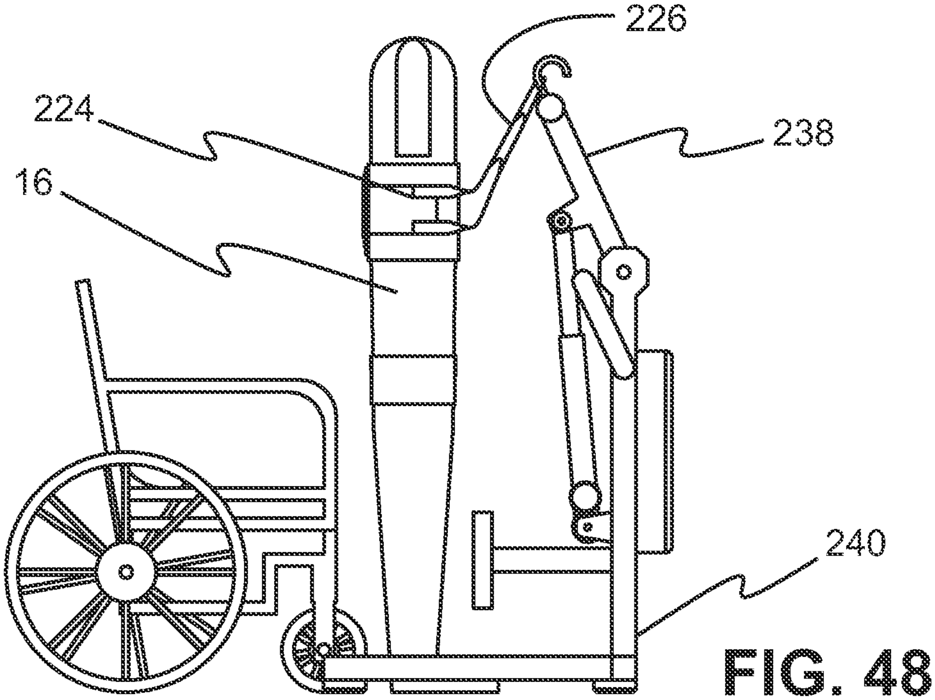
FIG. 48 is an elevation view of the patient, the flexible lift assist harness, wheelchair, and the patient assist power lift device of FIG. 44 with the power lift arm of the patient assist power lifting the patient by applying tension to the coupling strap assembly of the flexible lift assist harness.

As shown in FIG. 43, the power lift strap 226 may be operatively coupled to the respective flexible handle assembly 40 of the flexible lift assist harness 224. In some cases the power lift strap 226 may be secured to the respective flexible handle assembly 40 by adhesives, rivets, stiches, or the like. In some other cases, the power lift strap 226 may be releasably secured to the respective flexible handle assembly 40 by respective hook and loop structures, buckles, snaps, or the like. It is important to note that the power lift strap 226 may be operatively coupled to the flexible handle assembly 40 which may in turn be operatively coupled to a respective leg belt 76 by a respective anchor strap 98. In this manner when the power lift arm 238 of the patient assist power lift device 240 attached to the power lift strap 226 of the flexible lift assist harness 224 is activated, tension is applied by the power lift arm 238 to a tension transitioning "chain" of sequential elements of the flexible lift assist harness 224 including the power lift strap 226, the flexible handle assembly 40, the anchor strap 98, and finally the leg belt 76 (see FIG. 43). With these elements under suitable tension by the power lift arm 238, the patient 16 can be comfortably lifted from a sitting to a standing position with proper support along the patient's lower back, buttocks, and thighs (see FIGS. 47 and 48). The support given to the patient 16 by the flexible lift assist harness 224 can be described as being similar to sitting in a lift assist chair and being lifted to a standing position.

Figure 41:
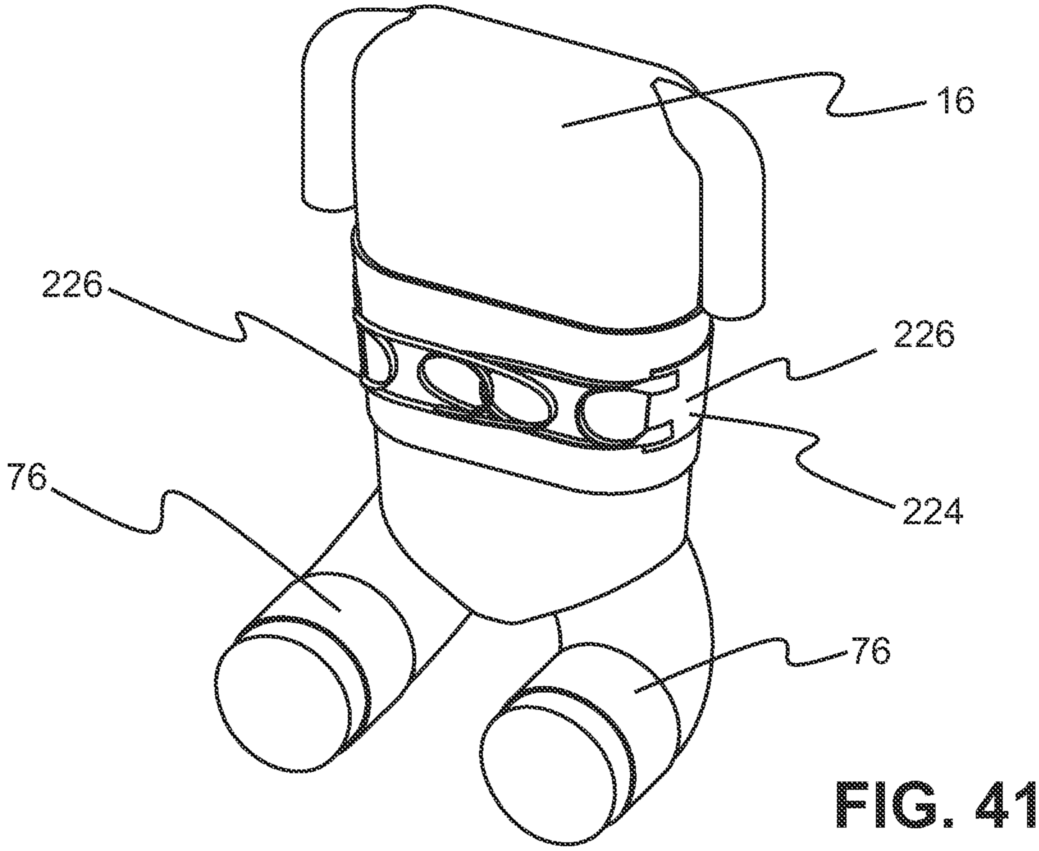
FIG. 41 is a perspective view of the flexible lift assist harness of FIG. 39 deployed onto a patient model and with a distal portion of the coupling strap assemblies releasably secured to a torso belt of the flexible lift assist harness.
Figure 42:
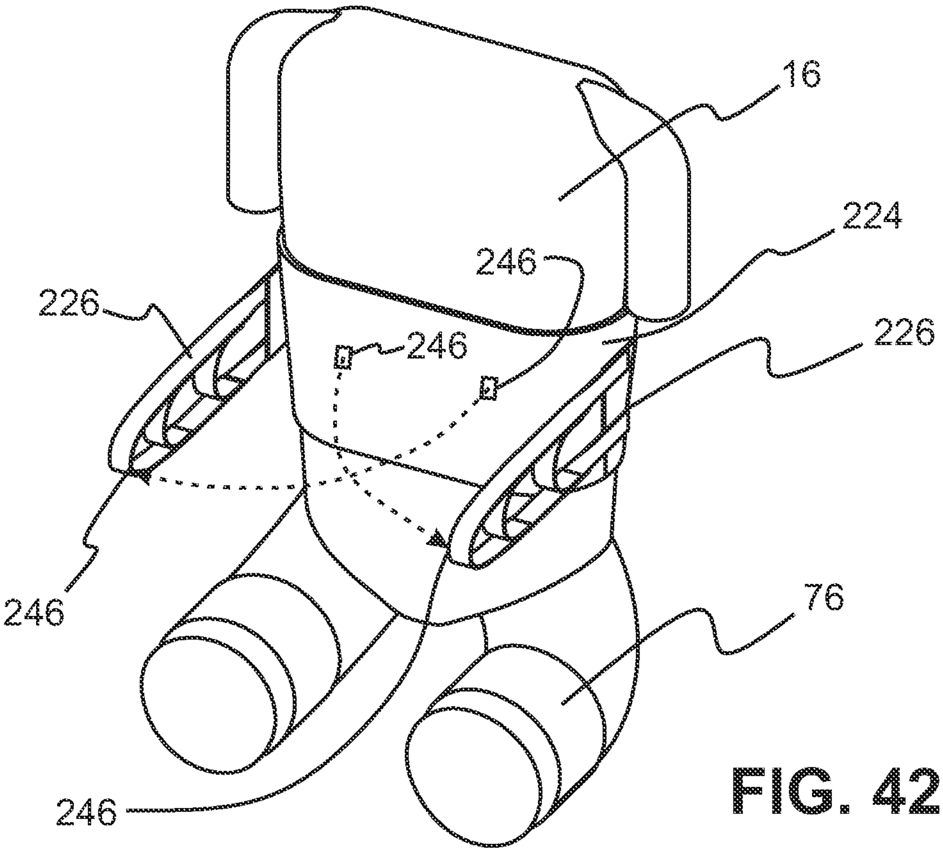
FIG. 42 depicts the flexible lift assist harness of FIG. 41 with the distal portion of the coupling strap assemblies released from the torso belt.

Some embodiments of the flexible lift assist harness 224 may include power lift straps 226 having distal portions 244 which may be releasably secured to the torso belt 20 such that the power lift straps 226 may be disposed in a low profile location when the power lift straps 226 are not operatively coupled to the patient assist power lift device 240 as shown in FIG. 41. A distal strap coupler 246 may be disposed at the distal portion 244 of the power lift strap 226 as shown in FIG. 40, and at a suitable location on the torso belt 20 as shown in FIG. 42. The distal strap coupler 246 may allow the distal portion 244 of the power lift strap 226 to be releasably secured and released from the torso belt 20 prior to coupling the power lift strap 226 to a respective power lift arm 238 as shown in FIG. 41. The distal strap coupler 246 may include any suitable releasable coupling mechanism such as hook and loop structures, buckles, snaps, or the like.

The flexible lift assist harness embodiment 224 and patient assist power lift device 240 may be utilized as discussed below (see FIGS. 44-48). The torso belt 20 of the flexible lift assist harness 224 may be secured to a patient 16 by wrapping the torso belt 20 about the torso of the patient 16 and engaging the fixation mechanism 30 thereby releasably securing the first end 32 of the torso belt 20 to the second end 32 of the torso belt 20. A first leg anchor assembly (leg belt 76, anchor strap 98, leg belt fixation mechanism 84) of the flexible lift assist harness 224 may then be secured to the first leg of the patient 16, and the first leg anchor assembly may be operatively coupled to the first reinforcement mechanism 160 which may be secured to the outer surface 54 of the torso belt 20. A second leg anchor assembly (leg belt 76, anchor strap 98, leg belt fixation mechanism 84) of the flexible lift assist harness 224 may then be secured to the second leg of the patient 16, and the second leg anchor assembly may be operatively coupled to the second reinforcement mechanism 162 which may be secured to the outer surface 54 of the torso belt 20.

The torso belt 20 may then be operatively coupled to the patient assist power lift device 240 which may then be activated in order to apply or release tension to the flexible lift assist harness 224 and raise or lower the body of the patient 16. In some cases the torso belt 20 may be operatively coupled to the patient assist power lift device 240 by operatively coupling a first power lift strap 248 which is secured to the torso belt 20 to a first power lift arm 250 of the patient assist power lift device 240, and then operatively coupling a second power lift strap 252 which is secured to the torso belt 20 to a second power lift arm 254 of the patient assist power lift device 240. The patient assist power lift device 240 may then be activated by rotating the first and second power lift arms 250, 254 and thereby applying tension to the flexible lift assist harness 224 via the first and second power lift straps 248, 252 in order to raise or lower the body of the patient 16. For flexible lift assist harness embodiments 224 having power lift straps 226 with distal ends 244 which are releasably secured to the torso belt 20 (see FIGS. 41 and 42), a first distal segment 256 of the first power lift strap 248 may be released from the torso belt 20 prior to operatively coupling the first power lift strap 248 to the first power lift arm 250. Similarly, a second distal segment 258 of the second power lift strap 252 may be released from the torso belt 20 prior to operatively coupling the second power lift strap 252 to the second power lift arm 254.

In some cases, the power lift arm 238 of the patient assist power lift device 240 may be coupled directly to a flexible handle assembly 40 of the torso belt 20 without the use of the power lift strap 226 (see FIGS. 54-57). That is to say that the torso belt 20 may be operatively coupled to the patient assist power lift device 240 by operatively coupling the first power lift arm 250 to the first flexible handle assembly 150 which is secured to the torso belt 20. The second power lift arm 254 of the patient assist power lift device 240 may then be operatively coupled to the second flexible handle assembly 158 which may be secured to the torso belt 20. The patient assist power lift device 240 may then be activated by rotating the first and second power lift arms 250, 254 thereby applying tension to the flexible lift assist harness (any suitable flexible lift assist harness embodiments which are discussed herein e.g. 10, 136, 178, 196) via the first and second flexible handle assemblies 150, 158 in order to raise or lower the body of the patient 16.

Flexible lift assist harness embodiments which are discussed herein may allow for the replacing of a patient's diaper 260 as discussed below. The flexible lift assist harness 10 (or any suitable flexible lift assist harness which has been discussed herein e.g. 178, 196, 224) may be put onto the patient 16 by securing the torso belt 20 of the flexible lift assist harness 10 to the patient 16 by wrapping the torso belt 20 about the torso of the patient 16 and engaging the fixation mechanism 30 which releasably secures the first end 32 of the torso belt 20 to the second end 34 of the torso belt 20. The torso belt 20 may be secured to a patient 16 such that the transverse width 23 of the torso belt 20 is disposed substantially below the ventral ribcage and substantially above the hipbones of the patient 16. A leg belt 76 of the flexible lift assist harness 10 may then be secured to the leg of the patient 16 by wrapping the leg belt 76 about the leg of the patient 16 and engaging the fixation mechanism 84 thereby releasably securing the first end 86 of the leg belt to the second end 88 of the leg belt 76. The anchor strap 98 secured to the leg belt 76 may then be operatively and releasably coupled to the flexible handle assembly 40 of the torso belt 20.

Figure 49:
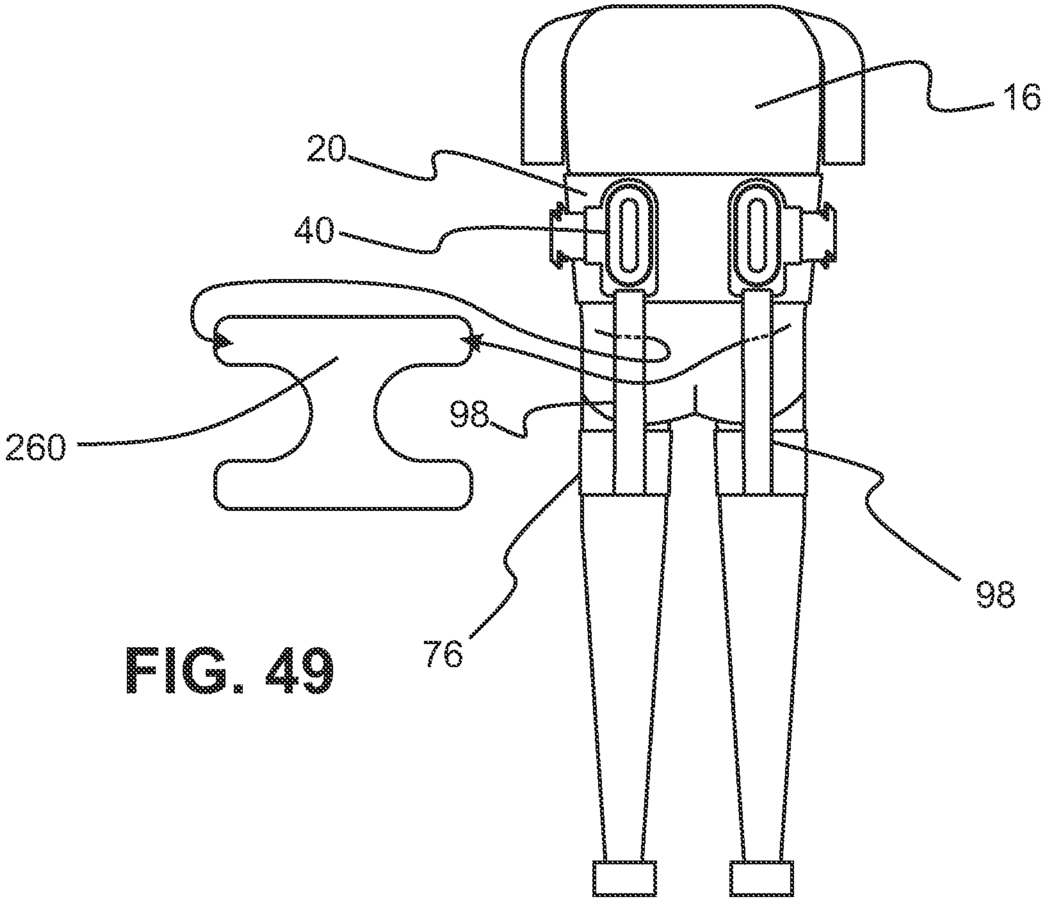
FIG. 49 is a rear elevation view of a flexible lift assist harness deployed onto a patient and also showing a diaper that is to be disposed on the patient.
Figure 50:
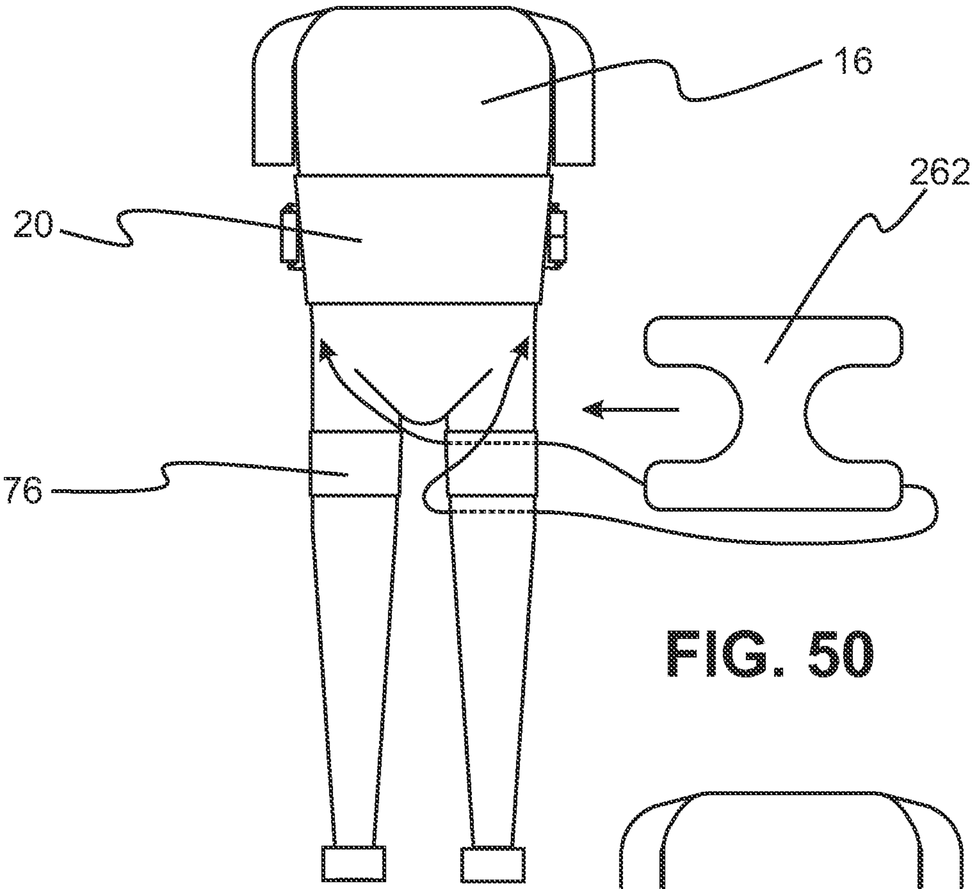
FIG. 50 is a front elevation view of the flexible lift assist harness, patient, and diaper of FIG. 49.
Figure 51:
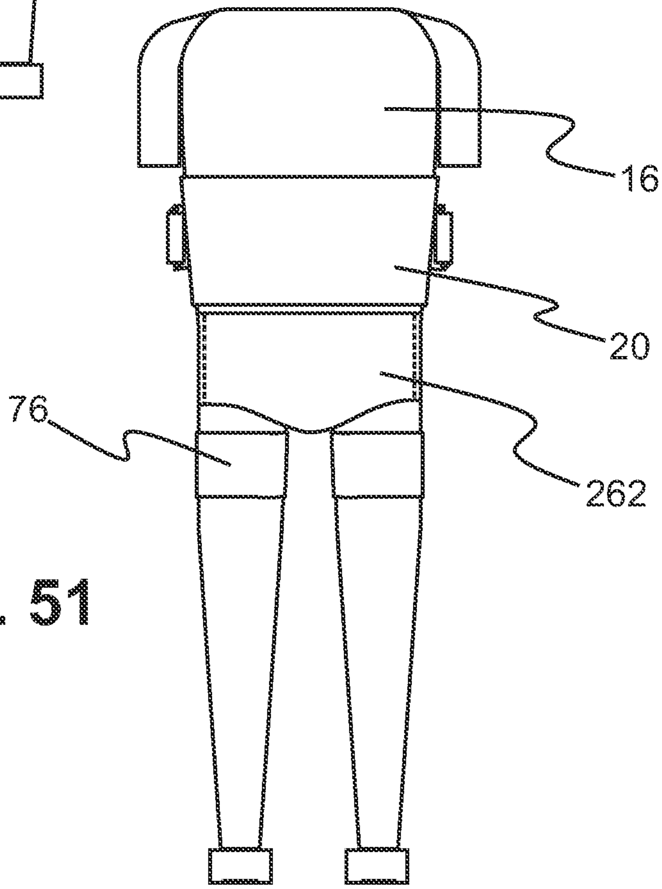
FIG. 51. is a front elevation view of the flexible lift assist harness, patient, and diaper of FIG. 49 with the diaper deployed onto the patient.
Figure 52:
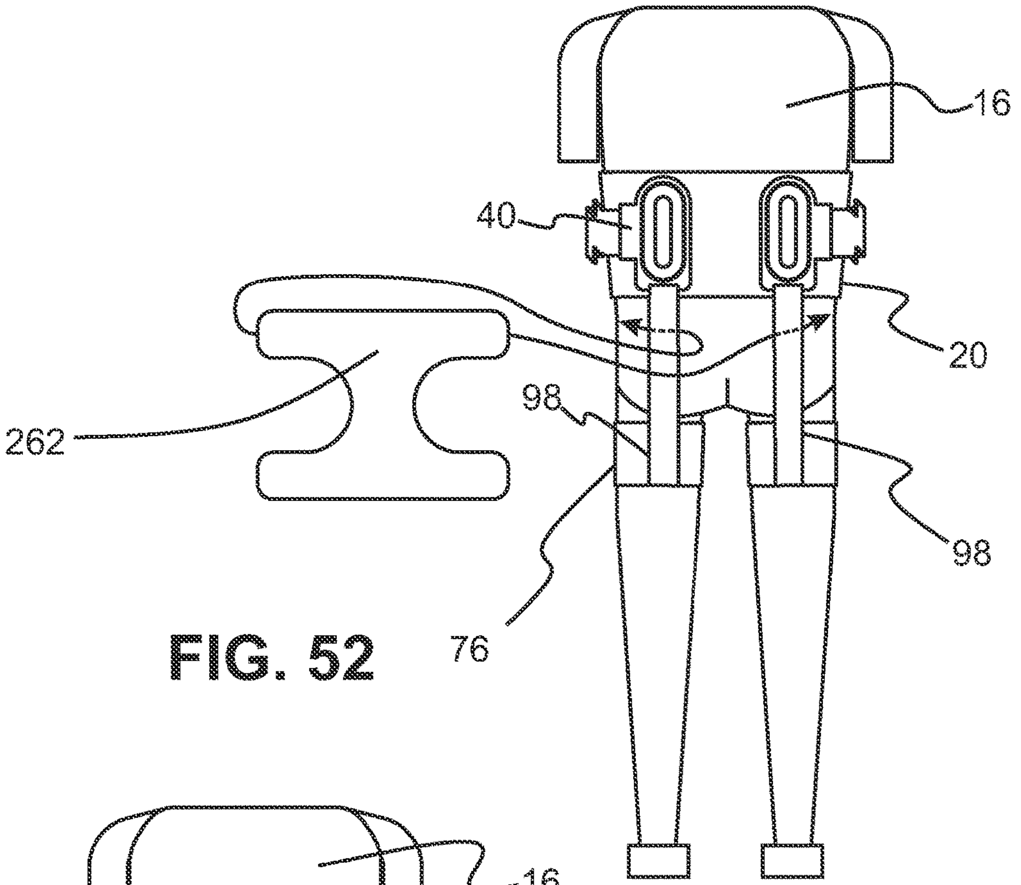
FIG. 52 is a rear elevation view of the flexible lift assist harness, patient, and diaper of FIG. 49.
Figure 53:
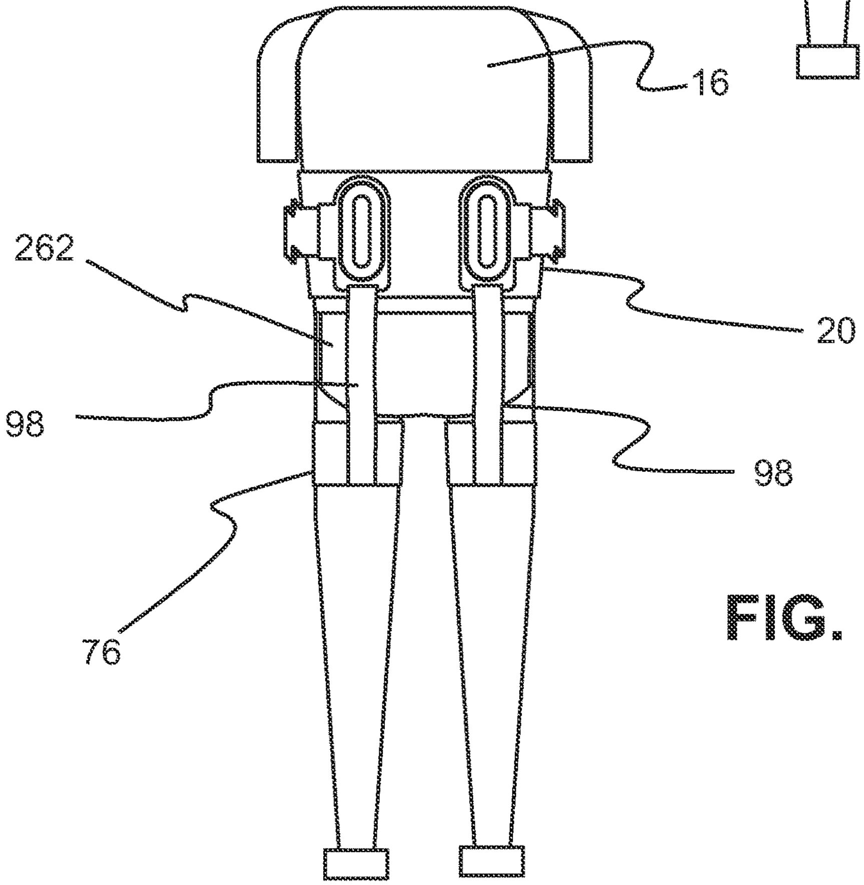
FIG. 53 is an elevation of the flexible lift assist harness, patient, and diaper of FIG. 49 with the diaper deployed onto the patient.
Figure 54:
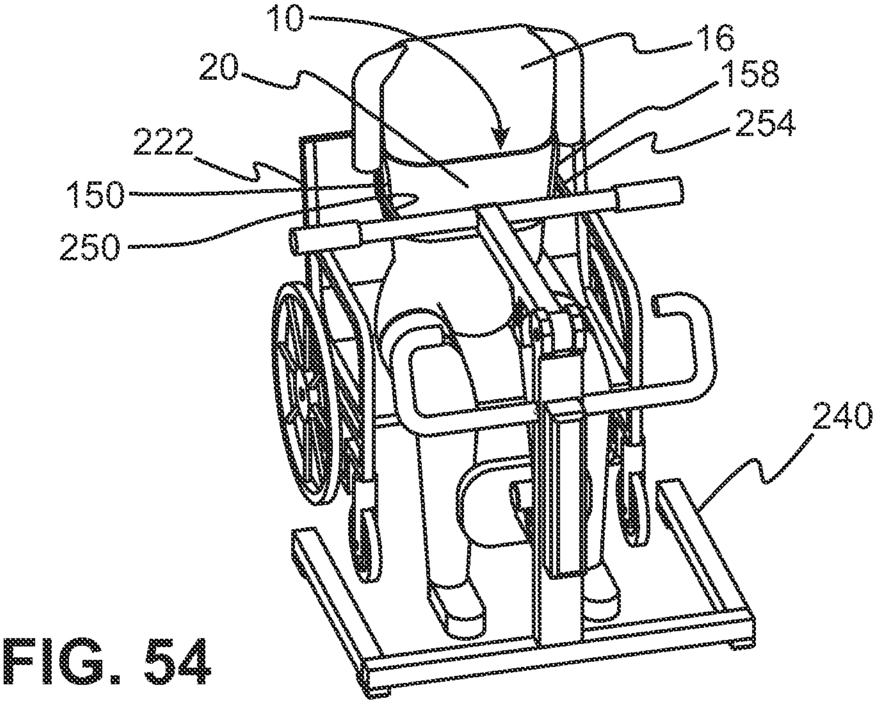
FIG. 54 is a perspective view of a patient, a flexible lift assist harness embodiment secured to the patient, a wheelchair, and a patient assist power lift device.
Figure 55:
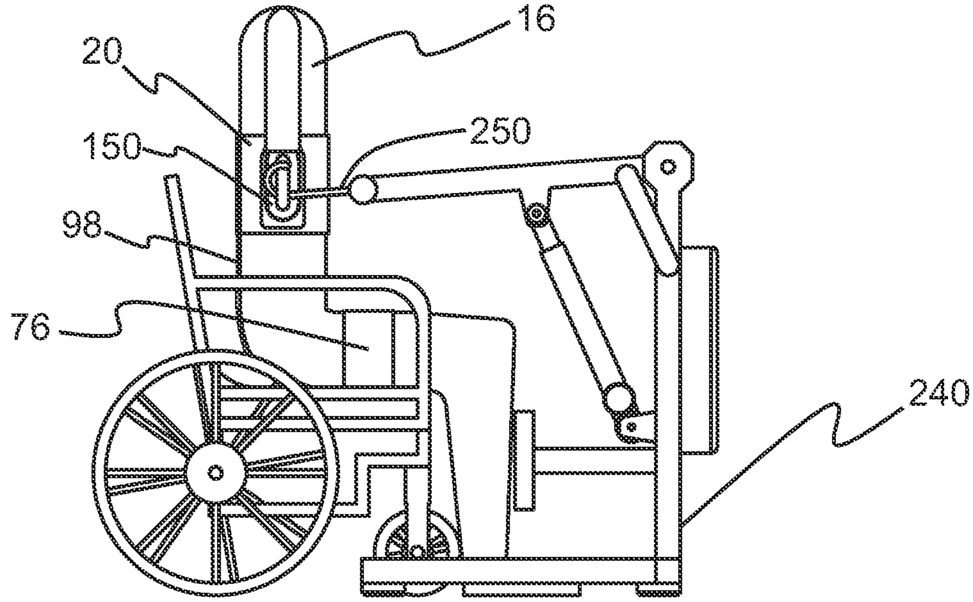
FIG. 55 is an elevation view of the patient model, the flexible lift assist harness embodiment, the wheelchair, and the patient assist power lift device of FIG. 54 with a power lift arm of the patient assist power lift device operatively coupled to a flexible handle assembly secured to a torso belt of the flexible lift assist harness.
Figure 56:
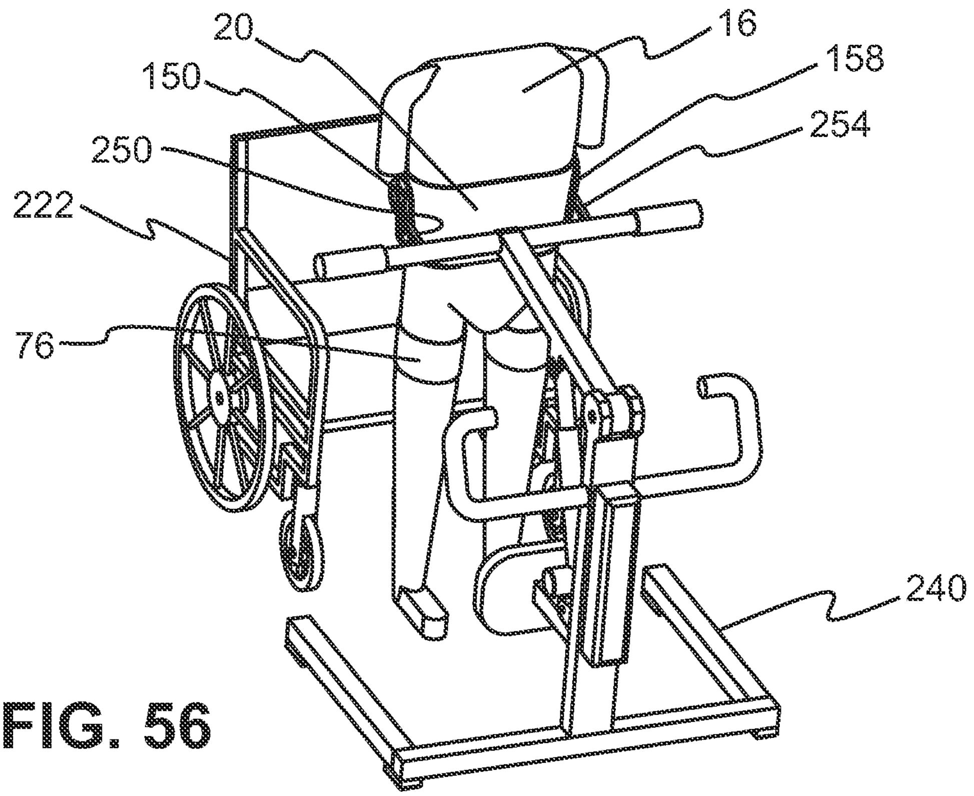
FIG. 56 is a perspective view of the patient, the flexible lift assist harness embodiment, the wheelchair, and the patient assist power lift device of FIG. 54 with a power lift arm of the patient assist power lift device lifting the patient by applying tension to flexible handle assembly secured to a torso belt of the flexible lift assist harness.
Figure 57:
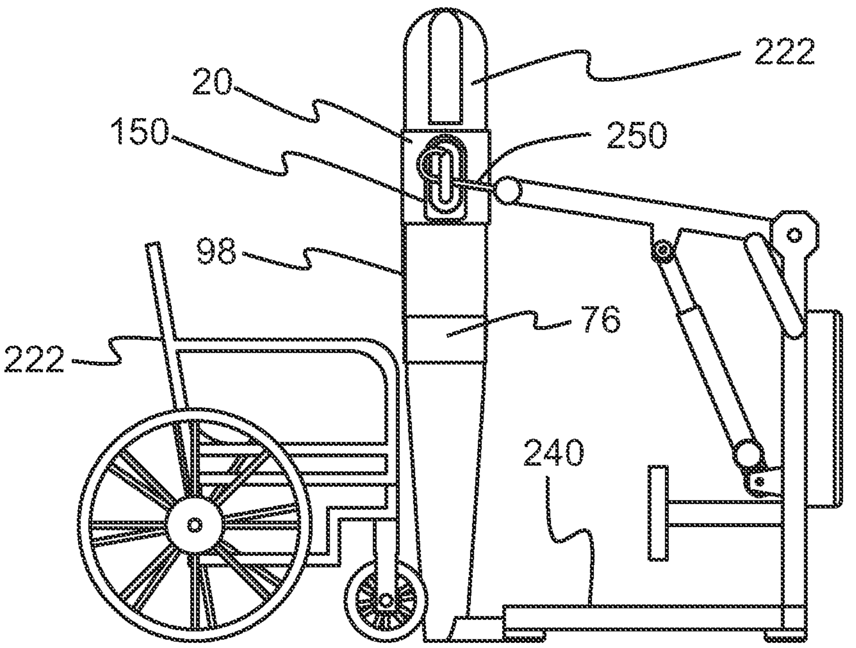
FIG. 57 is an elevation view of the patient, the flexible lift assist harness embodiment, the wheelchair, and the patient assist power lift device of FIG. 54 with a power lift arm of the patient assist power lift device lifting the patient by applying tension to flexible handle assembly secured to a torso belt of the flexible lift assist harness.

A lifting force may then be applied to the torso belt 20 in order to stabilize the patient 16 in a standing position. A first diaper 260 may then be removed from the patient 16 by disengaging the first diaper 260 from the patient 16 and sliding at least a portion of the first diaper 260 between the anchor strap 98 and the leg or pelvis of the patient 16 (see FIG. 49). At least a portion of a second replacement diaper 262 may then be slid between the anchor strap 98 and the leg or pelvis of the patient 16, and a second replacement diaper 262 may be deployed onto the patient 16 (FIGS. 50-53).

In some cases, the lifting force may be applied to the torso belt 16 by the first power lift arm 250 and the second power lift arm 252 of the patient assist power lift device 240, with the first and second power lift arms 250, 254 operatively coupled the torso belt 20. In some cases the first power lift arm 250 may be operatively coupled to the first power lift strap 248 which is in turn secured to the torso belt 20, and the second power lift arm 254 may be operatively coupled to the second power lift strap 252 which may in turn be secured to the torso belt 20. In some other cases the first power lift arm 250 may be operatively coupled to the first flexible handle assembly 150 which may be secured to the torso belt 20, and the second power lift arm 254 may be operatively coupled to the second flexible handle assembly 158 which may be secured to the torso belt 20. In some other cases the lifting force may be applied to the torso belt by a caregiver grasping a flexible handle assembly 40 which may be secured to the torso belt 20.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation and use of such terms and expressions do not exclude any equivalents of the features shown and described or portions thereof, and various modifications are possible. The term "a" or "an" can refer to one of or a plurality of the elements it modifies (e.g., "a reagent" can mean one or more reagents) unless it is contextually clear either one of the elements or more than one of the elements is described. Thus, it should be understood that although embodiments have been specifically disclosed by representative embodiments and optional features, modification and variation of the concepts herein disclosed may be resorted to by those skilled in the art, and such modifications and variations are considered within the scope of this disclosure.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

What is claimed is:

1. A flexible lift assist harness, comprising:

A. a flexible belt assembly including:

(1) a torso belt comprising:

a length along a longitudinal axis thereof which is sufficient to encompass a human torso;

an elongation elasticity along the longitudinal axis thereof of at least about 30 percent;

a width along a transverse axis thereof that is at least about 12 percent of a length along the longitudinal axis;

limited elongation elasticity along the transverse axis thereof of less than about 4 percent;

(2) a torso fixation mechanism disposed on a first and a second end of the torso belt and configured to releasably secure the first end of the torso belt to the second end of the torso belt at a plurality of secured circumferences of the torso belt; and (3) at least one flexible handle assembly disposed on the torso belt, comprising:

a flexible handle having an elongate configuration and configured to have elongation elasticity along a handle length axis of at least about 20 percent and limited elongation elasticity along a transverse axis of the flexible handle of less than about 2 percent and configured to lie flat in a stretched state when not in use;

a flexible insert disposed adjacent to and secured to the torso belt and including a thin resilient layer of flexible material, and at least one handle anchor aperture;

an insert cover disposed between the flexible handle and the flexible insert, the flexible insert being sized such that the flexible insert is substantially encompassed by and disposed between the torso belt and the insert cover;

at least one insert lock feature which operatively couples the elongate handle to the torso belt; and B. at least one leg belt assembly comprising:

(1) a leg belt configured to have elastic elongation along a longitudinal axis thereof of at least about 40 percent and limited elongation elasticity along a transverse width axis thereof of less than about 5 percent and a length along the longitudinal axis thereof which is sufficient to encompass a human thigh;

(2) a leg belt fixation mechanism disposed on a first end and a second end of the leg belt and configured to releasably secure the first end of the leg belt to the second end of the leg belt at a plurality of secured circumferences of the leg belt;

(3) at least one anchor strap assembly including:

an anchor strap having a first end secured to the leg belt;

a coupling mechanism secured to a second end of the anchor strap which is configured to operatively and adjustably couple the second end of the anchor strap to an anchor strap terminal of the at least one flexible handle assembly.

2. The flexible lift assist harness of claim 1 wherein a longitudinal length of the torso belt is about 25 inches to about 70 inches.

3. The flexible lift assist harness of claim 1 wherein a transverse width of the torso belt is about 6 inches to about 10 inches.

4. The flexible lift assist harness of claim 1 wherein a material layer of the torso belt comprises a generally rectangular configuration when laid on a flat surface.

5. The flexible lift assist harness of claim 4 wherein the material layer of the torso belt comprises a thin fenestrated layer.

6. The flexible lift assist harness of claim 1 wherein the torso fixation mechanism comprises hook and loop, buckles, or snaps.

7. The flexible lift assist harness of claim 1 wherein the thin resilient layer of flexible material of the flexible insert comprises polycarbonate.

8. The flexible lift assist harness of claim 1 wherein the at least one insert lock feature comprises stitches, staples, rivets, or adhesive.

9. The flexible lift assist harness of claim 1 wherein the anchor strap terminal includes a buckle operatively coupled to the flexible insert.

10. The flexible lift assist harness of claim 9 wherein the buckle is operatively coupled to the flexible insert by staples, rivets, stitches, or adhesive.

11. The flexible lift assist harness of claim 9 wherein the buckle is monolithically formed from the thin resilient layer of flexible material of the flexible insert.

12. The flexible lift assist harness of claim 9 wherein the coupling mechanism secured at the second end of the anchor strap comprises hook and loop, a buckle, or snaps.

13. The flexible lift assist harness of claim 1 wherein the anchor strap terminal is operatively coupled to the insert cover.

14. The flexible lift assist harness of claim 13 wherein the anchor strap terminal and the coupling mechanism comprise hook and loop.

15. The flexible lift assist harness of claim 13 wherein the anchor strap terminal comprises a buckle.

16. The flexible lift assist harness of claim 13 wherein the coupling mechanism disposed at the second end of the anchor strap comprises hook and loop, a buckle, or snaps.

17. The flexible lift assist harness of claim 1 wherein the first end of the anchor strap is secured to the leg belt by stiches, staples, rivets, or adhesive.

18. The flexible lift assist harness of claim 1 wherein a first flexible insert, a first insert cover, and a first insert lock feature comprise a first reinforcement mechanism, and a second flexible insert, a second insert cover, and a second insert lock feature comprise a second reinforcement mechanism.

19. The flexible lift assist harness of claim 18 wherein a first end of the flexible handle is operatively coupled to the first reinforcement mechanism by the first insert lock feature, and a second end of the flexible handle is operatively coupled to the second reinforcement mechanism by the second insert lock feature.

20. A flexible belt assembly, comprising:

(1) a torso belt comprising:

a length along a longitudinal axis thereof which is sufficient to encompass a human torso;

an elongation elasticity along the longitudinal axis thereof of at least about 30 percent;

a width along a transverse axis thereof that is at least about 12 percent of a length along the longitudinal axis;

limited elongation elasticity along the transverse axis thereof of less than about 4 percent;

(2) a torso fixation mechanism disposed on a first and a second end of the torso belt and configured to releasably secure the first end of the torso belt to the second end of the torso belt at a plurality of secured circumferences of the torso belt; and (3) at least one flexible handle assembly disposed on the torso belt, comprising:

a flexible handle having an elongate configuration and configured to have elongation elasticity along a handle length axis of at least about 20 percent and limited elongation elasticity along a transverse axis of the flexible handle of less than about 2 percent and configured to lie flat in a stretched state when not in use;

a flexible insert disposed adjacent to and secured to the torso belt and including a thin resilient layer of flexible material, and at least one handle anchor aperture;

an insert cover disposed between the flexible handle and the flexible insert, the flexible insert being sized such that the flexible insert is substantially encompassed by and disposed between the torso belt and the insert cover; and at least one insert lock feature which operatively couples the elongate handle to the torso belt.

* * * * *